United States Patent
Olcott

(10) Patent No.: US 7,046,848 B1
(45) Date of Patent: May 16, 2006

(54) METHOD AND SYSTEM FOR RECOGNIZING MACHINE GENERATED CHARACTER GLYPHS AND ICONS IN GRAPHIC IMAGES

(76) Inventor: Peter L. Olcott, 420 N. Adams St., Papillion, NE (US) 68046

( * ) Notice: Subject to any disclaimer, the term of this patent is extended or adjusted under 35 U.S.C. 154(b) by 52 days.

(21) Appl. No.: 10/225,053

(22) Filed: Aug. 21, 2002

Related U.S. Application Data

(60) Provisional application No. 60/314,184, filed on Aug. 22, 2001.

(51) Int. Cl.
  *G06K 9/34* (2006.01)
  *G06K 9/36* (2006.01)

(52) U.S. Cl. ........................ 382/176; 382/284

(58) Field of Classification Search ............... 382/165, 382/176, 178, 181, 182, 184, 187, 190, 195, 382/198, 228, 284, 305; 358/1.11, 2.1; 345/574; 706/20, 48; 707/6, 104.1; 715/513, 515, 715/531; 717/104
See application file for complete search history.

(56) References Cited

U.S. PATENT DOCUMENTS

| | | | |
|---|---|---|---|
| 5,151,950 A * | 9/1992 | Hullender | 382/187 |
| 5,321,773 A | 6/1994 | Kopec et al. | 382/30 |
| 5,704,060 A * | 12/1997 | Del Monte | 707/104.1 |
| 5,768,423 A * | 6/1998 | Aref et al. | 382/228 |
| 5,978,801 A * | 11/1999 | Yuasa | 707/6 |
| 6,785,677 B1 * | 8/2004 | Fritchman | 707/6 |
| 6,856,981 B1 * | 2/2005 | Wyschogrod et al. | 706/48 |
| 6,880,147 B1 * | 4/2005 | Pauly | 717/104 |
| 6,912,526 B1 * | 6/2005 | Akaboshi | 707/6 |

* cited by examiner

*Primary Examiner*—Andrew W. Johns
*Assistant Examiner*—Amir Alavi
(74) *Attorney, Agent, or Firm*—David J. Bates; Lisa A. Brzycki; Lisa M. Gehrke

(57) ABSTRACT

A deterministic finite automaton uses binary search (and optionally hashing) method(s) of sparse matrix representation to recognize the graphical representations of characters or icons from a bitmap representation of the computer screen. This recognition can be applied to translate data from an unknown form of original specification (file format) into a known form of representation, such as HTML. Alternatively this recognition can be applied to another process that can "see" what is on the screen, and perform programmed actions, based on what it "sees".

27 Claims, 52 Drawing Sheets

FIG. 3

| BITMAP VALUE [28] | HEXADECIMAL VALUE [30] | BITMAP COLUMN [32] |
|---|---|---|
| `....OO........................` | c000000 | 0 |
| `...OOOO.......................` | 1e000000 | 1 |
| `...OOOO.......................` | 1e000000 | 2 |
| `...OOOO.......................` | 1e000000 | 3 |
| `...O..........................` | 10000000 | 4 |
| `...OO.........................` | 18000000 | 5 |
| `....OOOO......................` | f000000 | 6 |
| `.....OOOOOOO..................` | 7f00000 | 7 |
| `......OOOOOOOOO.......OO......` | 3fe0300 | 8 |
| `.......OOOOOOOOOOOO...OO......` | 1ffe300 | 9 |
| `........OOOOOOOOOOOOOOO.......` | 7fff00 | 10 |
| `..........OOOOOOOOOOOOOO......` | fffc0 | 11 |
| `.............OOOOOOOOOOOO....` | 1fff0 | 12 |
| `.................OOOOOOOOOO...` | 3ff8 | 13 |
| `.....................OOOOOOOO..` | 3fc | 14 |
| `.......................OO..OOOOO.` | 33e | 15 |
| `.......................OO....OOO.` | 30e | 16 |
| `..............................OO` | 3 | 17 |
| `...............................O` | 1 | 18 |
| `............................OOOO` | f | 19 |
| `............................OOOO` | f | 20 |
| `............................OOO.` | e | 21 |

Bitmap of lower case *f* in Times-New-Roman, Bold, Italic, 24-Point

---

Sample C++ Code Synthesizing a Bitmap for a TripleOverlap

```
Cursor = WidthSpace;     // to indent (plus a little extra)
CursorEnd = 100;         // 30% Wider than the widest bitmap
for (COL = 0; COL <= CursorEnd; COL++)   // Zap Required Space in Array
   OutBitmap[COL] = 0;

for (COL = 0; COL < WidthChar1; Cursor++, COL++)
   OutBitmap[Cursor] |= FontData[CH1].Bitmap[COL];

Cursor += PixelsBetween[CH1][CH2];
for (COL = 0; COL < WidthChar2; Cursor++, COL++)
   OutBitmap[Cursor] |= FontData[CH2].Bitmap[COL];

Cursor += PixelsBetween[CH2][CH3];
for (COL = 0; COL < WidthChar3; Cursor++, COL++)
   OutBitmap[Cursor] |= FontData[CH3].Bitmap[COL];
```

FIG. 6

```
        Column1  Column2  Column3
        -------  -------  -------
   (A)  1111111  3333333  5555555
   (B)  1111111  3333333  6666666
   (C)  1111111  4444444  7777777
   (D)  2222222  4444444  8888888
   (E)  2222222  4444444  9999999
```

```
StartState--->(0)  Length = 2    goto (0) and Binary Search
(0) 1111111--->(2)  Length = 2    goto (2) and Binary Search
(1) 2222222--->(4)  Length = 1    goto (4) and Compare
(2) 3333333--->(5)  Length = 2    goto (5) and Binary Search
(3) 4444444--->(7)  Length = 1    goto (7) and Compare
(4) 4444444--->(8)  Length = 2    goto (8) and Binary Search
(5) 5555555---> Recognize (A)
(6) 6666666---> Recognize (B)
(7) 7777777---> Recognize (C)           58
(8) 8888888---> Recognize (D)
(9) 9999999---> Recognize (E)
```

FIG. 8A

```
ID#1  1111111
ID#2  2222222
ID#3  2222222  AAAAAAA
ID#4  3333333  AAAAAAA
```

FIG. 8B

```
DFA[ 0].Bitmap->         0       Next-> 1    Offset-> 2    ActionCode->_BSEARCH
DFA[ 1].Bitmap->1111111          Next-> 9    Offset-> 0    ActionCode->_NEXTNODE
DFA[ 2].Bitmap->2222222          Next-> 7    Offset-> 0    ActionCode->_SUBSTR_NEXT
DFA[ 3].Bitmap->3333333          Next-> 4    Offset-> 0    ActionCode->_NEXTNODE
DFA[ 4].Bitmap->AAAAAAA          Next-> 5    Offset-> 0    ActionCode->_NEXTNODE
DFA[ 5].Bitmap->         0       Next-> 0    Offset-> 0    ActionCode->ID#4
DFA[ 6].Bitmap->         0       Next-> 0    Offset-> 0    ActionCode->ID#2
DFA[ 7].Bitmap->AAAAAAA          Next-> 8    Offset-> 0    ActionCode->_NEXTNODE
DFA[ 8].Bitmap->         0       Next-> 0    Offset-> 0    ActionCode->ID#3
DFA[ 9].Bitmap->         0       Next-> 0    Offset-> 0    ActionCode->ID#1
```

FIG. 9A

```
ID#1  1111111
ID#2  1111111
ID#3  1111111  AAAAAAA
ID#4  1111111  BBBBBBB
```

FIG. 9B

```
DFA[ 0].Bitmap->         0       Next-> 1    Offset-> 0    ActionCode->_NEXTNODE
DFA[ 1].Bitmap->1111111          Next-> 3    Offset-> 1    ActionCode->_SUBSTR_BSEARCH
DFA[ 2].Bitmap->         0       Next-> 7    Offset-> 1    ActionCode->_DUPLICATE
DFA[ 3].Bitmap->AAAAAAA          Next-> 6    Offset-> 0    ActionCode->_NEXTNODE
DFA[ 4].Bitmap->BBBBBBB          Next-> 5    Offset-> 0    ActionCode->_NEXTNODE
DFA[ 5].Bitmap->         0       Next-> 0    Offset-> 0    ActionCode->ID#4
DFA[ 6].Bitmap->         0       Next-> 0    Offset-> 0    ActionCode->ID#3
DFA[ 7].Bitmap->         0       Next-> 0    Offset-> 0    ActionCode->ID#1
DFA[ 8].Bitmap->         0       Next-> 0    Offset-> 0    ActionCode->ID#2
```

FIG. 10A

```
ID#1  1111111  AAAAAAA
ID#2  1111111  AAAAAAA
ID#3  1111111  AAAAAAA  EEEEEEE
ID#4  1111111  AAAAAAA  FFFFFFF
```

FIG. 10B

```
DFA[ 0].Bitmap->          0    Next-> 1    Offset-> 0    ActionCode->_NEXTNODE
DFA[ 1].Bitmap->1111111        Next-> 2    Offset-> 0    ActionCode->_NEXTNODE
DFA[ 2].Bitmap->AAAAAAA        Next-> 4    Offset-> 1    ActionCode->_SUBSTR_BSEARCH
DFA[ 3].Bitmap->          0    Next-> 8    Offset-> 1    ActionCode->_DUPLICATE
DFA[ 4].Bitmap->EEEEEEE        Next-> 7    Offset-> 0    ActionCode->_NEXTNODE
DFA[ 5].Bitmap->FFFFFFF        Next-> 6    Offset-> 0    ActionCode->_NEXTNODE
DFA[ 6].Bitmap->          0    Next-> 0    Offset-> 0    ActionCode->ID#4
DFA[ 7].Bitmap->          0    Next-> 0    Offset-> 0    ActionCode->ID#3
DFA[ 8].Bitmap->          0    Next-> 0    Offset-> 0    ActionCode->ID#1
DFA[ 9].Bitmap->          0    Next-> 0    Offset-> 0    ActionCode->ID#2
```

FIG. 11A

```
ID#1  1111111  AAAAAAA  EEEEEEE
ID#2  1111111  AAAAAAA  EEEEEEE
ID#3  1111111  AAAAAAA  FFFFFFF
ID#4  1111111  AAAAAAA  FFFFFFF
```

FIG. 11B

```
DFA[ 0].Bitmap->          0    Next-> 1    Offset-> 0    ActionCode->_NEXTNODE
DFA[ 1].Bitmap->1111111        Next-> 2    Offset-> 0    ActionCode->_NEXTNODE
DFA[ 2].Bitmap->AAAAAAA        Next-> 3    Offset-> 1    ActionCode->_BSEARCH
DFA[ 3].Bitmap->EEEEEEE        Next-> 7    Offset-> 1    ActionCode->_DUPLICATE
DFA[ 4].Bitmap->FFFFFFF        Next-> 5    Offset-> 1    ActionCode->_DUPLICATE
DFA[ 5].Bitmap->          0    Next-> 0    Offset-> 0    ActionCode->ID#3
DFA[ 6].Bitmap->          0    Next-> 0    Offset-> 0    ActionCode->ID#4
DFA[ 7].Bitmap->          0    Next-> 0    Offset-> 0    ActionCode->ID#1
DFA[ 8].Bitmap->          0    Next-> 0    Offset-> 0    ActionCode->ID#2
```

FIG. 12A

```
ID#1  1111111
ID#2  1111111  AAAAAAA  DDDDDDD
ID#3  2222222
ID#4  2222222  BBBBBBB  EEEEEEE
```

FIG. 12B

```
DFA[ 0].Bitmap->           0    Next-> 1    Offset-> 1    ActionCode->_BSEARCH
DFA[ 1].Bitmap->1111111         Next-> 8    Offset-> 0    ActionCode->_SUBSTR_NEXT
DFA[ 2].Bitmap->2222222         Next-> 4    Offset-> 0    ActionCode->_SUBSTR_NEXT
DFA[ 3].Bitmap->           0    Next-> 0    Offset-> 0    ActionCode->ID#3
DFA[ 4].Bitmap->BBBBBBB         Next-> 5    Offset-> 0    ActionCode->_NEXTNODE
DFA[ 5].Bitmap->EEEEEEE         Next-> 6    Offset-> 0    ActionCode->_NEXTNODE
DFA[ 6].Bitmap->           0    Next-> 0    Offset-> 0    ActionCode->ID#4
DFA[ 7].Bitmap->           0    Next-> 0    Offset-> 0    ActionCode->ID#1
DFA[ 8].Bitmap->AAAAAAA         Next-> 9    Offset-> 0    ActionCode->_NEXTNODE
DFA[ 9].Bitmap->DDDDDDD         Next->10    Offset-> 0    ActionCode->_NEXTNODE
DFA[10].Bitmap->           0    Next-> 0    Offset-> 0    ActionCode->ID#2
```

FIG. 13A

```
ID#1  1111111  AAAAAAA  CCCCCCC
ID#2  1111111  AAAAAAA  DDDDDDD
ID#3  1111111  BBBBBBB  EEEEEEE
ID#4  1111111  BBBBBBB  FFFFFFF
```

FIG. 13B

```
DFA[ 0].Bitmap->           0    Next-> 1    Offset-> 0    ActionCode->_NEXTNODE
DFA[ 1].Bitmap->1111111         Next-> 2    Offset-> 1    ActionCode->_BSEARCH
DFA[ 2].Bitmap->AAAAAAA         Next-> 8    Offset-> 1    ActionCode->_BSEARCH
DFA[ 3].Bitmap->BBBBBBB         Next-> 4    Offset-> 1    ActionCode->_BSEARCH
DFA[ 4].Bitmap->EEEEEEE         Next-> 7    Offset-> 0    ActionCode->_NEXTNODE
DFA[ 5].Bitmap->FFFFFFF         Next-> 6    Offset-> 0    ActionCode->_NEXTNODE
DFA[ 6].Bitmap->           0    Next-> 0    Offset-> 0    ActionCode->ID#4
DFA[ 7].Bitmap->           0    Next-> 0    Offset-> 0    ActionCode->ID#3
DFA[ 8].Bitmap->CCCCCCC         Next->11    Offset-> 0    ActionCode->_NEXTNODE
DFA[ 9].Bitmap->DDDDDDD         Next->10    Offset-> 0    ActionCode->_NEXTNODE
DFA[10].Bitmap->           0    Next-> 0    Offset-> 0    ActionCode->ID#2
DFA[11].Bitmap->           0    Next-> 0    Offset-> 0    ActionCode->ID#1
```

FIG. 14A

```
ID#1  1111111
ID#2  2222222
ID#3  2222222
ID#4  2222222  AAAAAAA
```

FIG. 14B

```
DFA[ 0].Bitmap->          0    Next-> 1   Offset-> 1   ActionCode->_BSEARCH
DFA[ 1].Bitmap->1111111        Next-> 8   Offset-> 0   ActionCode->_NEXTNODE
DFA[ 2].Bitmap->2222222        Next-> 4   Offset-> 0   ActionCode->_SUBSTR_NEXT
DFA[ 3].Bitmap->          0    Next-> 6   Offset-> 1   ActionCode->_DUPLICATE
DFA[ 4].Bitmap->AAAAAAA        Next-> 5   Offset-> 0   ActionCode->_NEXTNODE
DFA[ 5].Bitmap->          0    Next-> 0   Offset-> 0   ActionCode->ID#4
DFA[ 6].Bitmap->          0    Next-> 0   Offset-> 0   ActionCode->ID#2
DFA[ 7].Bitmap->          0    Next-> 0   Offset-> 0   ActionCode->ID#3
DFA[ 8].Bitmap->          0    Next-> 0   Offset-> 0   ActionCode->ID#1
```

FIG. 15A

```
ID#1  1111111
ID#2  1111111
ID#3  1111111  AAAAAAA
ID#4  2222222  BBBBBBB
```

FIG. 15B

```
DFA[ 0].Bitmap->          0    Next-> 1   Offset-> 1   ActionCode->_BSEARCH
DFA[ 1].Bitmap->1111111        Next-> 6   Offset-> 0   ActionCode->_SUBSTR_NEXT
DFA[ 2].Bitmap->2222222        Next-> 3   Offset-> 0   ActionCode->_NEXTNODE
DFA[ 3].Bitmap->BBBBBBB        Next-> 4   Offset-> 0   ActionCode->_NEXTNODE
DFA[ 4].Bitmap->          0    Next-> 0   Offset-> 0   ActionCode->ID#4
DFA[ 5].Bitmap->          0    Next-> 8   Offset-> 1   ActionCode->_DUPLICATE
DFA[ 6].Bitmap->AAAAAAA        Next-> 7   Offset-> 0   ActionCode->_NEXTNODE
DFA[ 7].Bitmap->          0    Next-> 0   Offset-> 0   ActionCode->ID#3
DFA[ 8].Bitmap->          0    Next-> 0   Offset-> 0   ActionCode->ID#1
DFA[ 9].Bitmap->          0    Next-> 0   Offset-> 0   ActionCode->ID#2
```

FIG. 16A

```
ID#1  1111111
ID#2  1111111
ID#3  1111111  AAAAAAA
ID#4  1111111  AAAAAAA
```

FIG. 16B

```
DFA[ 0].Bitmap->          0    Next-> 1    Offset-> 0    ActionCode->_NEXTNODE
DFA[ 1].Bitmap->1111111        Next-> 3    Offset-> 0    ActionCode->_SUBSTR_NEXT
DFA[ 2].Bitmap->          0    Next-> 6    Offset-> 1    ActionCode->_DUPLICATE
DFA[ 3].Bitmap->AAAAAAA        Next-> 4    Offset-> 1    ActionCode->_DUPLICATE
DFA[ 4].Bitmap->          0    Next-> 0    Offset-> 0    ActionCode->ID#3
DFA[ 5].Bitmap->          0    Next-> 0    Offset-> 0    ActionCode->ID#4
DFA[ 6].Bitmap->          0    Next-> 0    Offset-> 0    ActionCode->ID#1
DFA[ 7].Bitmap->          0    Next-> 0    Offset-> 0    ActionCode->ID#2
```

FIG. 17A

```
ID#1  1111111
ID#2  1111111
ID#3  1111111  AAAAAAA  BBBBBBB
ID#4  1111111  AAAAAAA  BBBBBBB
```

FIG. 17B

```
DFA[ 0].Bitmap->          0    Next-> 1    Offset-> 0    ActionCode->_NEXTNODE
DFA[ 1].Bitmap->1111111        Next-> 3    Offset-> 0    ActionCode->_SUBSTR_NEXT
DFA[ 2].Bitmap->          0    Next-> 7    Offset-> 1    ActionCode->_DUPLICATE
DFA[ 3].Bitmap->AAAAAAA        Next-> 4    Offset-> 0    ActionCode->_NEXTNODE
DFA[ 4].Bitmap->BBBBBBB        Next-> 5    Offset-> 1    ActionCode->_DUPLICATE
DFA[ 5].Bitmap->          0    Next-> 0    Offset-> 0    ActionCode->ID#3
DFA[ 6].Bitmap->          0    Next-> 0    Offset-> 0    ActionCode->ID#4
DFA[ 7].Bitmap->          0    Next-> 0    Offset-> 0    ActionCode->ID#1
DFA[ 8].Bitmap->          0    Next-> 0    Offset-> 0    ActionCode->ID#2
```

FIG. 18A

```
ID#1  1111111
ID#2  1111111  AAAAAAA
ID#3  1111111  AAAAAAA  BBBBBBB
ID#4  1111111  AAAAAAA  BBBBBBB
```

FIG. 18B

```
DFA[ 0].Bitmap->            0   Next-> 1   Offset-> 0   ActionCode->_NEXTNODE
DFA[ 1].Bitmap->1111111         Next-> 3   Offset-> 0   ActionCode->_SUBSTR_NEXT
DFA[ 2].Bitmap->            0   Next-> 0   Offset-> 0   ActionCode->ID#1
DFA[ 3].Bitmap->AAAAAAA         Next-> 5   Offset-> 0   ActionCode->_SUBSTR_NEXT
DFA[ 4].Bitmap->            0   Next-> 0   Offset-> 0   ActionCode->ID#2
DFA[ 5].Bitmap->BBBBBBB         Next-> 6   Offset-> 1   ActionCode->_DUPLICATE
DFA[ 6].Bitmap->            0   Next-> 0   Offset-> 0   ActionCode->ID#3
DFA[ 7].Bitmap->            0   Next-> 0   Offset-> 0   ActionCode->ID#4
```

FIG. 19A

```
ID#1  1111111
ID#2  2222222  AAAAAAA  DDDDDDD
ID#3  3333333
ID#4  4444444  BBBBBBB  EEEEEEE
```

FIG. 19B

```
DFA[ 0].Bitmap->            0   Next-> 1   Offset-> 3   ActionCode->_BSEARCH
DFA[ 1].Bitmap->1111111         Next->12   Offset-> 0   ActionCode->_NEXTNODE
DFA[ 2].Bitmap->2222222         Next-> 9   Offset-> 0   ActionCode->_NEXTNODE
DFA[ 3].Bitmap->3333333         Next-> 8   Offset-> 0   ActionCode->_NEXTNODE
DFA[ 4].Bitmap->4444444         Next-> 5   Offset-> 0   ActionCode->_NEXTNODE
DFA[ 5].Bitmap->BBBBBBB         Next-> 6   Offset-> 0   ActionCode->_NEXTNODE
DFA[ 6].Bitmap->EEEEEEE         Next-> 7   Offset-> 0   ActionCode->_NEXTNODE
DFA[ 7].Bitmap->            0   Next-> 0   Offset-> 0   ActionCode->ID#4
DFA[ 8].Bitmap->            0   Next-> 0   Offset-> 0   ActionCode->ID#3
DFA[ 9].Bitmap->AAAAAAA         Next->10   Offset-> 0   ActionCode->_NEXTNODE
DFA[10].Bitmap->DDDDDDD         Next->11   Offset-> 0   ActionCode->_NEXTNODE
DFA[11].Bitmap->            0   Next-> 0   Offset-> 0   ActionCode->ID#2
DFA[12].Bitmap->            0   Next-> 0   Offset-> 0   ActionCode->ID#1
```

FIG. 20A

```
ID#1  1111111  AAAAAAA  DDDDDDD
ID#2  2222222  BBBBBBB
ID#3  3333333
ID#4  4444444  CCCCCCC  EEEEEEE
```

FIG. 20B

```
DFA[ 0].Bitmap->          0    Next-> 1     Offset-> 3    ActionCode->_BSEARCH
DFA[ 1].Bitmap->1111111        Next->11     Offset-> 0    ActionCode->_NEXTNODE
DFA[ 2].Bitmap->2222222        Next-> 9     Offset-> 0    ActionCode->_NEXTNODE
DFA[ 3].Bitmap->3333333        Next-> 8     Offset-> 0    ActionCode->_NEXTNODE
DFA[ 4].Bitmap->4444444        Next-> 5     Offset-> 0    ActionCode->_NEXTNODE
DFA[ 5].Bitmap->CCCCCCC        Next-> 6     Offset-> 0    ActionCode->_NEXTNODE
DFA[ 6].Bitmap->EEEEEEE        Next-> 7     Offset-> 0    ActionCode->_NEXTNODE
DFA[ 7].Bitmap->          0    Next-> 0     Offset-> 0    ActionCode->ID#4
DFA[ 8].Bitmap->          0    Next-> 0     Offset-> 0    ActionCode->ID#3
DFA[ 9].Bitmap->BBBBBBB        Next->10     Offset-> 0    ActionCode->_NEXTNODE
DFA[10].Bitmap->          0    Next-> 0     Offset-> 0    ActionCode->ID#2
DFA[11].Bitmap->AAAAAAA        Next->12     Offset-> 0    ActionCode->_NEXTNODE
DFA[12].Bitmap->DDDDDDD        Next->13     Offset-> 0    ActionCode->_NEXTNODE
DFA[13].Bitmap->          0    Next-> 0     Offset-> 0    ActionCode->ID#1
```

FIG. 21A

```
ID#1  1111111  AAAAAAA  DDDDDDD
ID#2  2222222  BBBBBBB
ID#3  3333333
ID#4  4444444
```

FIG. 21B

```
DFA[ 0].Bitmap->          0    Next-> 1     Offset-> 3    ActionCode->_BSEARCH
DFA[ 1].Bitmap->1111111        Next-> 9     Offset-> 0    ActionCode->_NEXTNODE
DFA[ 2].Bitmap->2222222        Next-> 7     Offset-> 0    ActionCode->_NEXTNODE
DFA[ 3].Bitmap->3333333        Next-> 6     Offset-> 0    ActionCode->_NEXTNODE
DFA[ 4].Bitmap->4444444        Next-> 5     Offset-> 0    ActionCode->_NEXTNODE
DFA[ 5].Bitmap->          0    Next-> 0     Offset-> 0    ActionCode->ID#4
DFA[ 6].Bitmap->          0    Next-> 0     Offset-> 0    ActionCode->ID#3
DFA[ 7].Bitmap->BBBBBBB        Next-> 8     Offset-> 0    ActionCode->_NEXTNODE
DFA[ 8].Bitmap->          0    Next-> 0     Offset-> 0    ActionCode->ID#2
DFA[ 9].Bitmap->AAAAAAA        Next->10     Offset-> 0    ActionCode->_NEXTNODE
DFA[10].Bitmap->DDDDDDD        Next->11     Offset-> 0    ActionCode->_NEXTNODE
DFA[11].Bitmap->          0    Next-> 0     Offset-> 0    ActionCode->ID#1
```

FIG. 22A

```
ID#1  1111111  AAAAAAA  DDDDDDD
ID#2  2222222  BBBBBBB
ID#3  3333333        0  EEEEEEE
ID#4  4444444  CCCCCCC  EEEEEEE
```

FIG. 22B

```
DFA[ 0].Bitmap->        0    Next-> 1    Offset-> 3    ActionCode->_BSEARCH
DFA[ 1].Bitmap->1111111      Next->13    Offset-> 0    ActionCode->_NEXTNODE
DFA[ 2].Bitmap->2222222      Next->11    Offset-> 0    ActionCode->_NEXTNODE
DFA[ 3].Bitmap->3333333      Next-> 8    Offset-> 0    ActionCode->_NEXTNODE
DFA[ 4].Bitmap->4444444      Next-> 5    Offset-> 0    ActionCode->_NEXTNODE
DFA[ 5].Bitmap->CCCCCCC      Next-> 6    Offset-> 0    ActionCode->_NEXTNODE
DFA[ 6].Bitmap->EEEEEEE      Next-> 7    Offset-> 0    ActionCode->_NEXTNODE
DFA[ 7].Bitmap->        0    Next-> 0    Offset-> 0    ActionCode->ID#4
DFA[ 8].Bitmap->        0    Next-> 9    Offset-> 0    ActionCode->_NEXTNODE
DFA[ 9].Bitmap->EEEEEEE      Next->10    Offset-> 0    ActionCode->_NEXTNODE
DFA[10].Bitmap->        0    Next-> 0    Offset-> 0    ActionCode->ID#3
DFA[11].Bitmap->BBBBBBB      Next->12    Offset-> 0    ActionCode->_NEXTNODE
DFA[12].Bitmap->        0    Next-> 0    Offset-> 0    ActionCode->ID#2
DFA[13].Bitmap->AAAAAAA      Next->14    Offset-> 0    ActionCode->_NEXTNODE
DFA[14].Bitmap->DDDDDDD      Next->15    Offset-> 0    ActionCode->_NEXTNODE
DFA[15].Bitmap->        0    Next-> 0    Offset-> 0    ActionCode->ID#1
```

FIG. 23A

```
ID#1  1111111
ID#2  2222222  AAAAAAA
ID#3  3333333  BBBBBBB  DDDDDDD
ID#4  4444444  CCCCCCC  EEEEEEE
```

FIG. 23B

```
DFA[ 0].Bitmap->        0    Next-> 1    Offset-> 3    ActionCode->_BSEARCH
DFA[ 1].Bitmap->1111111      Next->13    Offset-> 0    ActionCode->_NEXTNODE
DFA[ 2].Bitmap->2222222      Next->11    Offset-> 0    ActionCode->_NEXTNODE
DFA[ 3].Bitmap->3333333      Next-> 8    Offset-> 0    ActionCode->_NEXTNODE
DFA[ 4].Bitmap->4444444      Next-> 5    Offset-> 0    ActionCode->_NEXTNODE
DFA[ 5].Bitmap->CCCCCCC      Next-> 6    Offset-> 0    ActionCode->_NEXTNODE
DFA[ 6].Bitmap->EEEEEEE      Next-> 7    Offset-> 0    ActionCode->_NEXTNODE
DFA[ 7].Bitmap->        0    Next-> 0    Offset-> 0    ActionCode->ID#4
DFA[ 8].Bitmap->BBBBBBB      Next-> 9    Offset-> 0    ActionCode->_NEXTNODE
DFA[ 9].Bitmap->DDDDDDD      Next->10    Offset-> 0    ActionCode->_NEXTNODE
DFA[10].Bitmap->        0    Next-> 0    Offset-> 0    ActionCode->ID#3
DFA[11].Bitmap->AAAAAAA      Next->12    Offset-> 0    ActionCode->_NEXTNODE
DFA[12].Bitmap->        0    Next-> 0    Offset-> 0    ActionCode->ID#2
DFA[13].Bitmap->        0    Next-> 0    Offset-> 0    ActionCode->ID#1
```

FIG. 24A

```
ID#1  1111111  AAAAAAA
ID#2  1111111  AAAAAAA
ID#3  1111111  BBBBBBB
ID#4  1111111  BBBBBBB
```

FIG. 24B

```
DFA[ 0].Bitmap->         0     Next-> 1    Offset-> 0    ActionCode->_NEXTNODE
DFA[ 1].Bitmap->1111111        Next-> 2    Offset-> 1    ActionCode->_BSEARCH
DFA[ 2].Bitmap->AAAAAAA        Next-> 6    Offset-> 1    ActionCode->_DUPLICATE
DFA[ 3].Bitmap->BBBBBBB        Next-> 4    Offset-> 1    ActionCode->_DUPLICATE
DFA[ 4].Bitmap->         0     Next-> 0    Offset-> 0    ActionCode->ID#3
DFA[ 5].Bitmap->         0     Next-> 0    Offset-> 0    ActionCode->ID#4
DFA[ 6].Bitmap->         0     Next-> 0    Offset-> 0    ActionCode->ID#1
DFA[ 7].Bitmap->         0     Next-> 0    Offset-> 0    ActionCode->ID#2
```

FIG. 25A

```
ID#1  1111111
ID#2  1111111
ID#3  2222222  AAAAAAA
ID#4  3333333  AAAAAAA
```

FIG. 25B

```
DFA[ 0].Bitmap->         0     Next-> 1    Offset-> 2    ActionCode->_BSEARCH
DFA[ 1].Bitmap->1111111        Next-> 8    Offset-> 1    ActionCode->_DUPLICATE
DFA[ 2].Bitmap->2222222        Next-> 6    Offset-> 0    ActionCode->_NEXTNODE
DFA[ 3].Bitmap->3333333        Next-> 4    Offset-> 0    ActionCode->_NEXTNODE
DFA[ 4].Bitmap->AAAAAAA        Next-> 5    Offset-> 0    ActionCode->_NEXTNODE
DFA[ 5].Bitmap->         0     Next-> 0    Offset-> 0    ActionCode->ID#4
DFA[ 6].Bitmap->AAAAAAA        Next-> 7    Offset-> 0    ActionCode->_NEXTNODE
DFA[ 7].Bitmap->         0     Next-> 0    Offset-> 0    ActionCode->ID#3
DFA[ 8].Bitmap->         0     Next-> 0    Offset-> 0    ActionCode->ID#1
DFA[ 9].Bitmap->         0     Next-> 0    Offset-> 0    ActionCode->ID#2
```

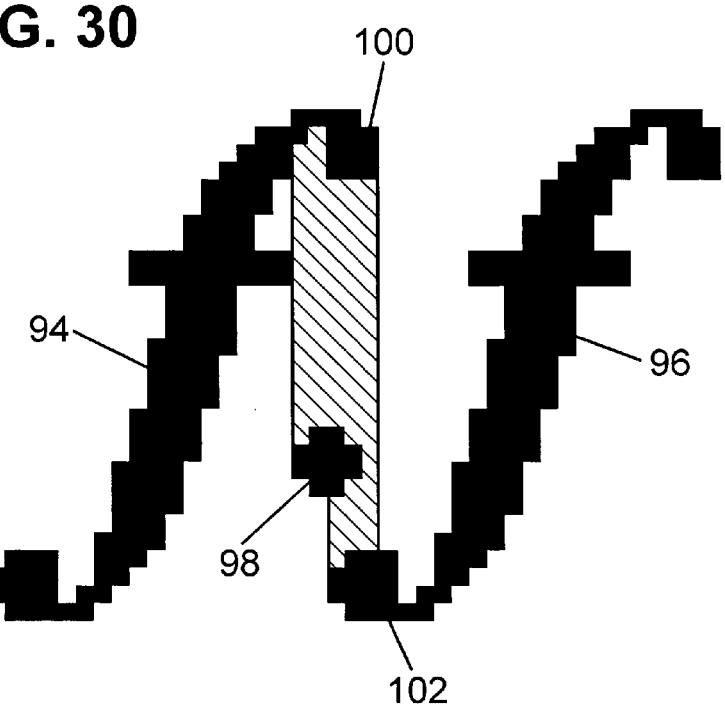

|  | 104 | 106 | 106 |
|---|---|---|---|
|  | Character Bitmaps for "ff" | Hexadecimal Integer | DFA State |
| 00) | ....OO......................... | 0c000000 | 41 |
| 01) | ...OOOO......................... | 1e000000 | 149 |
| 02) | ...OOOO......................... | 1e000000 | 158 |
| 03) | ...OOOO......................... | 1e000000 | 165 |
| 04) | ...O............................ | 10000000 | 166 |
| 05) | ...OO........................... | 18000000 | 167 |
| 06) | ....OOOO........................ | 0f000000 | 168 |
| 07) | .....OOOOOOO.................... | 07f00000 | 169 |
| 08) | ......OOOOOOOOO........OO....... | 03fe0300 | 170 |
| 09) | .......OOOOOOOOOOO....OO........ | 01ffe300 | 171 |
| 10) | .........OOOOOOOOOOOOOOO........ | 007fff00 | 172 |
| 11) | ....OO......OOOOOOOOOOOOOO...... | 0c0fffc0 | 173 |
| 12) | ...OOOO........OOOOOOOOOOOOO.... | 1e01fff0 | 175 |
| 13) | ...OOOO............OOOOOOOOOOO.. | 1e003ff8 | 176 |
| 14) | ...OOOO.............OOOOOOOO.... | 1e0003fc | 177 |
| 15) | ...O..................OO..OOOOO. | 1000033e | 178 |
| 16) | ...OO................OO....OOO. | 1800030e | 179 |
| 17) | ....OOOO....................OO | 0f000003 | 180 |
| 18) | .....OOOOOOO...................O | 07f00001 | 181 |
| 19) | ......OOOOOOOOO.......OO....OOOO | 03fe030f | 182 |
| 20) | .......OOOOOOOOOOO...OO....OOOO | 01ffe30f | 183 |
| 21) | .........OOOOOOOOOOOOOOO....OOO. | 007fff0e | 184 | _RECOGNIZE_RESUME |
| 22) | ............OOOOOOOOOOOOOO...... | 000fffc0 | 173 |
| 23) | .............OOOOOOOOOOOOO.... | 0001fff0 | 186 |
| 24) | ................OOOOOOOOOOO... | 00003ff8 | 211 |
| 25) | ..................OOOOOOOO.. | 000003fc | 222 |
| 26) | ....................OO..OOOOO. | 0000033e | 288 |
| 27) | ....................OO....OOO. | 0000030e | 30e |
| 28) | ..............................OO | 00000003 | 366 |
| 29) | ...............................O | 00000001 | 549 |
| 30) | ..............................OOOO | 0000000f | 630 |
| 31) | ..............................OOOO | 0000000f | 701 |
| 32) | ..........................OOO.. | 0000000e | 729 |

Bitmap of overlapping *ff* Times-New-Roman, Bold, Italic, 24-Point

```
//
// Gets the Next 32-Pixel Bitmap Column from the SCREEN[]
//
unsigned int GetSCREEN(int PixelROW, int PixelCOL)
{
unsigned int BITMAP;
int BitPosition = PixelROW & 0x1f;      //   PixelRow % 32
int IntegerROW  = PixelROW >> 5;        //   PixelRow / 32
   if (BitPosition)
      BITMAP = ((SCREEN[IntegerROW][PixelCOL] >> BitPosition) |
        (SCREEN[IntegerROW+1][PixelCOL] << (32 - BitPosition)));
   else
      BITMAP = SCREEN[IntegerROW][PixelCOL];
return(BITMAP);
}
```

FIG. 38

| Account Summary | | | |
|---|---|---|---|
| Previous Balance | | | |
| Charges | Thank you for your payment | | 76.08 |
| Payment | | | 76.08 |
| Balance Forward | | | $.00 |
| New Charges | | For questions, call: | |
| Qwest | Billing | 1-800-339-3929 | 60.74 |
| | Sales and Service | 1-800-244-1111 | |
| VarTec | | 1-800-583-6767 | .94 |
| Clear Choice | | 1-800-589-4480 | 15.44 |
| Total New Charges | | | $77.12 |
| TOTAL AMOUNT DUE | | | $77.12 |
| A late payment charge of up to 1.3% may apply if amount due does not reach us by Nov 22, 2001. | | | |

154, 152, 156, 162, 164, 160

```
#define  Uchar unsigned char
#define  Ushort unsigned short
define   Uint unsigned int struct FontInstance {
    char *Name;        // Font Name
    int PointSize;     // Font Point Size
    Ushort Weight;     // Degree of Boldness, 100 to 900, 400=Normal 700=Bold
    Ushort Color[3];   // RGB Values
    Uchar Style;       // BitFlags  001=Italic  010=Underline  100=Strikeout
} *FontInstances;      // Dynamic array struct PixelCoordinates {
    int Top;
    int Left;
    int Bottom;
    int Right;
};

struct ApplyFont2Text {
    int Font;          // Subscript into FontInstances
    int Begin;         // Subscript into TextData that indicates where
};                     // the FontInstance begins to apply. There is no
                       // endpoint required. A FontInstance applies
                       // until another Begin applies.

TextRectangle {
  char *TextDATA;                  // Dynamic Array

ApplyFont2Text *Apply2TEXT;      // Dynamic Array

PixelCoordinates Coordinates;    // The Bounding Box Rectangle of text as
                                   // displayed on the screen or in a window Uchar Justification;   // BitFlags:
                         //  1 =  Left Justified          These Three
                         //  2 =  Right Justified         are Mutually
                         //  4 =  Horizontally Centered   Exclusive
                         //  8 =    Top Justified         These Three
                         // 16 =  Bottom Justified        are Mutually
                         // 32 =  Vertically Centered     Exclusive
  Uchar Wrapped2Margin;  //  0 =  NotWrapped     1 = Wrapped
} *TextRectangles;
```

This is a test of the alignment of the L shaped region. These three lines form the front side of the L. The next lines that will follow will now begin to build the bottom of the region of text that is L shaped. — 144

Now we are specifying a region of text that is nearly rectangular. This region of text contains only four lines — 143

FIG. 41

This is a test of the alignment of the L shaped region. These three lines form the front side of the L. The next lines that will follow will now begin to — 146
— 148
build the bottom of the region of text that is L shaped.

Now we are specifying a region of text that is nearly rectangular. This region of text contains only four lines — 143

FIG. 42

This is a test of the alignment of the L shaped region. These three lines form the front side of the L. The next lines that will follow will now begin to — 146
build the (B) — 168
bottom of (A) Now we are specifying a
the region region of text that is nearly — 143
of text that rectangular. This region of
is L shaped. text contains only four lines.
148    166

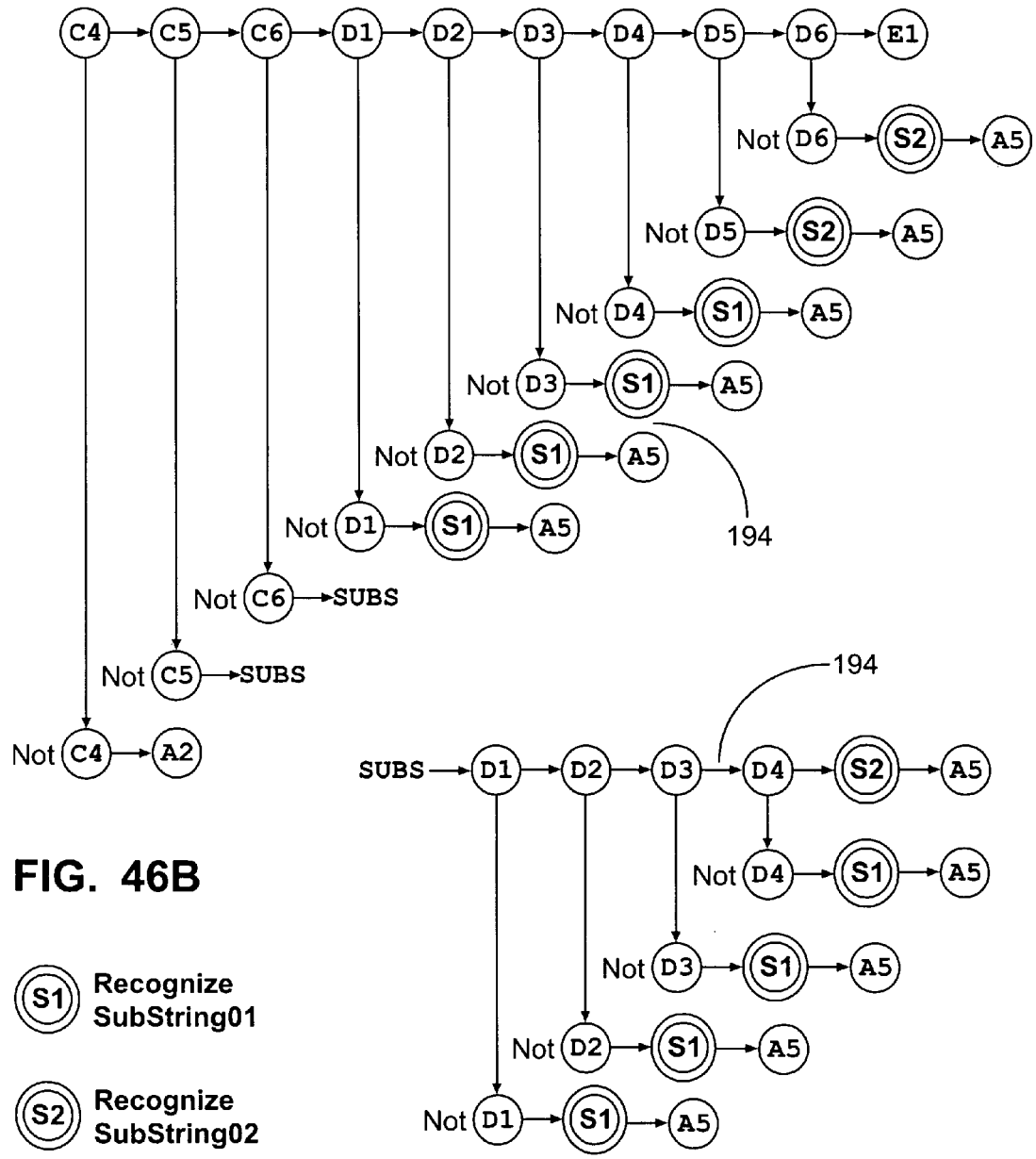

FIG. 47

```
for (int Char1 = 33; Char1 <= 126; Char1++)
   for (int Char2 = 33; Char2 <= 126; Char2++) {
      if (PixelsBetween[Char1][Char2] < 0)
        MakeOverlap(CH1, CH2);
      for (int Char3 = 33; Char3 <= 126; Char3++)
        if (PixelsBetween[CH1][CH2] < 0 && PixelsBetween[CH2][CH3] < 0)
           MakeOverlap(CH1, CH2, CH3);
   }
```

FIG. 52

```
    Sample C++ Code for Getting Next Pixel Column
       based on ScreenX and ScreenY and tmHeight
//
// FakeSCREEN is the vertical monochrome translation of the screen stored
// as a single dimensional array of unsigned 32-bit integers.
//
// This Function returns the value of the Simulated Vertical Monochrome
// Bitmap stored in FakeSCREEN, that corresponds to the vertical column
// of pixels stored in the DIB Bitmap Beginning at (BitmapRow, BitmapCol)
// and proceeding downward Thirty-Two Pixels.
//
Uint GetFakeScreenPixelColumn              // Bitmap Pixel Coordinates
  (unsigned *FakeSCREEN, int BitmapWidth, int BitmapCol, int BitmapRow) {
      Uint PixelColumn;
      int FakeScreenROW = BitmapRow / 32;  // 32 pixels per row, so divide
                                           // Pixel Row by 32 to get int Row
      int RowMod32     = BitmapRow % 32;
      int Subscript    = (FakeScreenROW * BitmapWidth) + BitmapCol;
      if (RowMod32) {  // Not on an even 32 bit boundary
         int Subscript2 = Subscript + BitmapWidth;
         PixelColumn = (FakeSCREEN[Subscript]  >> RowMod32) |
                       (FakeSCREEN[Subscript2] << (32 - RowMod32));
      }
      else
         PixelColumn = FakeSCREEN[Subscript];
   return(PixelColumn);
}
```

```
typedef union {
   Uchar  BYTE[4];
   Ushort SHORT[2];
   Uint   INT;
} BYTES;

unsigned int BITS[] = {1, 2, 4, 8, 16, 32, 64, 128, 256, 512,
                       1024, 2048, 4096, 8192, 16384, 32768,
                       65536, 131072, 262144, 524288, 1048576,
                       2097152, 4194304, 8388608, 16777216,
                       33554432, 67108864, 134217728, 268435456,
                       536870912, 1073741824, 2147483648};
```

FIG. 53A

```
void InitLeftMost() {
int X,Y;
   for (X = 1 ; X <= 255 ; X++) {
      for (Y = 7 ; (X & BITS[Y]) == 0 ; Y--)
         ;
      LeftMostBit[X] = 8-(Y+1);
   }
}
```

FIG. 53B

```
void InitRightMost() {
int X,Y;
   for (X = 1 ; X <= 255 ; X++) {
      for (Y = 0 ; (X & BITS[Y]) == 0 ; Y++)
         ;
      RightMostBit[X] = 8-(Y+1);
   }
}
```

FIG. 53C

```
int RightMostPixel(int Col, Uint Pixels) {
BYTES Convert;
int PIXEL;
   Convert.INT = Pixels;
   if (Convert.SHORT[1])     // Examine From Right to Left
      if (Convert.BYTE[3])
         PIXEL = (Col << 5) + 24 + RightMostBit[Convert.BYTE[3]];
      else
         PIXEL = (Col << 5) + 16 + RightMostBit[Convert.BYTE[2]];
   else
      if (Convert.BYTE[1])
         PIXEL = (Col << 5) +  8 + RightMostBit[Convert.BYTE[1]];
      else
         PIXEL = (Col << 5)      + RightMostBit[Convert.BYTE[0]];
return(PIXEL);
}
```

```
int LeftMostPixel(int Col, Uint Pixels) {
   BYTES Convert;
   int PIXEL;
     Convert.INT = Pixels;
     if (Convert.SHORT[0])    // Examine From Left to Right
        if (Convert.BYTE[0])
           PIXEL = (32 * Col) +(0*8)+ LeftMostBit[Convert.BYTE[0]];
        else
           PIXEL = (32 * Col) +(1*8)+ LeftMostBit[Convert.BYTE[1]];
     else
        if (Convert.BYTE[2])
           PIXEL = (32 * Col) +(2*8)+ LeftMostBit[Convert.BYTE[2]];
        else
           PIXEL = (32 * Col) +(3*8)+ LeftMostBit[Convert.BYTE[3]];
    return(PIXEL);
}
```

FIG. 53F

```
void DimensionsOfChar(Graphics::TBitmap *Bitmap, DIMENSIONS *CharRect) {
int *ptr, CharMinRow=Bitmap->Height, CharMaxRow=0, CharMaxCol=0,
   CharMinCol   = Bitmap->Width;
   int MaxWidth = Bitmap->Width >> 5;   // MaxWidth = Bitmap->Width / 32;
   for (int Row = 0; Row < Bitmap->Height; Row++) {
      ptr = (int *) Bitmap->ScanLine[Row];
      for (int Col = 0 ; Col < MaxWidth ; Col++) {
         if (ptr[Col]) {
            if(Row < CharMinRow)
               CharMinRow = Row;
            if (Row > CharMaxRow)
               CharMaxRow = Row;
            int Temp = RightMostPixel(Col, ptr[Col]);
            if (Temp > CharMaxCol)
               CharMaxCol = Temp;
            Temp = LeftMostPixel(Col, ptr[Col]);
            if (Temp < CharMinCol)
               CharMinCol = Temp;
         }
      }
   }
   if (CharSetStartingRow > CharMinRow)
      CharSetStartingRow = CharMinRow;
   CharRect->StartRow = CharMinRow;
   CharRect->EndRow   = CharMaxRow;
   CharRect->StartCol = CharMinCol;
   CharRect->EndCol   = CharMaxCol;
}
```

```
//
//     This Function is used to translate a monochrome horizontal
//     bitmap into a monochrome vertical bitmap represented as a
//     string of 32-bit integers.
//
//   Assumes that the Bitmap is Monochrome
//   (written in Borland C++ Builder 4.0)
int Bitmap2intArray
(Graphics::TBitmap *Bitmap, DIMENSIONS *CharRect, Uint *Array) {
Byte *ptr;
int StartRow    = CharRect->StartRow;
int EndRow      = CharRect->EndRow;
int StartCol    = CharRect->StartCol;
int EndCol      = CharRect->EndCol;
int LastColumn = EndCol - StartCol;
   for (int N = 0 ; N <= LastColumn ; N++)
      Array[N] = 0;
#define WhichByte       Col >> 3                // (Col / 8)
#define WhichBitInByte  7 - (Col & 7)           // 7 - (Col % 8)
#define WhichInt        Col - StartCol          // Selects Integer
#define WhichBitInInt   (Row - StartRow) & 0x1f // & 0x1f == (Modulus 32)
//
//   This Loop Translates a Horizontal Monochrome Bitmap into a
//   Vertical one.
//
//   BITS[] is an Array [0-31] with a One Bit in each respective
//   Bit Position, thus 00000000000000000000000000000001b is the
//   Zeroth Array element.
//
//   WhichByte traverses the Bytes that hold the ScanLine, while
//   WhichBitInByte traverses the Bits within these Bytes, one bit
//   at a time, in ScanLine order.
//
//   If the Bit is One, then this Bit is OR-ed into the 32-bit int,
//   progressing from Low Order Bit to High Order Bit, as the Rows
//   Progress, until the full height of the Character is Spanned,
//   from Top to Bottom, and progressing from the Zeroth Array
//   element as the Columns Progress until the full width of the
//   character is spanned.
//
//   The result of all this is that the Column is translated into
//   a Byte and BitInByte in the Horizontal Scanline, and the Row
//   is translated into the BitInInt in the Integer Array. The
//   Column is also translated into the selection of the Integer,
//   One Column Integer per Pixel Position.
//
   for (int Row = StartRow ; Row <= EndRow ; Row++) {
      ptr = (Byte *) Bitmap->ScanLine[Row];
      for (int Col = StartCol ; Col <= EndCol ; Col++)
         if (ptr[WhichByte] & BITS[WhichBitInByte])
            Array[WhichInt] |= BITS[WhichBitInInt];
      }
return(LastColumn);
}
```

FIG. 54

```
The ABC structure contains the width of a character in a TrueType font.
typedef struct _ABC { // abc
    int     abcA;
    UINT    abcB;
    int     abcC;
} ABC;
Members int DONE1 = 0, DONE2 = 0;
for (Char1 = 0; Char1 < MAX_CHAR && !DONE1; Char1++) {
  DONE2 = 0;
  if (C[Char1]->WhitePixelsAfter + A[0]->WhitePixelsBefore >= 0)
    DONE1 = 1;
  for (Char2 = 0; Char2 < MAX_CHAR && !DONE2; Char2++)
    if (C[Char1]->WhitePixelsAfter + A[Char2]->WhitePixelsBefore >= 0)
      DONE2 = 1;
    else
      FoundDoubleOverlap();
}

// TripleOverlapWithEmbeddedSpace
for (Char1 = 0; Char1 < MAX_CHAR && !DONE1; Char1++) {
  DONE2 = 0;
  if (C[Char1]->WhitePixelsAfter + WidthSpace + A[0]->WhitePixelsBefore >= 0)
    DONE1 = 1;
  for (Char3 = 0; Char3 < MAX_CHAR && !DONE2; Char3++)
    if (C[Char1]->WhitePixelsAfter + WidthSpace +
        A[Char3]->WhitePixelsBefore >= 0)
      DONE2 = 1;
    else
      FoundTripleWithEmbeddedSpace();
}

// TripleOverlap
int DONE1 = 0; DONE2 = 0, DONE3 = 0;
for (Char1 = 0; Char1 < MAX_CHAR && !DONE1; Char1++) {
  DONE2 = 0;
  if (C[Char1]->WhitePixelsAfter +
      B[0]->TotalPixelWidth + A[0]->WhitePixelsBefore >= 0)
    DONE1 = 1;
  for (Char2 = 0; Char2 < MAX_CHAR && !DONE2; Char2++) {
    DONE3 = 0;
    if (C[Char1]->WhitePixelsAfter + B[Char2]->TotalPixelWidth +
        A[0]->WhitePixelsBefore >= 0)
      DONE2 = 1;
    for (Char3 = 0; Char3 < MAX_CHAR && !DONE3; Char3++)
      if (C[Char1]->WhitePixelsAfter + B[Char2]->TotalPixelWidth +
          A[Char3]->WhitePixelsBefore >= 0)
        DONE3 = 1;
      else
        FoundTripleOverlap()
  }
}
```

FIG. 55

METHOD AND SYSTEM FOR RECOGNIZING MACHINE GENERATED CHARACTER GLYPHS AND ICONS IN GRAPHIC IMAGES

CROSS-REFERENCE TO RELATED APPLICATIONS

The present application claims priority under 35 U.S.C. § 119(e) from U.S. Provisional Application Ser. No. 60/314,184, entitled "Method for translating machine generated graphical representations of characters into their original collating sequence values" and filed on Aug. 22, 2001, by Peter L. Olcott, the full disclosure of which is hereby incorporated by reference. The present application also relates to Disclosure Document Nos. 515,523, entitled "Method and Apparatus for Specifying and Translating Page Layouts" and received on Jul. 24, 2002; and 514,655, entitled "Improvements to Text Data Entry Interface" and received on Jun. 28, 2002, the entire disclosures of which are hereby incorporated by reference.

REFERENCE TO COMPUTER PROGRAM LISTING APPENDIX

The present application is accompanied by a computer program listing appendix submitted on a compact disc in accordance with 37 C.F.R. § 1.52(e). The compact disc is labeled "Copy 1," and a duplicate copy is labeled "Copy 2." Each compact disc includes the following files, which are hereby incorporated by reference:

| File Name | Creation Date | Size (bytes) |
| --- | --- | --- |
| Explain.txt | 07-09-02 2:28p | 1,546 |
| DFA.cpp | 06-08-02 3:29p | 17,501 |
| DFA.h | 06-12-02 10:21p | 9,663 |
| DFA8.h | 04-26-02 1:27a | 11,766 |
| BMP477.h | 06-09-02 11:14a | 7,886 |
| FastString.h | 06-06-02 1:31a | 14,541 |
| FastVector.h | 04-10-02 2:32p | 4,140 |
| cc.bat | 02-10-02 11:02a | 183 |
| OUTPUT | 07-04-02 12:13p | 1,283,920 |
| PixelsBETWEEN | 07-04-02 12:12p | 70,688 |
| CharPIXELWIDTH | 07-04-02 12:12p | 752 |
| TextDFA | 07-04-02 12:13p | 1,298,709 |
| XXX.DFA | 07-04-02 12:13p | 877,635 |
| DEAdata | 07-04-02 12:37p | 130,020 |
| DFA.exe | 07-09-02 2:33p | 81,920 |

FIELD OF THE INVENTION

The present invention relates to methods and systems for recognizing text and icons contained in graphic images. The invention further relates to methods and systems for translating text and icons from unknown file formats to known file formats. The invention also relates to interfaces for defining graphical layouts including text and images and saving the graphical layouts in known page layout language formats.

BACKGROUND OF THE INVENTION

Intelligent recognition of bitmapped binary images of text for the purpose of estimating their corresponding character values is often referred to as optical character recognition ("OCR"). Most OCR systems in use today utilize stochastic processes to recognize the text in the graphic images. Because stochastic processes are fundamentally based on chance or probability, these systems are not always as reliable as may be desired. Moreover, the processing time of such stochastic processes can be quite high in some instances and thus not particularly practical.

One attempt to overcome some of the above-noted deficiencies is described in U.S. Pat. No. 5,321,773. The image recognition technique disclosed in the '773 patent is a grammar-based image modeling and recognition system that automatically produces an image decoder based on a finite state network. Although the system described in the '773 patent is substantially faster than the traditional stochastic processes, it is based on stochastic methods (like the traditional approaches) and thus inherently involves chance or probability. Another noteworthy disadvantage of the recognition system in the '773 patent is that it requires extremely detailed font metrics information for the characters to be recognized, including character sidebearings and baseline depths which typically cannot readily obtained. Yet another disadvantage of the image recognition system disclosed in the '773 is that it cannot recognize text when pairs of characters (which may be denoted by black pixels on a white background) have black pixels that overlap.

In view of the above-noted deficiencies, it would be desirable to provide an image recognition system that is capable of recognizing machine generated text in graphic images with (at least in most cases) complete accuracy. It would further be desirable to provide an image recognition system that is substantially faster than traditional OCR technology, but is also able to recognize text having characters with overlapping black (i.e., foreground) pixels. It would also be desirable to provide an image recognition system that is capable of recognizing machine generated text in graphic images using font metrics information that is readily obtainable.

SUMMARY OF THE INVENTION

The present invention can be used for recognizing machine generated text and icons contained in a graphical layout (e.g., a binary image). Thus, the invention can be used to provide automated processes for translating an unknown page layout file format into a known file format, such as HTML and XML. The invention can also be used to allow application programs to intelligently recognize (or "see") machine generated output (e.g., output from other application programs, the operating system, a remote computer, etc.) and automatically take actions based on what it sees.

The term "Deterministic Finite Automaton (DFA)" is taken to mean any automated system whereby a next state is entirely determined by a current input and a current state. According to a first aspect of an embodiment of the present invention, a method for recognizing machine generated character glyphs or icons from graphic image includes obtaining adjacent pixels from the Graphical image. The method further includes processing the pixels using a deterministic finite a automaton (DFA) until at least one character of text or icon is recognized.

According to another aspect of an embodiment of the present invention, a method for constructing a deterministic finite automaton (DFA) for recognizing text in a graphic image includes collecting bitmaps for characters of text defined in a font instance. The method further includes sorting all collected bitmaps, and generating the DFA from the sorted bitmaps.

According to a further aspect of an embodiment of the present invention, a method for generating a file of known format from a graphic image containing text includes forming rectangles of text in the graphical image. The method further includes defining precise boundaries of the text rectangles, and generating the file of known format based on the text contained in the rectangles and the precise boundaries of the rectangles.

According to a yet another aspect of an embodiment of the present invention, a method for positioning text in a page layout using a graphical user interface (GUI) includes positioning a text caret at a first location in the page layout. The method further includes entering the text, wherein the dynamic text rectangle is automatically defined at the first location to contain the text upon the text being entered.

According to a still another aspect of an embodiment of the present invention, a method for translating a page layout that is specified as a set of rectangular regions into corresponding HTML tables includes defining a parent rectangle for the page layout. The method further includes finding a set of child rectangles for every parent rectangle, and generating one HTML table for each of the parent rectangles to contain the associated child rectangles.

According to a different aspect of an embodiment of the present invention, a method for creating a dynamic menu within a GUI includes determining a context for the dynamic menu. The method further includes identifying a set of actions for the dynamic menu based on the context, and displaying the set of actions for selection by a user.

According to another aspect of an embodiment of the present invention, a method for constructing a deterministic finite automaton (DFA) for recognizing machine generated text or icon in a graphic image in a single pass includes deriving a minimal bounding box for each text item or icon that is to be recognized in the graphic image. The method further includes merging all bounding boxes together, and constructing a DFA recognizer from the merged bounding boxes.

According to yet another aspect of an embodiment of the present invention, a method for automatically controlling a first program running on a first computer using a second program, the first program generating a screen image including text and icons, includes constructing a deterministic finite automaton (DFA) capable of recognizing text and icons. The method further includes executing the second program on a second computer, the second program having access to the DFA to enable the second program to recognize text and icons in the screen image. The method also includes instructing the second program to recognize text or an icon in the screen image and to manipulate the first program in a predetermined manner when the text or icon is recognized.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

FIG. 3 shows a monochrome character bitmap for an "f" character in TrueType, "Times New Roman", bold, italic 24 point font, along with the hexadecimal numerical representations of the corresponding pixel columns.

FIG. 6 shows sample C++ code for synthesizing a bitmap for a triple overlap sequence.

FIGS. 8A–25A each show bitmaps for four hypothetical characters.

FIGS. 8B–25B each show a state transition matrix that corresponds to the recognition of the hypothetical bitmaps of the four characters shown in FIGS. 8A–25A, respectively.

FIG. 30 shows the bitmaps for three adjacent characters where the first and second characters overlap each other even with another character between.

FIG. 31 shows the bitmaps for two adjacent "f" characters along with the hexadecimal numerical values and the DFA states corresponding to each column of pixels in the bitmaps.

FIG. 35 shows sample C++ code for obtaining one 32-bit vertical column of pixels from a vertical monochrome representation of the screen.

FIG. 37 shows sample C++ structures for defining text rectangles on the screen.

FIG. 38 shows the result of the DFA recognition process after all the text has been divided up into text rectangles.

FIG. 40 shows a screen containing two contiguous text areas with overlapping minimal bounding boxes.

FIG. 41 shows the screen of FIG. 40 after dividing one of the overlapping minimal bounding boxes into two non-overlapping minimal bounding boxes.

FIG. 42 shows the screen of FIG. 41 after creating two spacing rectangles (A) and (B).

FIG. 47 shows sample C++ code for recognizing overlapping glyphs of characters.

FIG. 52 shows sample C++ code for obtaining the next pixel column from a vertical monochrome representation of the screen.

FIGS. 53A–53F show sample C++ data structures and functions used in determining the dimensions of a character's bitmap.

FIG. 54 shows sample C++ code used for translating a monochrome horizontal bitmap into a vertical bitmap.

FIG. 55 shows alternative sample C++ code used for determining overlapping characters.

Figure 1:
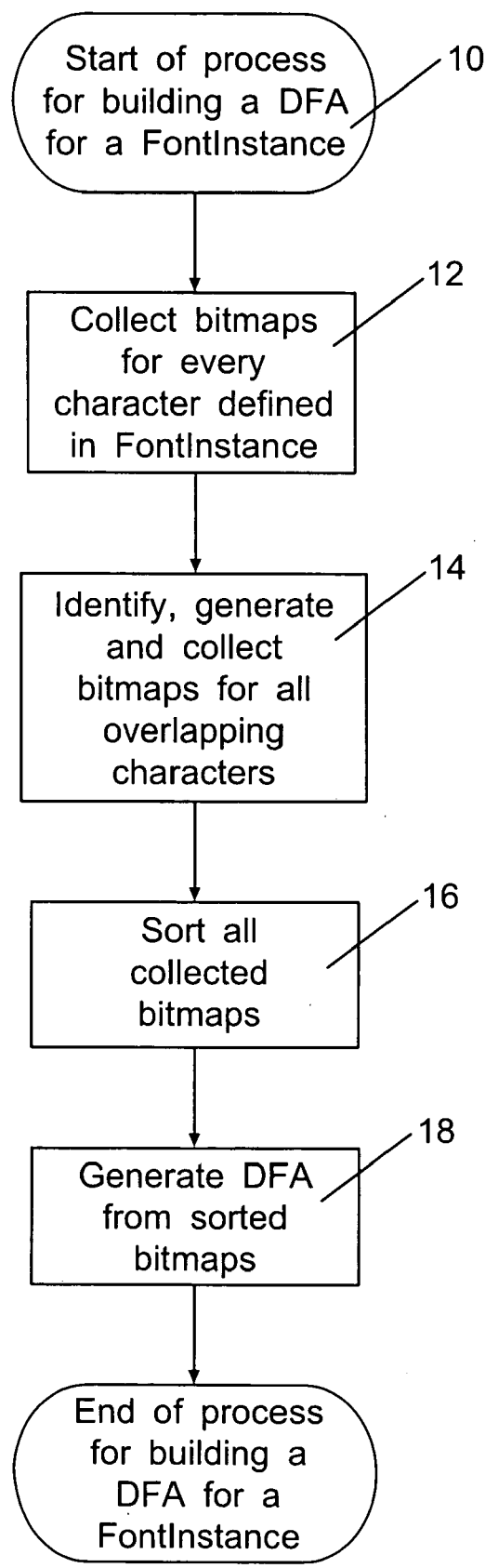
FIG. 1 shows a logic flow diagram of an exemplary process for building a DFA for a FontInstance.

Before explaining several preferred embodiments of the present invention in detail it is noted that the invention is not limited to the details of construction or the arrangement of components set forth below or illustrated in the drawings. The invention is capable of other embodiments and being practiced or carried out in various ways.

DETAILED DESCRIPTION OF THE PREFERRED EMBODIMENTS

Before describing a number of preferred embodiments, it should be noted that a detailed explanation of the present invention is facilitated by the use of certain mathematics and/or computer programming code. Where the mathematics and/or programming code is/are required for a complete understanding of particular aspects of the present invention, it has been provided below in the detailed description of the preferred embodiments. Additional mathematics and programming code is provided in a series of annexed appendices A–G to which the mathematically inclined reader or skilled programmer is directed.

In describing the preferred embodiments below, certain phraseology and terminology will occasionally be utilized. For example, "FontInstance" will be used below for referring to a font having a particular name, style and point size. It should be understood that such phraseology and terminology is for purposes of description only and should not be regarded as limiting. For example, "FontStyle" includes every combination of known styles for the particular font name (e.g., regular, bold, italic, underline and strikeout), and "FontPointSize" (or simply "FontSize") includes every possible point size for a particular font name (or "FontName"). Moreover, the terminology "process," "subprocess" and "step" is used below in referring to aspects of the preferred embodiments which are described at different levels of detail, but these terms should be considered substantially interchangeable for most other purposes.

Referring now to FIG. 1, a process 10 for building a DFA for a particular FontInstance is shown in a high level (i.e., abstract or general) view. Process 10 includes a number of subprocesses for constructing the DFA. In particular, process 10 includes a subprocess 12 for collecting bitmaps of every character defined in a particular FontInstance, a subprocess 14 for identifying, generating and collecting bitmaps for all overlapping characters, a subprocess 16 for sorting all collected bitmaps, and a subprocess 18 for generating a DFA from the sorted bitmaps. The details of subprocesses 12–18 will now be described.

Figure 2:
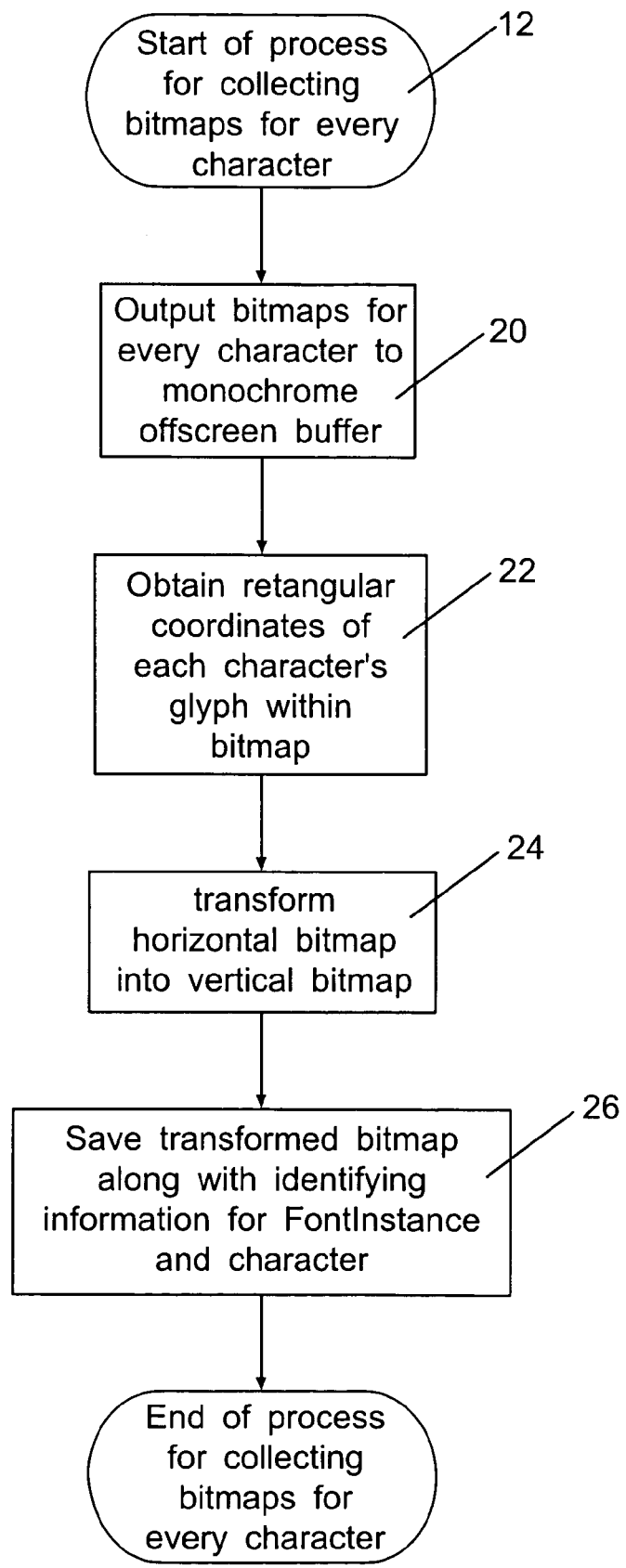
FIG. 2 shows a logic flow diagram of an exemplary process for collecting bitmaps for every character in the process of FIG. 1.

Turning initially to FIG. 2, subprocess 12 for collecting the set of bitmaps for every character defined in a FontInstance will now be described at a lower (or more detailed) level. Subprocess 12 begins with a step 20 which involves outputting the set of bitmaps for every character defined in the FontInstance to a monochrome (e.g., black and white) off-screen (i.e., device independent) bitmap, one at a time. In the MICROSOFT ("MS") WINDOWS® architecture, this may be accomplished using the TextOut( ) function. In other architectures, the specific details of the outputting step may vary, but persons skilled in the art will know how to do perform the operation. Similarly, persons skilled in the art will also understand there are a number of alternatives ways to perform this task within the MS WINDOWS® architecture, e.g., it may be possible to use a device dependent bitmap.

According to a second step 22 of subprocess 12, the rectangular coordinates of each character's glyph within the bitmap are obtained as each glyph is output. In a preferred embodiment, the pixel width of the character may be stored in an array (e.g., a one-dimensional array of integers called CharPixelWidths[256]) as the rectangular coordinates are gathered. As persons skilled in the art will recognize, the character's ASCII value may be used to provide a convenient index into the array. (See Appendix A).

A third step 24 of subprocess 12 involves transforming the horizontal bitmap (i.e., the rows of pixels obtained from the glyph) into a vertical bitmap (columns of pixels) that is required to facilitate subsequent processing. In this vertical bitmap, the one bit may be used to represent the foreground color of text and the zero bit may be used to represent the background. (See Appendix B).

In a fourth (and final) step 26 of subprocess 12, the results of this transformation process are saved (e.g., as variable length strings of 32-bit integers) along with the identifying information for the FontInstance and character.

To further facilitate the explanation of subprocess 12, it may be helpful to briefly turn to FIG. 3. FIG. 3 shows three columns 28, 30 and 32 of data associated with a lowercase "f" in the following "FontInstance": "font name"=Times New Roman; "font style"=bold and italic; and "font size"=24 point. Column 28 includes the bitmap (i.e., table of 0 and 1 pixel values) for the aforementioned "f" character in the specified FontInstance. To facilitate readability, the bitmap has been translated (i.e., rotated 90° in a clockwise direction relative to its normal upright orientation) so that the first vertical pixel column of the bitmap for "f" (which is labeled "0" in the "bitmap column") corresponds to the first horizontal row of pixels in the bitmap table of FIG. 3. Column 30 shows the corresponding hexadecimal value for each vertical column (or "slice") in the bitmap for the "f" character. As persons skilled in computer programming and/or mathematics will understand, the hexadecimal values shown in column 30 can be derived by breaking each slice of thirty-two (32) pixels into eight (8) blocks of four (4) pixels, and then converting the associated binary numbers (where a 0 value is substituted for each period "." pixel and a 1 value is substituted for each "0" pixel) into their associated hexadecimal values. For example, the hexadecimal value for the thirty-two pixels in bitmap column 8 can be derived as follows: pixels " . . . "=binary 0000=hex 0; pixels " . . . 00"=binary 0011=hex 3; pixels "0000"=binary 1111=hex f; pixels "000."=binary 1110=hex e; pixels " . . . "=binary 0000=hex 0; pixels " . . . 00"=binary 0011=hex 3; pixels " . . . "=binary 0000=hex 0; and pixels " . . . . "=binary 0000=hex 0. The eight hex values can be concatenated to give the overall hex value of 3fe0300. Persons skilled in the art will readily understand how to create programming code to automatically perform this translation.

Figure 4:
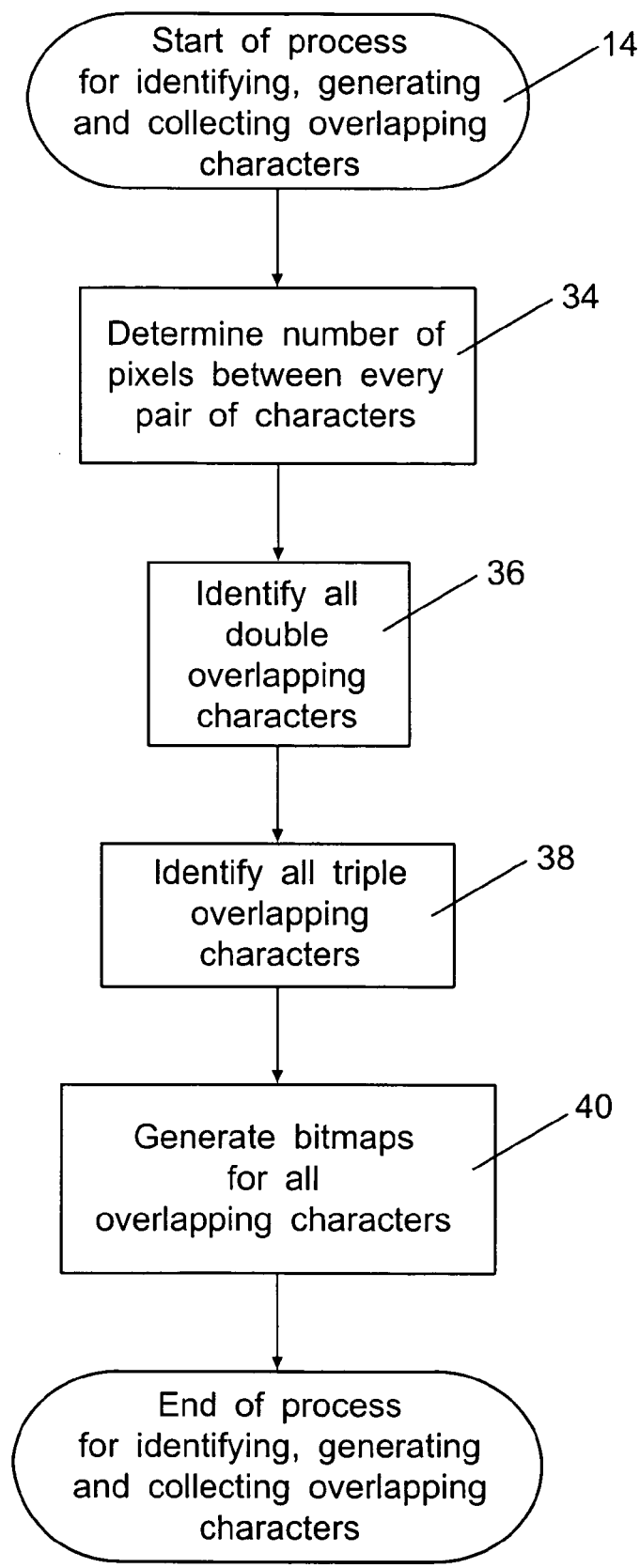
FIG. 4 shows a logic flow diagram of an exemplary process for identifying, generating and collecting overlapping characters in the process of FIG. 1.

Returning now to process 10 shown in FIG. 1, subprocess 14 for identifying, generating and collecting the bitmaps for all overlapping characters will now be described in detail with reference to FIG. 4. As illustrated, subprocess 14 begins with a step 34 which involves determining the number of pixels between every character. As persons skilled in the art will appreciate, this can be done in a number of different ways. For example, one way which works for all fonts, including PostScript fonts, is provided in Appendix C. Another way, which is faster and works for at least TrueType and Raster fonts, is provided in Appendix D. To facilitate the understanding of those reader's who are not mathematically inclined and/or skilled programmers, the method associated with Appendix C will now be described. However, this example should not be viewed as limiting in any way because persons skilled in the art will recognize that many other methods could be derived for determining the number of pixels between every character.

According to the method utilized in Appendix C, a two dimensional array of 32-bit integers is instantiated as PixelsBetween[256][256]. For convenience, the first and second characters' ASCII values may be used as the indexes into this array.

For ease of programming, the PixelsBetween array may be populated with negative numbers for particular pairs of characters. In particular, this may be done to indicate that the two characters of the pair have overlapping glyphs when positioned in sequence. As persons skilled in the art will appreciate, when such overlapping glyphs exist the corresponding bitmaps for the pairs of characters will share one or more vertical columns.

According to a second step 36 of subprocess 14, all cases of "double overlap" (i.e., instances where two characters share one or more pixel columns) are identified. This is accomplished by inspecting the PixelsBetween array to find all values less than zero. All these cases are considered to be overlapping glyphs. This includes the case where the foreground (e.g., black) pixels overlap, as well as the case where they do not overlap.

A third step 38 of subprocess 14 involves determining all cases of "triple overlap" (i.e., instances where two characters overlap each other even when another character is in between). This occurs whenever the sum of the number of pixels between the first two characters, plus the pixel width of the second character and the number of pixels between the second and third characters, is less than zero. In mathematical terms, this triple overlap can be seen to occur whenever the following relationship holds:

$$\text{PixelsBetween1 and2} + \text{PixelWidthChar2} + \text{PixelsBetween2and3} < 0 \qquad (1)$$

This triple overlap situation can also occur with a space character located between the two other characters.

In a preferred embodiment, steps 36 and 38 may be executed by program code that includes three nested loops. The first (outmost) and second (middle) loops would proceed through every ASCII value that is defined in the FontInstance. Within the second level nested loop, pairs of characters would be tested for double overlap and for triple overlap with an embedded space in-between. Within the third (innermost) loop, all combinations of triple overlap besides embedded space would be tested. If any form of overlap is found, the bitmap for the overlap could be generated as specified below in a step 40. (See Appendix D for another method of determining the overlapping bitmaps).

In step 40 of subprocess 14, the bitmaps of all overlapping characters are generated. As persons skilled in the art will recognize, there are several methods for generating the bitmaps of the overlapping characters. For example, the operating system could be used to produce the bitmap of the two adjacent characters, which could then be transformed as specified above in connection with step 24 of subprocess 12. In a preferred embodiment, however, the combined bitmaps are synthesized from the individual bitmaps that were previously collected. This technique is substantially faster than the former. Using the previously obtained PixelsBetween array (or the ABC widths in Appendix D), it is possible to derive the exact columns where the previously obtained bitmaps of the individual characters overlap.

Figure 5:
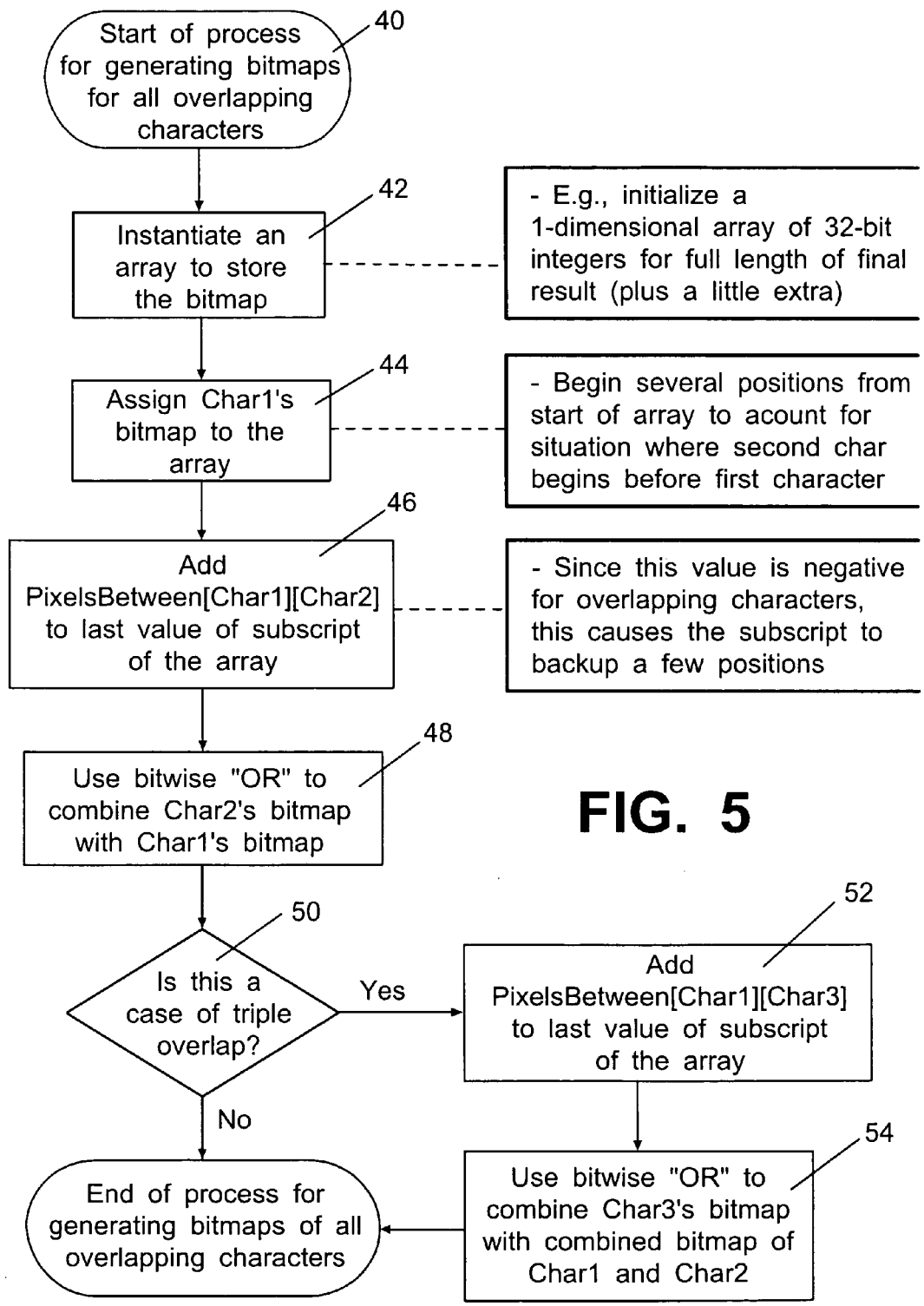
FIG. 5 shows a logic flow diagram of an exemplary process for generating bitmaps for all overlapping characters in the process of FIG. 4

With reference to FIG. 5, the details of subprocess 40 for generating bitmaps of all overlapping characters will be described in detail. Subprocess 40 begins with a first step 42 of instantiating an array to store the overlapping bitmaps. The array may be of any size and type as desired for the particular application at hand. In subprocess 40, a one dimensional array of 32 bit integers is preferably instantiated and initialized to zeros for the full length of the final result plus a few extra positions (for reasons explained below).

In a second step 44 of subprocess 40, the bitmap for the first character (Char1) is assigned to the array. Rather than assigning the Char1 bitmap to the array starting at position 0, however, the Char1 bitmap is preferably assigned to the array starting several tmMaxCharWidth positions in. If the Char1 bitmap does not begin a few positions in, a sufficiently large negative PixelsBetween amount could result in a negative subscript for the array which would cause an abnormal program termination. The reason for this is that in some cases, the number of pixels between two characters is still less than zero even when the width of the first character is added in, i.e., the second character may in some instances begin before the first character. By using the value provided by the MS WINDOWS® GetTextMetrics function (called tmMaxCharWidth) for the "few positions in," this potential problem can be avoided.

According to a third step 46 of subprocess 40, the value stored in PixelsBetween[Char1][Char2] is added to the last value of the subscript of the combined bit array. Since the PixelsBetween value is negative for overlapping characters, this causes the subscript to back up a few positions. However, the subscript will not be less than zero because of the extra padding noted above.

Next, a fourth step 48 of subprocess 40 is used to perform a bitwise "OR" to combine the second character's bitmap with that of the first character.

Finally, if a fifth step 50 determines this is a case of triple overlap, then a sixth step 52 is used to add the value of Pixelsbetween[Char2][Char3] to the array subscript and a seventh step 54 is used to perform a bitwise "OR" to combine the third character's (Char3's) bitmap with the other two bitmaps. Otherwise, the process ends after step 50.

By way of example and not limitation, FIG. 6 shows an excerpt of programming code that may be used for synthesizing a bitmap for triple overlap from individual bitmaps, of three overlapping characters. The code sample is written in a computer programming language known as C++. Persons skilled in the art will recognize that other programming languages and alternative algorithms could be used to perform the required synthesis. Both the process diagrammed in FIG. 5 and the sample C++ code shown in FIG. 6 are assumed to be included in the nested loops that determine the set of overlapping characters. Thus overlapping character bitmaps are generated as they are determined to be overlapping.

Returning now to process 10 of FIG. 1, subprocess 16 for sorting all the collective bitmaps may be performed using many different algorithms that are well known to those skilled in the art. Some examples of these known algorithms are the Quick Sort, the Bubble Sort, Selection Sort, the Merge Sort, the Heap Sort, the Binary Sort, and the Radix Sort. The sorting may be performed on the data which preferably is stored as left justified variable length strings of integers. According to a preferred embodiment, the strings of integers are sorted essentially alphabetically so that left most elements of these strings have the highest sort priority and shorter strings come before longer strings.

Figure 59:
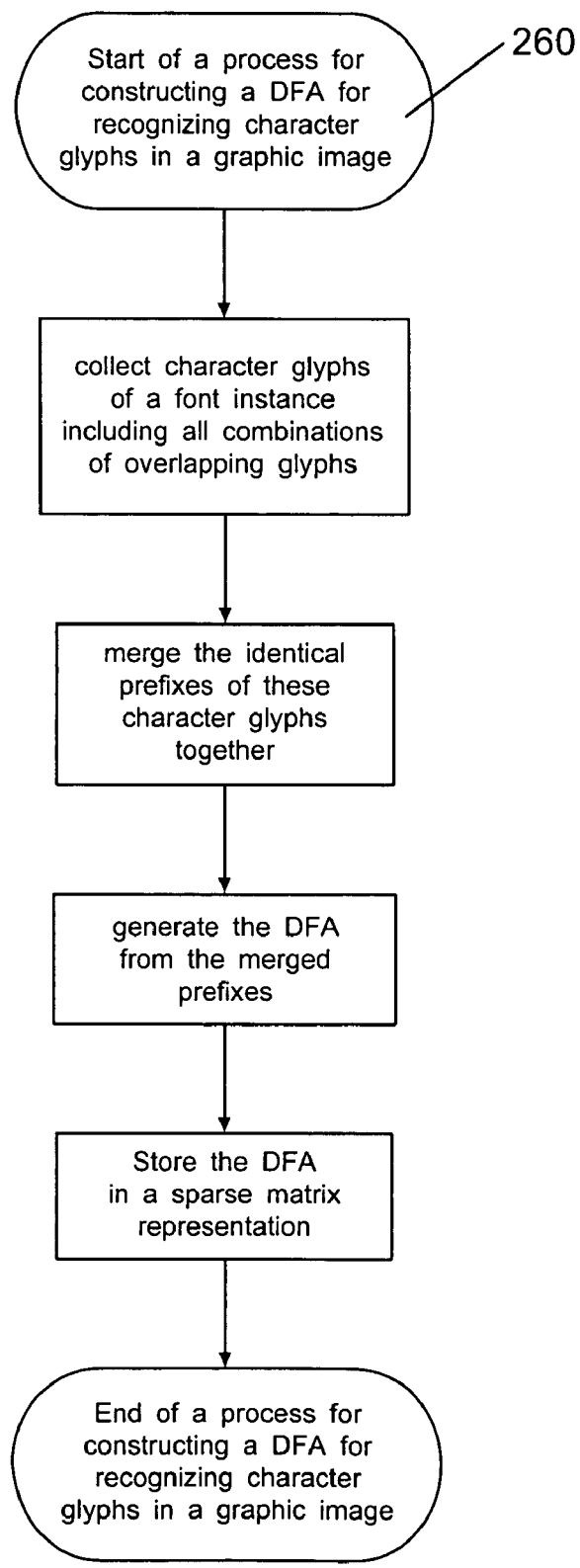
FIG. 59 shows a logic flow diagram of an exemplary process for constructing a DFA for recognizing character glyphs in a graphic image.

Finally, subprocess 18 is performed to generate a DFA from the sorted strings of integers (as described in further detail below). FIG. 59 generalizes the preceding process as outlined in FIG. 1 and elaborated above.

Figures 7A, 7B, 7C:
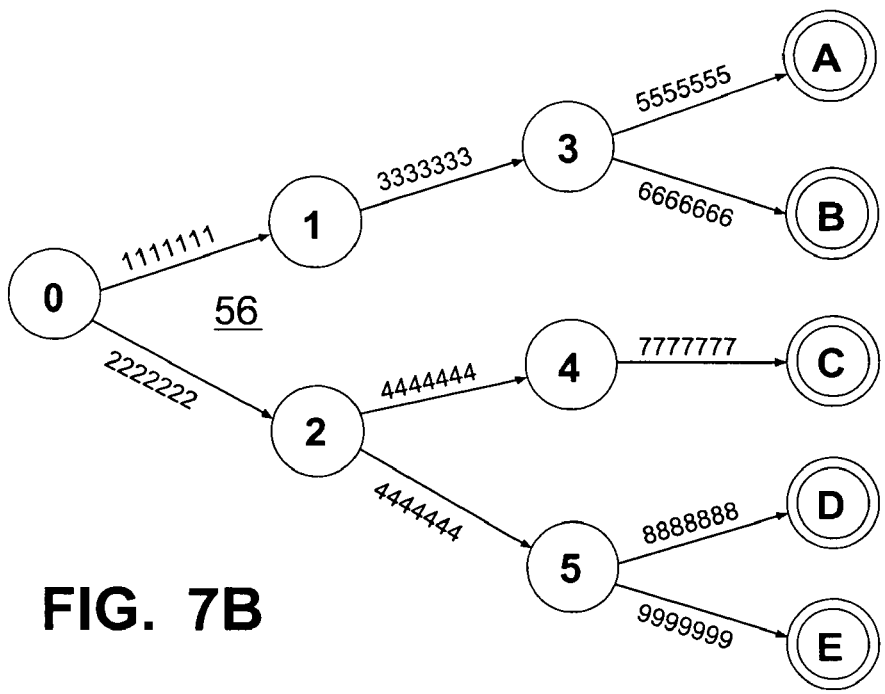
FIG. 7A shows a set of five bitmaps that represent five hypothetical characters, each bitmap being exactly three columns wide.
FIG. 7B shows a state transition graph that corresponds to the recognition of the five hypothetical characters shown in FIG. 7A.
FIG. 7C shows the state transition graph of FIG. 7B translated into the form of a state transition matrix used by a process of the present invention.

Referring now to FIGS. 7A–7C, a simplified example of the process for constructing a DFA for hypothetical characters (A) through (E) will be described. As best seen in FIG. 7A, characters (A) through (E) in the illustrated example each comprise exactly three vertical columns of pixels with each pixel column being represented by a bitmap between 1111111 and 9999999. The bitmaps for these characters can be transformed into a DFA recognizer by techniques that are well known to persons skilled in the art. For the illustrated example, the DFA recognizer can be constructed by merging the identical prefixes together, and then linking each prior column to the subsequent column for which it forms the prefix. Performing this transformation process results in a state transition (or directed) graph 56 such as the one, shown in FIG. 7B.

As is conventional, the circular vertices (labeled 0–5 and A–E) in graph 56 denote states, and the set of directed edges (labeled by the individual bitmaps 1111111–9999999 of the pixel columns) denote the transitions. In addition, the initial or start state (labeled 0) is indicated by the arrow pointing to it that points from no other vertex, and the final states (labeled A–E) are indicated by double circles.

As persons skilled in the art will understand, the DFA recognizer of graph 56 begins by taking the first bitmap of the input string and transitioning based on a comparison of that input string to the labels. Although not specified in graph 56 to avoid clutter, every state has an additional transition back to the start state (0). The DFA recognizer makes this transition whenever the input value fails to match. If the DFA halts at a final state, then the DFA is said to have accepted (or recognized) the input string it was originally given. Upon reaching a final state, the DFA recognizer resets back to the start state.

As persons skilled in the art will understand, there are two separate pointers that are used for tracing through a DFA: one for indicating the current state of the DFA and one for indicating the current input position (which may be thought of as the screen cursor). Thus, in the case where a pattern has begun to match yet later fails to match, the input data pointer must be reset to the position immediately after the position where this failed matching began. Most often (when left to right, then top to bottom "Book Reading" order is being followed for inputting data from the screen), this position will be the next horizontal column to the right. In the case where the DFA is on the last column of any given pixel row (except the lowermost pixel row), the input position pointer is moved to the first pixel on the next pixel row.

Although a state transition graph such as graph 56 provides a convenient form of a DFA recognizer for a human being to follow, it is not easily implemented by a computer program. By contrast, FIG. 7C shows another (functionally equivalent) form of a DFA recognizer that is easily implemented by a computer program. In particular, FIG. 7C shows the DFA recognizer in the form of a state transition matrix 58. As can be seen, every state in matrix 58 has all of its possible input values appearing in sorted order. Because each state in matrix 58 has its transition based on the success or failure of the last input data, a binary search can easily be conducted in matrix 58 to search for the node's transition values. Successful binary search results in transition to the next state, whereas a failed binary search results in a transition back to the start state.

Additional examples of DFA recognizers in the form of state transition matrices are provided in connection with FIGS. 8A–25B. In each case, the tables shown in FIGS. 8A–25A represent the sorted list of the character's bitmaps as strings of hexadecimal integers, while the tables shown in FIGS. 8B–25B represent the translations of the associated tables into the DFA recognizers. By way of example and not limitation, the tables of FIGS. 8B-25B also show one specific example of exactly how the DFA can be stored as a sparse matrix that is implemented using binary search. Character bitmaps 1111111 through FFFFFFF are intended as simplified (i.e., hypothetical) representations of character bitmaps in hexadecimal form rather than bitmaps of actual characters. Each item represents one vertical column of the hypothetical character's bitmap. The left most column of data (in each of the "A" tables) represents the left most column of the character's vertical bitmaps. This simplified representation only includes four characters ID#1 through ID#4, with as many as three columns of vertical bitmaps. For purpose of comparison, a character bitmap for an actual character is included in FIG. 3 discussed above. According to the format that should be now well understood, the top row of hexadecimal values in FIG. 3 represents the left most column of the character's bitmap.

In each of the DFA recognizers shown in FIGS. 8B–25B, the terms "Next", "Offset" and "ActionCode" are used. These terms have the following meanings: "Next" is the state that the DFA will transition to if it sees the input that it is looking for; "Offset" is the amount added to the "Next" field to find the end of the list that "Next" points to; and "ActionCode" specifies the next action taken by the DFA. Thus, if "Next" points to DFA state 1, the "Offset" is 2, and "ActionCode" is binary search, then the DFA will conduct a binary search of the transition values associated with all the DFA states between 1 and 3 (=1+2).

In the illustrated examples, a number of different Action-Codes are provided. These ActionCodes have the following meanings:

| ActionCode | Meaning |
|---|---|
| _BSEARCH | This instructs the DFA to perform a binary search of a list. It uses the fields "Next" and "Offset" to find the beginning and the end of the list to be searched. |
| _NEXTNODE | This instructs the DFA to move to the state pointed to by the "Next" field and compare this to the input value. This is a special case of _BSEARCH where the list only has a single item. |
| _SUBSTR_NEXT | This is the same as _NEXTNODE, except if the bitmap subsequently fails to be recognized, then the substring bitmap that has already been recognized is reported. This also requires setting the screen cursor to the first column after the last column of the most recently matched substring. The "Next" field minus one points to the recognition data for this substring. |
| _SUBSTR_BSEARCH | This is the same as _BSEARCH, except if the bitmap subsequently fails to be recognized, then the substring bitmap that has already been recognized is reported. This also requires setting the screen cursor to the first column after the last column of the most recently matched substring. The "Next" field minus |

| ActionCode | Meaning |
|---|---|
|  | one points to the recognition data for this substring. |
| _DUPLICATE | This indicates the DFA has just recognized a set of bitmaps that are identical. The "Next" field points to a list of the duplicate identifiers that were just matched, so that it can report this list. |
| _RECOGNIZE | This is the state where we recognize the character's bitmap as corresponding to a particular character. For ease of reading, this state has been shown on the printout as ID#1 through ID#4. This action returns the identifier of the character that was matched. |

According to a preferred embodiment, the forgoing ActionCodes may be implemented within a "switch" statement such that a sequential "jump table" is generated in the compiled executable code. This form of implementation is advantageous in that it provides for a constant time relationship between the number of ActionCodes and the execution time that it takes to select a particular ActionCode.

Figure 26:
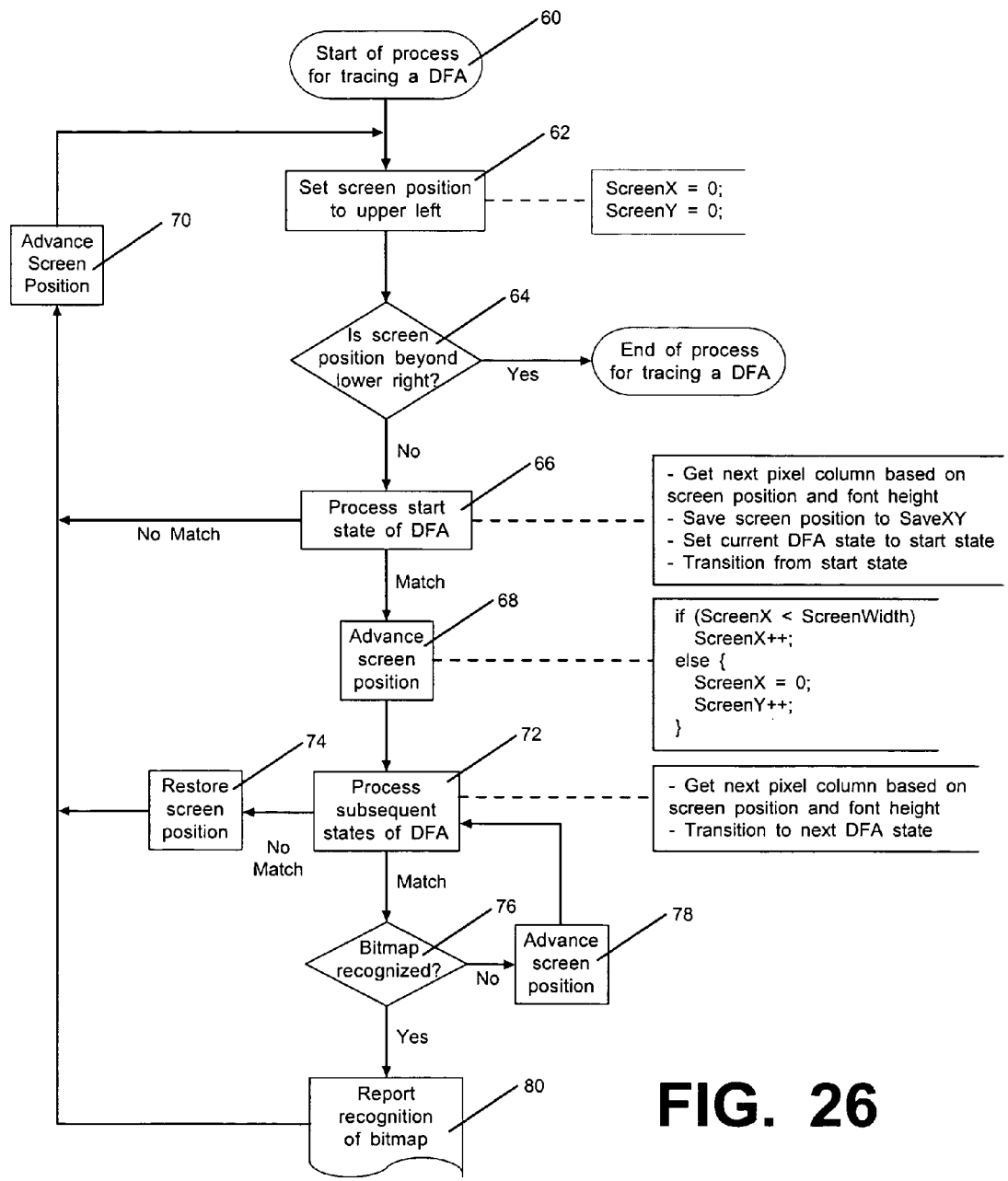
FIG. 26 shows a logic flow diagram of an exemplary process for tracing through a DFA recognizer.

Turning now to FIG. 26, a general process 60 for tracing through a DFA (such as any of the tables shown in FIGS. 8B–25B) will be described. Process 60 begins with a step 62 which sets the current screen position to the upper left. For example, variables ScreenX and ScreenY are both set to 0 in the illustrated example. If a step 64 determines that the current screen position is beyond the lower right of the screen (which cannot occur on the initial pass), then the program flow ends. Otherwise, the program flow proceeds to a step 66 which processes the start state.

In step 66, a number of substeps are performed to process the start state. In particular, the next vertical column of pixels is obtained from the vertical monochrome translation of the screen (described in detail further below). (See FIG. 52 for an exemplary excerpt of programming code for getting the next pixel column based on ScreenX, ScreenY and tmHeight). The size of the pixel column obtained in this substep will depend upon the font height of the FontInstance that the DFA is designed to operate on. Step 66 also performs the substep of saving the current screen position (e.g., SaveXY.X=ScreenX and SaveXY.Y=ScreenY) so that it can be restored later if necessary. Step 66 further performs the substep of setting the current state of the DFA to the start state (i.e., state 0). Finally, step 66 performs the substeps of looking up the value of the pixel column in the list pointed to by the Next and Offset fields of the current state of the DFA and performing the associated ActionCode. In the general case, this lookup will be performed by a binary search (indicated by the ActionCode "_BSEARCH"). However, if Offset is 0 or the ActionCode is "_DUPLICATE" then a binary search need not be conducted.

Assuming a match occurred in step 66 (i.e., the value of the pixel column was found in the DFA states located between Next and Next+Offset), the screen position is advanced at a step 68. In the illustrated embodiment, the screen position is advanced using the following algorithm: if the current column is less then the screen width (i.e., ScreenX<ScreenWidth), then the column is incremented by one (i.e., ScreenX++); otherwise, the screen column is set to 0 (i.e., ScreenX=0) and the screen row is incremented by one (i.e., ScreenY++). Of course, if something other than "Book Read" order is being used, the algorithm for advancing the screen position would be changed accordingly. If no match occurred in step 66, then flow proceeds back to step 64 through a step 70 which also advances the current screen position.

Returning again to step 68 and the case were a match occurred in step 66, program flow proceeds to a step 72 which processes all subsequent states of the DFA until either a character is recognized or a failure to match the value of the pixel column with a DFA state occurs. Step 72 performs a number of substeps to process these subsequent states. For example, step 72 performs the substep of obtaining the next column of pixels based on the current screen position (i.e., the values of ScreenX and ScreenY) and the expected font height. Step 72 also performs the substeps of looking up the value of the pixel column in the list pointed to by the Next and Offset fields of the current state of the DFA, and performing the associated ActionCode.

If at any time during step 72 a match fails to occur, then the screen position is restored at a step 74 to where it was at prior to execution of step 66. If a successful match occurs in step 74, but the character is not yet recognized (as determined at step 76), the screen position is advanced at a step 78 and step 72 is repeated. If during this looping the character is recognized at step 76, then the recognition is reported at step 80 and the screen position is advanced at step 70. From step 70, flow returns to step 64 which (as noted above) terminates the process if the screen position has advanced beyond the legal boundaries of the screen.

Thus, the following general comments can be made regarding procedure 60. Every time a successful recognition occurs, the DFA ActionCode causes the following two events to occur: (1) the screen cursor (current screen pixel coordinate) is advanced to the next column, and (2) the DFA is advanced to the next state that was specified by the last state, combined with the current input column of pixels from the screen. Every time a recognition fails, the screen cursor moves to the column immediately to the right of the column where matching began and the current DFA state is reset to the start state. State transition occurs primarily though a binary search. The binary search looks for the current column of pixels from the (translation of) the screen in the sorted list of nodes pointed to by the last state. The binary search looks for a column of pixels in a sorted list of nodes.

To understand this process more thoroughly, the skilled computer programmer is directed to the accompanying Computer Program Listing Appendix (on the enclosed identical CD's). The file named explain.txt provides an explanation of these files. These files provide a fully operational working example of a DFA recognizer for the TrueType font, "Times New Roman", bold, italic, 24 point.

With reference to FIGS. 27–30, examples of the DFA build process for several different types of overlapping glyphs will be provided. The most common type of the overlap occurs between two characters 82 and 84 (both shown as a lower case "f"), which is termed "double overlap". According to a preferred embodiment, this type of overlap is handled by linking the last DFA state of the overlapping bitmap (called the ResumeFromColumn) to its corresponding state within the second character's original, nonoverlapping bitmap (called the Resume2Column). This linked arrangement is advantageous in that it allows the DFA process to handle overlapping sequences of arbitrary length. In this case, we can recognize the first character 82 as soon as the entire overlapping portion has been processed.

Figure 27:
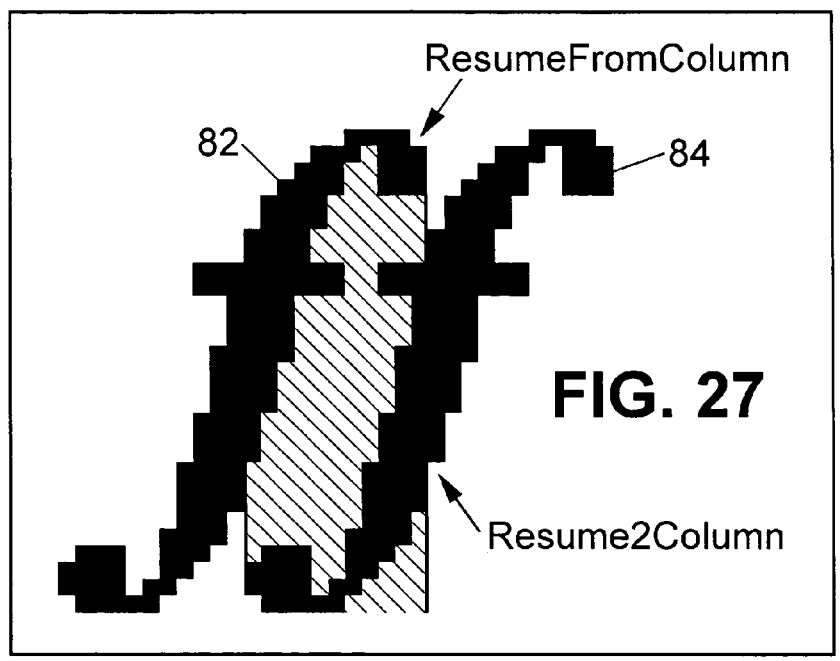
FIG. 27 shows the bitmaps for two adjacent characters that overlap each other.
Figure 28:
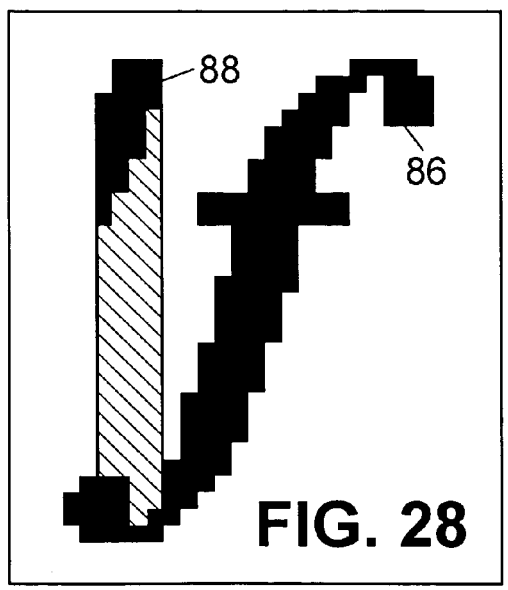
FIG. 28 shows the bitmaps for two adjacent characters where the first character underlaps the second character.

Referring now to FIG. 28, the example depicted in this case includes a second character 86 (e.g., a lower case "f") that underlaps the first character 88 (e.g., an apostrophe) This situation is treated the same as in the prior example shown in FIG. 27.

Figure 29:
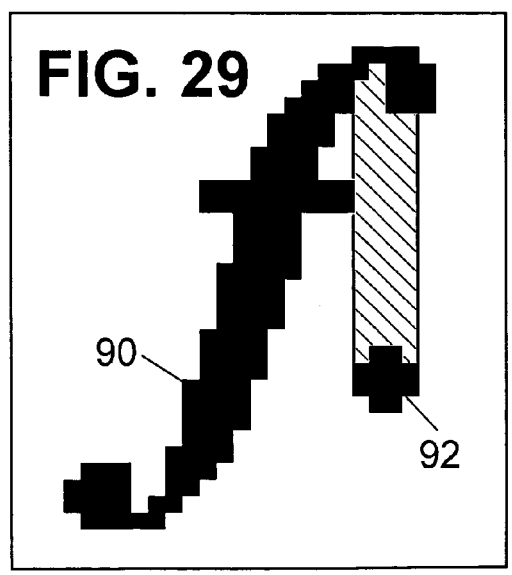
FIG. 29 shows the bitmaps for two adjacent characters where the first character more than completely overlaps the second character.

In FIG. 29, the example includes a first character 90 (e.g., a lower case "f") that completely overlaps a second character 92 (e.g., a period punctuation mark). This situation is handled by processing the whole bitmap and recognizing both characters 90 and 92 at the same time. The DFA skips the step of linking to the Resume2Column.

In the example of FIG. 30, a case of triple overlap is shown in which two characters 94 and 96 (e.g., both shown as a lower case "f") overlap each other even when another third character 98 (e.g., a period) is in-between. This situation is processed the same as in the prior example, except that the last column 100 of the overlapping bitmap is linked to the fourth (i.e., first nonoverlapping) column 102 of the third character 98.

According to a preferred embodiment, the link between the ResumeFromColumn and its corresponding Resume2Column is implemented in the DFA through another ActionCode: _RECOGNIZE_RESUME. This _RECOGNIZE_RESUME ActionCode is placed in the DFA to correspond to the ResumeFromColumn of the overlapping sequence. This ActionCode tells the DFA to recognize the prefix to the overlapping sequence, and then to resume its processing in the DFA state that corresponds to the Resume2Column of this overlapping sequence.

To make this link concept more clear, a detailed example of its use will be provided in connection with a double character bitmap 104 shown in FIG. 31 and an associated DFA recognizer 106 (the relevant portions of which are shown below as a state transition matrix). In FIG. 31, it can be seen that bitmap 104 therein is identical to the bitmap of the double overlapping characters 82 and 84 (i.e., the two overlapping "f" characters) shown in FIG. 27 except that the foreground pixel of each character 82, 84 is indicated by a "0" while the background pixels are indicated by dots ".". FIG. 31 also differs from FIG. 27 in that it additionally provides the corresponding hexadecimal integers 106 for each vertical pixel column (which are actually represented as horizontal rows of bits in FIG. 31 due to the above-described translation of the bitmap) along with the corresponding DFA states 108.

The state transition matrix of a suitable DFA recognizer 106 for processing bitmap 104 is in relevant part as follows:

| DFA STATE | Hex Value | Next | Offset | ActionCode |
|---|---|---|---|---|
| 0* | 0 | 1 | 44 | _BSEARCH |
| 1 | 1 | 10795 | 1 | _BSEARCH |
| 2 | 2 | 9778 | 1 | _BSEARCH |
| 3 | 3E | 9764 | 1 | _BSEARCH |
| 4 | 40 | 9582 | 0 | _NEXTNODE |
| 5 | 78 | 9539 | 0 | _NEXTNODE |
| 6 | 1F0 | 9496 | 0 | _NEXTNODE |
| 7 | 200 | 9351 | 0 | _NEXTNODE |
| 8 | 3FC | 9297 | 4 | _BSEARCH |
| 9 | 400 | 9226 | 0 | _NEXTNODE |
| 10 | 800 | 9153 | 0 | _NEXTNODE |
| 11 | C00 | 9037 | 0 | _NEXTNODE |
| 12 | 6000 | 8986 | 0 | _NEXTNODE |
| 13 | 6300 | 8913 | 0 | _NEXTNODE |
| 14 | FC00 | 8793 | 0 | _NEXTNODE |
| 15 | 10000 | 8721 | 0 | _NEXTNODE |
| 16 | 18000 | 8677 | 0 | _NEXTNODE |
| 17 | 1F800 | 8411 | 1 | _BSEARCH |
| 18 | 60030 | 8338 | 0 | _NEXTNODE |

| DFA STATE | Hex Value | Next | Offset | ActionCode |
|---|---|---|---|---|
| 19 | 78000 | 8238 | 0 | _NEXTNODE |
| 20 | 7E000 | 8048 | 0 | _NEXTNODE |
| 21 | 7F000 | 7908 | 1 | _BSEARCH |
| 22 | 7F800 | 7679 | 0 | _NEXTNODE |
| 23 | F8000 | 7497 | 0 | _NEXTNODE |
| 24 | 100000 | 7241 | 2 | _BSEARCH |
| 25 | 180000 | 7084 | 1 | _BSEARCH |
| 26 | 1C0000 | 6661 | 2 | _BSEARCH |
| 27 | 1F0000 | 6315 | 0 | _NEXTNODE |
| 28 | 1F8000 | 6246 | 0 | _NEXTNODE |
| 29 | 1FE000 | 5973 | 0 | _NEXTNODE |
| 30 | 200000 | 2592 | 3 | _BSEARCH |
| 31 | 200070 | 2405 | 0 | _NEXTNODE |
| 32 | 300000 | 2074 | 1 | _BSEARCH |
| 33 | 30C300 | 2027 | 0 | _NEXTNODE |
| 34 | 380000 | 1886 | 1 | _BSEARCH |
| 35 | 3C0000 | 1779 | 0 | _NEXTNQDE |
| 36 | 3C02000 | 1507 | 0 | _NEXTNCDE |
| 37 | 4000000 | 1478 | 0 | _NEXTNODE |
| 38 | 403F800 | 1401 | 0 | _NEXTNODE |
| 39 | 7000000 | 1351 | 0 | _NEXTNODE |
| 40 | 8000000 | 1160 | 1 | _BSEARCH |
| 41* | C000000 | 148 | 3 | _BSEARCH |
| 42 | 10000000 | 95 | 0 | _NEXTNODE |
| 43 | 100003FC | 91 | 0 | _NEXTNODE |
| 44 | 18000000 | 52 | 0 | _NEXTNODE |
| 45 | 1FFFFFFF | 46 | 0 | _NEXTNODE |
| . | . | . | . | . |
| . | . | . | . | . |
| 148 | F800000 | 884 | 0 | _NEXTNODE |
| 149* | 1E000000 | 158 | 1 | _BSEARCH |
| 150 | 1E0003FC | 154 | 0 | _NEXTNODE |
| 151 | 1FFFFFFF | 152 | 0 | _NEXTNODE |
| . | . | . | . | . |
| . | . | . | . | . |
| 158* | 1E000000 | 164 | 1 | _BSEARCH |
| 159 | 1E0003FC | 160 | 0 | _NEXTNODE |
| . | . | . | . | . |
| . | . | . | . | . |
| 164 | 1C000000 | 747 | 1 | _BSEARCH |
| 165* | 1E000000 | 166 | 0 | _NEXTNODE |
| 166* | 10000000 | 167 | 0 | _NEXTNODE |
| 167* | 18000000 | 168 | 0 | _NEXTNODE |
| 168* | F000000 | 169 | 0 | _NEXTNODE |
| 169* | 7F00000 | 170 | 0 | _NEXTNODE |
| 170* | 3FE0300 | 171 | 0 | _NEXTNODE |
| 171* | 1FFE300 | 172 | 0 | _NEXTNODE |
| 172* | 7FFF00 | 173 | 1 | _BSEARCH |
| 173* | FFFC0 | 186 | 1 | _BSEARCH |
| 174** | C0FFFC0 | 175 | 0 | _NEXTNODE |
| 175** | 1E01FFF0 | 176 | 0 | _NEXTNODE |
| 176** | 1E003FF8 | 177 | 0 | _NEXTNODE |
| 177** | 1E0003FC | 178 | 0 | _NEXTNODE |
| 178** | 1000033E | 179 | 0 | _NEXTNODE |
| 179** | 1800030E | 180 | 0 | _NEXTNODE |
| 180** | F000003 | 181 | 0 | _NEXTNODE |
| 181** | 7F00001 | 182 | 0 | _NEXTNODE |
| 182** | 3FE030F | 183 | 0 | _NEXTNODE |
| 183** | 1FFE30F | 184 | 0 | _NEXTNODE |
| 184** | 7FFF0E | 185 | 0 | _RECOGNIZE_RESUME |
| 185** | "f" | 173 | 1 | _IDENTIFIER |
| 186* | 1FFF0 | 211 | 1 | _BSEARCH |
| 187 | C01FFF0 | 188 | 0 | _NEXTNODE |
| . | . | . | . | . |
| . | . | . | . | . |
| 211* | 3FF8 | 222 | 4 | _BSEARCH |
| 212 | 10003FF8 | 213 | 0 | _NEXTNODE |
| . | . | . | . | . |
| . | . | . | . | . |
| 222* | 3FC | 288 | 2 | _BSEARCH |
| 223 | 2003FC | 259 | 0 | _NEXTNODE |
| 224 | 80003FC | 243 | 1 | _BSEARCH |
| 225 | C0003FC | 235 | 0 | _NEXTNODE |
| 226 | 180003FC | 227 | 0 | _NEXTNODE |
| . | . | . | . | . |
| . | . | . | . | . |
| 288* | 33E | 316 | 4 | _BSEARCH |
| 289 | 20033E | 298 | 0 | _NEXTNODE |
| 290 | 800033E | 291 | 0 | _NEXTNODE |
| . | . | . | . | . |
| . | . | . | . | . |
| 316* | 30E | 366 | 13 | _BSEARCH |
| 317 | 20030E | 339 | 2 | _BSEARCH |
| 318 | 38030E | 333 | 0 | _NEXTNODE |
| 319 | 700030E | 327 | 0 | _NEXTNODE |
| 320 | C00030E | 321 | 0 | _NEXTNODE |
| . | . | . | . | . |
| . | . | . | . | . |
| 366* | 3 | 549 | 13 | _BSEARCH |
| 367 | 203 | 544 | 0 | _NEXTMODE |
| 368 | 6003 | 539 | 0 | _NEXTNODE |
| 369 | 10003 | 534 | 0 | _NEXTNODE |
| 370 | 18003 | 529 | 0 | _NEXTNODE |
| 371 | 7F803 | 524 | 0 | _NEXTNODE |
| 372 | 100003 | 479 | 2 | _BSEARCH |
| 373 | 180003 | 461 | 0 | _NEXTNODE |
| 374 | 1C0003 | 456 | 0 | _NEXTNODE |
| 375 | 200003 | 444 | 1 | _BSEARCH |
| 376 | 300003 | 426 | 1 | _BSEARCH |
| 377 | 380003 | 421 | 0 | _NEXTNODE |
| 378 | 3C0003 | 401 | 0 | _NEXTNODE |
| 379 | 4000003 | 380 | 0 | _NEXTNODE |
| . | . | . | . | . |
| . | . | . | . | . |
| 549* | 1 | 630 | 11 | _BSEARCH |
| 550 | 201 | 626 | 0 | _NEXTNODE |
| 551 | 801 | 622 | 0 | _NEXTNODE |
| 552 | C0l | 618 | 0 | _NEXTNODE |
| 553 | 6301 | 614 | 0 | _NEXTNODE |
| 554 | 60031 | 610 | 0 | _NEXTNODE |
| 555 | 78001 | 604 | 0 | _NEXTNODE |
| 556 | F8001 | 597 | 0 | _NEXTNODE |
| 557 | 180001 | 593 | 0 | _NEXTNODE |
| 558 | 1C0001 | 585 | 1 | _BSEARCH |
| 559 | 1F0001 | 581 | 0 | _NEXTNODE |
| 560 | 1F8001 | 577 | 0 | _NEXTNODE |
| 561 | 200001 | 567 | 0 | _NEXTNODE |
| 562 | C000001 | 563 | 0 | _NEXTNODE |
| . | . | . | . | . |
| . | . | . | . | . |
| 630* | F | 701 | 7 | _BSEARCH |
| 631 | 3F | 691 | 1 | _BSEARCH |
| 632 | FC0F | 688 | 0 | _NEXTNODE |
| 633 | 1F80F | 682 | 1 | _BSEARCH |
| 634 | 7F00F | 676 | 1 | _BSEARCH |
| 635 | 18000F | 673 | 0 | _NEXTNODE |
| 636 | 1FE00F | 670 | 0 | _NEXTNODE |
| 637 | 30C30F | 667 | 0 | _NEXTNODE |
| 638 | 3C0200F | 664 | 0 | _NEXTNODE |
| 639 | 403F80F | 661 | 0 | _NEXTNODE |
| 640 | C00000F | 658 | 0 | _NEXTNODE |
| 641 | 1FFFFFFF | 642 | 0 | _NEXTNODE |
| . | . | . | . | . |
| . | . | . | . | . |
| 701* | F | 729 | 5 | _BSEARCH |
| 702 | 1FF | 727 | 0 | _NEXTNODE |
| 703 | 40F | 725 | 0 | _NEXTNODE |
| 704 | 7E00F | 723 | 0 | _NEXTNODE |
| 705 | 18000F | 721 | 0 | _NEXTNODE |
| 706 | 20000F | 719 | 0 | _NEXTNODE |
| 707 | 20007F | 717 | 0 | _NEXTNODE |

-continued

| DFA STATE | Hex Value | Next | Offset | ActionCode |
|---|---|---|---|---|
| 708 | C00000F | 709 | 0 | _NEXTNODE |
| . | . | . | . | . |
| . | . | . | . | . |
| . | . | . | . | . |
| 729* | E | 745 | 0 | _SUBSTR_NEXT |
| 730 | F | 743 | 0 | _RECOGNIZE_RESUME |
| 731 | 4E | 742 | 0 | _RECOGNIZE_RESUME |
| 732 | 3FE00E | 741 | 0 | _RECOGNIZE_RESUME |
| 733 | C00000E | 736 | 0 | _NEXTNODE |
| 734 | 1000000E | 735 | 0 | _RECOGNIZE_RESUME |
| . | . | . | . | . |
| . | . | . | . | . |
| . | . | . | . | . |
| 744* | "f" | 0 | 0 | _IDENTIFIER |
| 745 | 3FC006 | 746 | 0 | _RECOGNIZE_RESUME |
| 746 | "f" | 10213 | 0 | _IDENTIFIER |
| . | . | . | . | . |
| . | . | . | . | . |
| . | . | . | . | . |
| 10213 | 1FFFFE | 10214 | 0 | _NEXTNODE |

In the foregoing state transition matrix, the actual processing of the recognition of FIG. 2 by the DFA is shown by the single asterisks ("*") and double asterisks ("**") In particular, the states suffixed by the single asterisks form the sequence used to recognize "f" in Times New Roman, bold, italic, 24 point font, and the states preceded by double asterisks form the sequence used to recognize the overlapping portion of the double overlap "ff" in the same FontInstance.

In forgoing state transition matrix, note that states 173 and 174 (both pointed to by state 172) mark the point where the bitmaps of "f" and "ff" diverge. If execution of the DFA were to proceed from state 173 (instead of 174) then a single "f" would be recognized.

Note that state 184 is the _RECOGNIZE_RESUME state. This means that it recognizes the character "f" in state 185 (the state that 184 points to), and resumes to 173 (the state that 185 points to). When it resumes to 173, it performs a _BSEARCH action because the offset value of state 185 is greater than zero. It would perform a _NEXTSTATE action if this value was zero.

The sequence beginning at state 729 is where the first "f" is recognized. This represents the last column of the bitmap for the first "f". State 729 attempts to match the pattern found at state 745, and when it fails, it defaults to the 745 minus 1, i.e., state 744. This is because whenever any substring match fails, it always defaults to the state that is one less than the target of the substring.

Adjustments to ResumeFromColumn

In some cases the ResumeFromColumn does not specify a unique sequence, and the sequence that it does specify includes more than one unique Resume2Column value. In cases such as this, the DFA does not have enough information to process the input. The DFA must make a choice (i.e., where to resume processing), yet it lacks the basis for this choice. In these cases we must extend the ResumeFromColumns to a point beyond their first overlapping column. In particular, the ResumeFromColumns must be incremented until they specify sufficiently unique DFA transition sequences such that all of the Resume2Column values for this sequence are the same.

Figure 32:
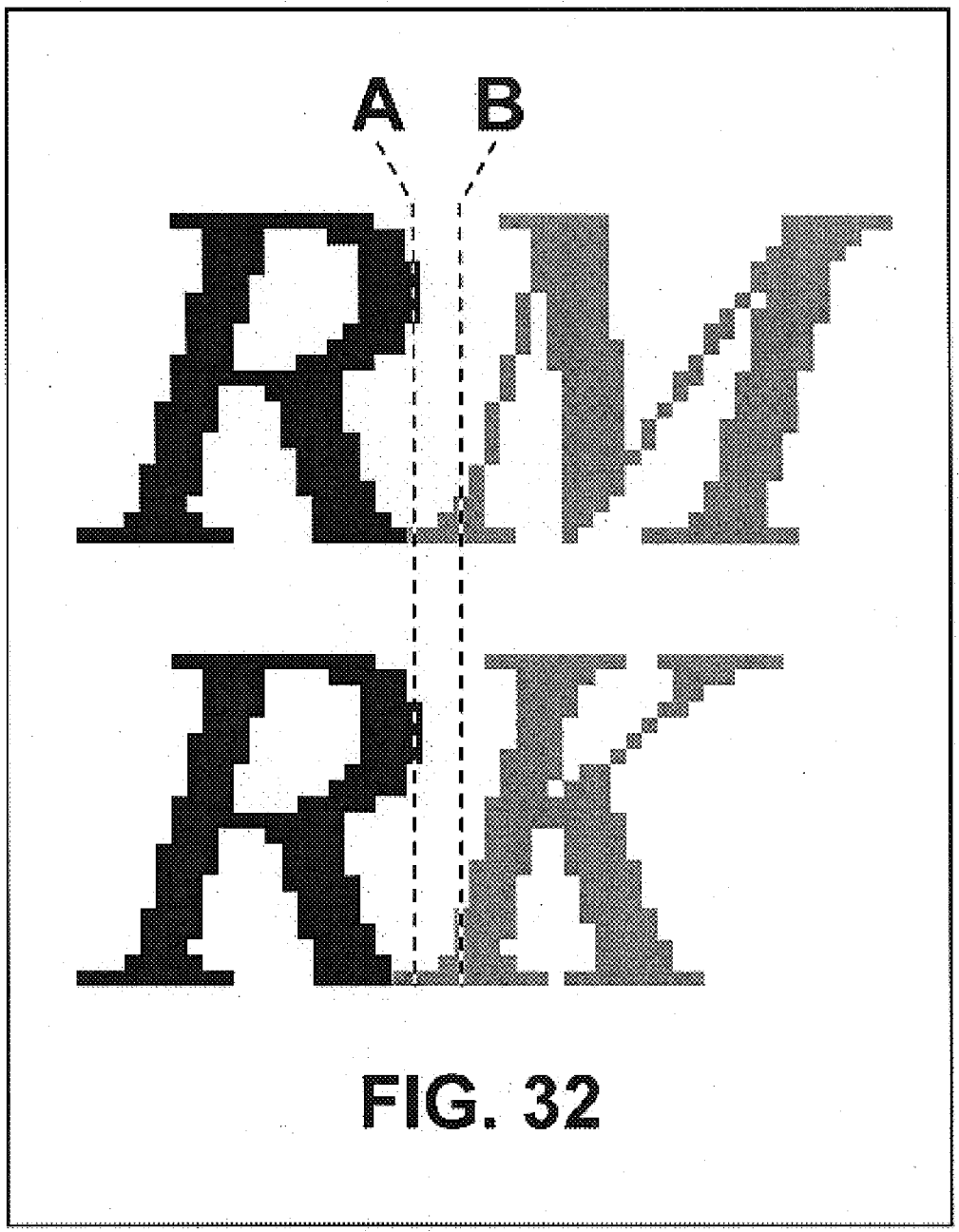
FIG. 32 shows a process for distinguishing between different pairs of adjacent characters that have bitmaps including black pixels that overlap with identical patterns.

In FIG. 32, the double overlapping character sequences of "RM" and "RK" are shown in TrueType Times New Roman, bold, italic, 24-point font, with one character sequence above the other. In the case of "RM", there is a single overlapping black pixel between the "R" and "M". In the case of "RK", there are two overlapping black pixels between "R" and "K". If a line is drawn down along the dotted line labeled (A), it can be seen that the "K" overlaps the "R" by one more pixel than the "M" overlaps the "R". (Note: The other pixel that "M" and "K" overlap within "R" cannot be seen because "M" and "K" cover it up.)

There are two factors that caused the problem in this case: (1) the difference in the number of overlapping black pixels; and (2) because it is the black pixels that overlap, different DFA sequences cannot be distinguished from each other. (Note: These two prefixes are identical even for several pixel columns beyond the overlapping portion.)

This problem can be avoided by extending the ResumeFromColumn to the point labeled (B) in FIG. 32. At this point, the two DFA transition sequences become distinguishable from each other. This result can achieved if the method always increments the ResumeFromColumn until every Resume2Column in the sequence has the same value, thus providing the DFA with a sufficiently unique transition sequence.

Sometimes when the above mentioned incrementation occurs, it results in a value for the Resume2Column that corresponds to the overlapping portion of another double overlap. When this occurs, it is necessary to generate another triple overlap.

The Resume2Column must always correspond to the ResumeFromColumn. This correspondence can be maintained by initializing another field called ActualResumeFromColumn to the ResumeFromColumn's value. Then, instead of directly incrementing the ResumeFromColumn or the Resume2Column, the ActualResumeFromColumn can be incremented. When these fields must be referred to, the ActualResume2Column can be derived from the ActualResumeFromColumn field as follows:

$$ActualResume2Column = Resume2Column + (ActualResumeFromColumn - ResumeFromColumn). \quad (2)$$

Thus it can be seen that changes to the ActualResumeFromColumn field also affect the ActualResume2Column field. In some cases this results in one double overlap's ActualResume2Column value corresponding to the overlapping portion of another double overlap. When this occurs we must generate the triple overlap that corresponds to the three characters involved from these two double overlaps. This can be accomplished as follows: (1) the first character of the triple overlap comes from the first character of the first double overlap; (2) the second character of the triple overlap comes from either the second character of the first double overlap or the first character of the second double overlap (note that they are both the same character); and the third character of the triple overlap comes from the last character of the second double overlap. These three characters are used to synthesize the triple overlap as discussed above in connection with the code example of FIG. 6.

Resolving Ambiguity of Identical Bitmaps

As persons skilled in the art will recognize, in some FontInstances certain characters may have the same bitmaps (e.g., the number "0" and the upper case "O", the number "1" and the lower case "L", or the upper case "I" and the lower case "L"). Although these different characters may have identical bitmaps, they can nearly always be distinguished from each other by knowing the precise number of pixels between pairs of characters. In particular, if these characters are immediately next to any other character, then they can in most cases be distinguished by their differing PixelsBetween[ ][ ] matrix values.

Figure 33:
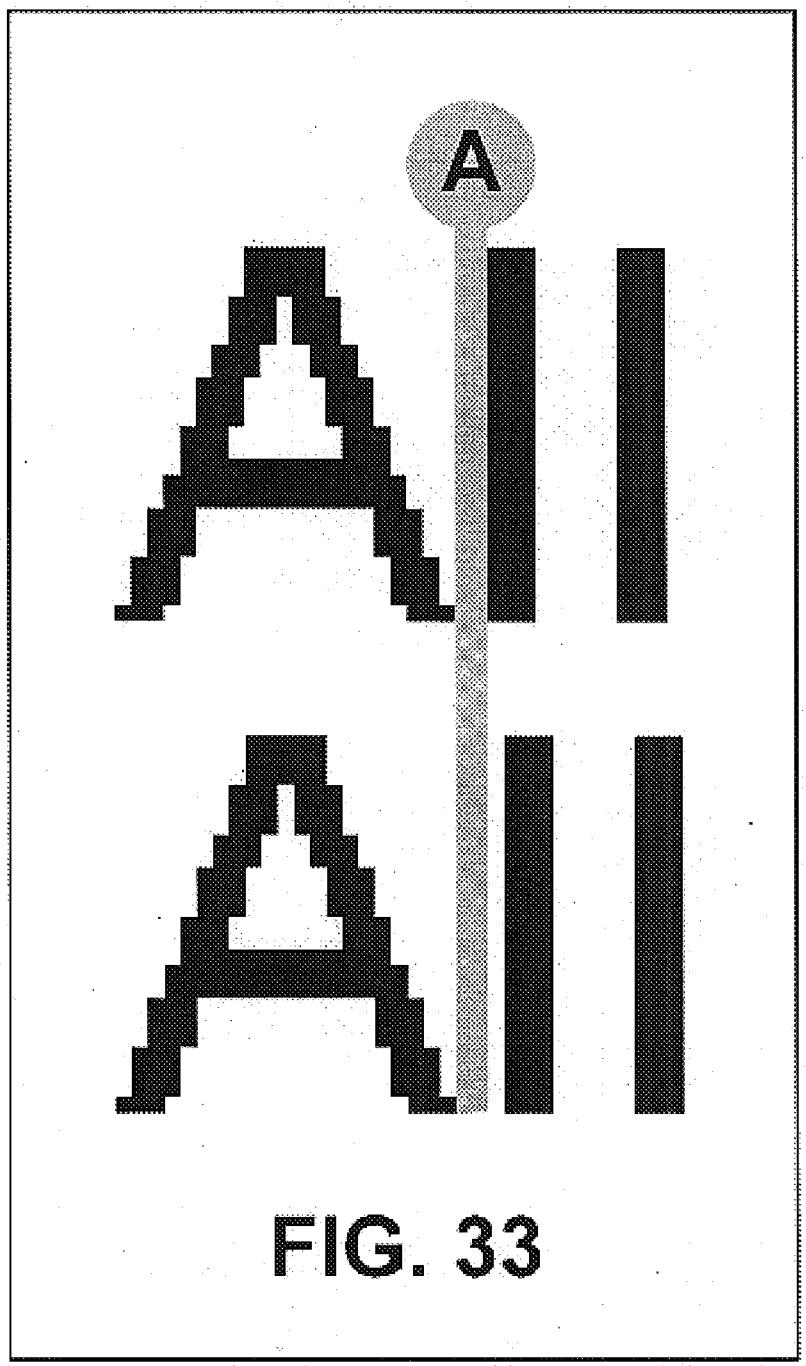
FIG. 33 shows a process for distinguishing between different pairs of adjacent characters that have identical bitmaps that do not overlap.

For example, FIG. 33 shows the following two sequences in "Arial" 24 point font: (seq. 1) upper case A+lower case L+upper case 1, and (seq. 2) upper case A+upper case I+lower case L. In the first sequence, we can determine that the first character after the "A" is a lower case L (rather than the number 1) because there are two pixels between the characters (i.e., PixelsBetween[UpperCase(A)][LowerCase (L)]2). In the second sequence, the first character after the "A" can be correctly identified as an upper case (I) because there are three pixels between the characters (i.e., PixelsBetween[UpperCase(A)][UpperCase(1)]==3).

Thus, by tracing down the line labeled (A) in FIG. 33, it can be seen that the number of blank pixel columns between the first and second characters correspond to those expected by the first and second sequences. Although it is not possible to know with absolute certainty what the third character is in either of these sequences from the information provided, heuristics can be implemented to reliably disambiguate these cases. For example, in the first sequence, upon encountering upper case A and lower case L, one might expect that the next character to be another lower case L because it would be atypical to follow a lower case character with an upper case character in the English language. Similarly, the sequence "All" spells the English word {All}, whereas the sequence "AIl" would not even form any readily known acronym. In any case, the DFA will always recognize this ambiguity within one of its _DUPLICATE states so that this information can be reported back to the user.

As persons skilled in the art will recognized, other approaches can be used to disambiguate cases such as the one mentioned above. For example, when there is no displayable character that is immediately adjacent to the ambiguous character that is displayed, it may be possible to measure the number of whole space increments from this character to another character, and again employ the PixelsBetween[ ][ ] matrix to determine the correct recognition.

Figure 34:
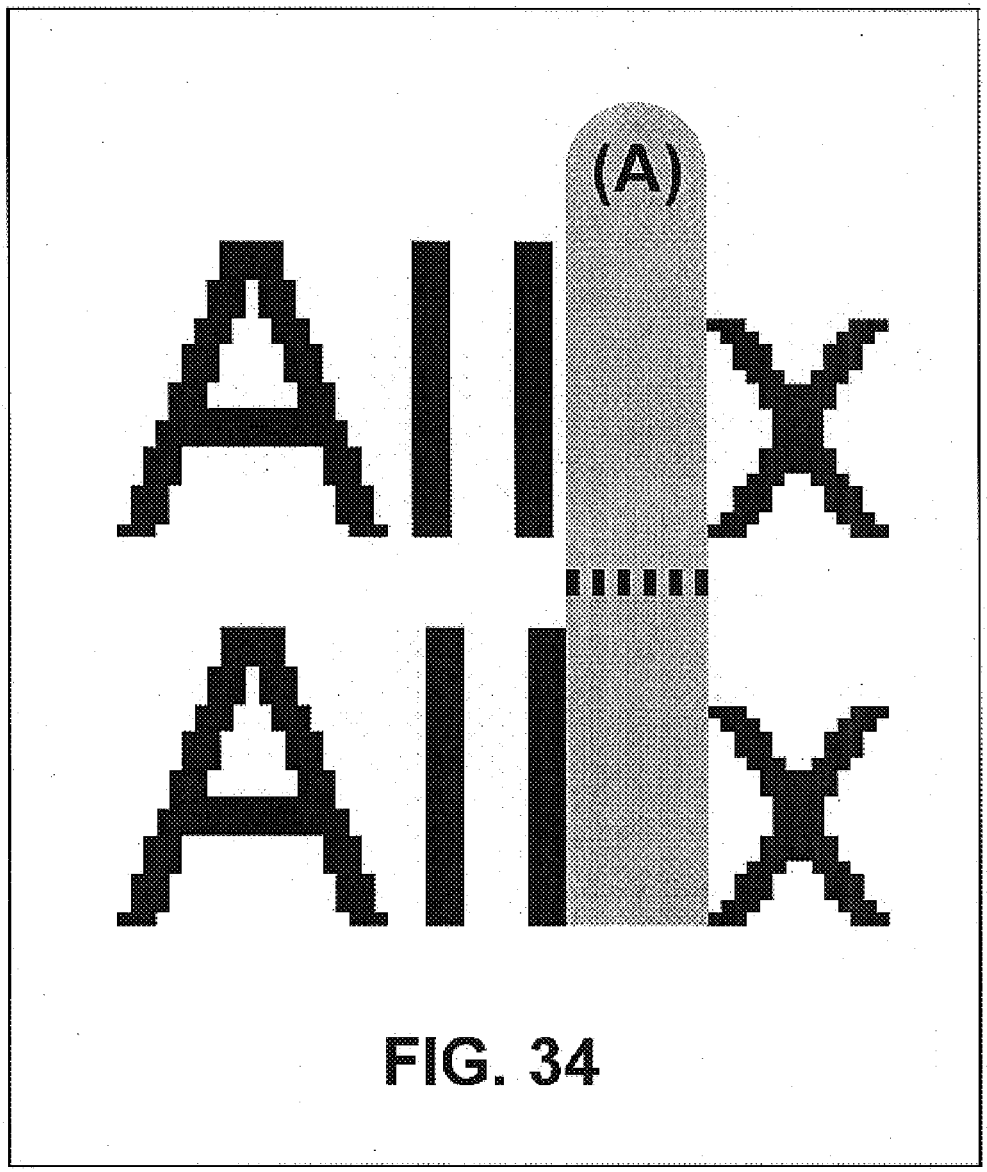
FIG. 34 shows a different process for distinguishing between different pairs of non-adjacent characters that have identical bitmaps that do not overlap.

The example shown in FIG. 34 is similar to that shown in FIG. 33 except that it includes the additional information of the (fourth) "x" character on the far right. With this additional information, it is possible to determine that the third character must be an upper case I and a lower case L, respectively. This can be determined from the following information: (1) there are exactly twelve blank pixel columns between the third and forth characters in the first sequence; (2) there are exactly eleven blank pixel columns between the third and forth characters in the second sequence; (3) the width of a space character in "Arial" 24 point font is exactly nine blank pixel columns; (4) the PixelsBetween[upper case 1] [lower case X]==3; and (5) the PixelsBetween[lower case L] [lower case X]==2. By subtracting the width of a space character from the values in (1) and (2), the values in (4) and (5), respectively, are derived. This can be seen visually by tracing down the path labeled (A) in FIG. 34. The foregoing method can be used to eliminate nearly all of the ambiguity in the DFA recognition of characters, except in the rare case of isolated characters. Even in these rare cases, the DFA can at least recognize the ambiguity and report it back to the user for intelligent human intervention. In the case where this ambiguity occurs within a contiguous body of text, the means for resolving it is sufficiently reliable that reporting is not required, yet could be provided as an option.

Operation of the DFA Recognizer

Successful operation of a DFA on a screen or graphic layout requires that all the FontInstances and font colors be known. As persons skilled in the art will recognize, this information can be obtained in numerous different ways. For example, the FontInstances (including the foreground and background colors) that MS WINDOWS® uses can be obtained through the API functions of SystemParametersInfo( ) and GetSysColor( ). The FontInstances being used by an application can be obtained by intercepting API function calls to SetTextColor( ) and CreateFont( ), as well as other related functions. The techniques for accomplishing these types of interceptions are well known to persons skilled in the art. It might also be possible to obtain this type of information by writing a display device driver. The possible text background colors may also be obtained by the intercepting the API function SetBkColor( ) or similar function calls. FontInstances can also be derived from direct access to data files. This would typically involve reverse engineering proprietary file formats. From this reverse engineering, FontInstance data could be readily obtained.

As noted previously, the screen (or graphic image) information that is to be processed by the DFA is preferably translated into a vertical monochrome bitmap prior to processing. Translating the screen into a vertical monochrome bitmap, one foreground color at a time, allows the DFA to recognize every aspect of the onscreen FontInstance. In addition, it minimizes the amount of space that the DFA takes, and allows the same DFA recognizer to be used regardless of the text foreground and background colors. As persons skilled in the art will recognize, there are numerous different techniques that could be used for performing this translation. One particular method is provided in Appendix B. Another method that can be used is the same as the method in Appendix B except that the line of code that tests the bits of the horizontal monochrome device independent bitmap is replaced with a line that tests a single pixel of a full color device independent bitmap. Thus, the line "if (ptr [WhichByte] & BITS[WhichBitinByte]" becomes "if (ptr [WhichRGB]==ForeGroundColor)." The full color bitmap comes from capturing the screen's data.

Once the vertical monochrome bitmap has been defined, it is processed by scanning it for every FontInstance that has foreground colors corresponding to those (one or more) used to derive the vertical monochrome bitmap. If desired, this process could be done using merged DFA's of all the FontInstances having the same pixel height. This is advantageous in that it reduces the number of scanning passes.

As persons skilled in the art will recognize, it may also be possible to process all of the colors and FontInstances of the same font height in a single pass. For example, this would be relatively easy to accomplish when all the font's foreground colors are known in advance, and none of the foreground colors are used as background colors for another font.

As noted previously, the actual recognition processing preferably begins at the top left pixel of the screen. This processing traverses every pixel of every row (each time taking a vertical pixel column starting at the current pixel) by processing an entire row before proceeding to the next row. This starting location is preferable because most graphical representations of text on the screen have fixed heights but variable widths. Thus, it is easier and requires fewer processing steps to scan horizontally (i.e., from right to left or left to right) rather than vertically (i.e., top to bottom or bottom to top).

In addition, persons skilled in the art will recognize there are several alternatives ways of performing horizontal traversal of the screen. For example, we could just as efficiently begin scanning at the bottom right corner of the screen and scan the columns of pixels backwards.

According to a preferred embodiment, the monochrome vertical representation of the screen may be represented as a two dimensional array of unsigned 32-bit integers (e.g., "unsigned int SCREEN[MAX_ROW][MAX_COL]"). Each one of these integers holds 32 pixels that represent one vertical column of the screen's bitmap. Thus, if the DFA is attempting to recognize character of a FontInstance that is (for example) 20 pixels tall, it is necessary to truncate the high order 12 bits (representing 12 pixels) from the data obtained from this representation of the screen. (Note: This assumes that the low order bits represent the top of the column of pixels. Alternatively, this column could be flipped vertically so that the low order bits represent the bottom of the pixel column.)

FIG. 35 shows an exemplary program function that can be used to obtain one 32-bit vertical column of pixels from the vertical monochrome representation of the screen. It obtains a column of 32 pixels with the specified PixelROW and PixelCOL being the top most pixel of this column. The reason for using 32-bit integers is that this is the largest integer that is native to the INTEL® architecture development platform. Persons skilled in the art will recognize that other sizes could also work. For example, if the font height is less than 16, then a smaller integer could be used. Similarly, if the font height is greater than 32, then 64-bit integers could be used if available in the native architecture.

Font Height Greater than Thirty Two Pixels

As persons skilled in the art will recognize, the DFA recognizer can easily be adapted to handle text having a font height greater than 32 pixels in other ways. For example, a FontInstance with a pixel height of 96 pixels be represented using three 32-bit integers to store each column of the character. For convenience, the top most pixel of this column can be considered the most significant bit and the bottom most pixel the least significant bit.

The DFA for this FontInstance can be created by collecting the top 32 pixels of the column, then the next 32 pixels, and finally, the bottom 32 pixels. This process is repeated until every column of the character has been collected. The collected columns are stored as strings of 32-bit integers, with most significant bits first, and next significant bits second, and least significant bits third.

The strings of integers are sorted exactly like before, and then transformed into a DFA like before. The sole difference occurs in processing of (or using) this DFA. As before, the initial screen position used for processing the DFA is top-left most pixel on the screen. From this position, the first 32 pixel vertical column of pixels is taken. If processing matches the top 32 pixels, however, processing does not move to the right at this point but instead involves taking the next lower 32 pixels in the first vertical column of the screen. If a match again occurs, then the lowest 32 pixels are taken in the first vertical column of the screen. Finally, if the lowest 32 pixels are successfully matched, processing moves back to the top row of pixels, one pixel to the right, for obtaining the next pixel column. Processing continues in this same way for matching every column of the 96 pixel tall character. If at any point during this processing matching fails, then processing continues at the next column to the right of where processing began.

According to a preferred embodiment, the DFA recognizer is adapted to handle characters having a font height greater than 32 pixels by defining two new ActionCodes: _NEXTROWS and _LASTROWS. The first ActionCode (_NEXTROWS) instructs the DFA to get the next lower 32 pixels from the screen relative to the starting location. The second ActionCode (_LASTROWS) does the same thing as the _NEXTROWS, but adds the capability of ignoring some of the screen pixels. This feature is required in those cases where the total number of pixels to be examined is greater than 32, but not a whole multiple of 32. The previously defined ActionCodes of _NEXTNODE and _BSEARCH would be used when the next column to the right is required.

Determining Text Rectangles

According to another preferred embodiment, the information contained in the screen (or graphic image) may be advantageously processed by grouping text into rectangles. In the typical instance, text rectangles comprise whole paragraphs of text on the screen. They can be left justified (most typical), right justified (such as tables of numerical data), and centered. Grouping text into rectangles is particularly advantageous when the main objective of running the DFA recognizer is to create a file of a known format (e.g., HTML or XML) that preserves all the information necessary to properly format and position the text and images to accurately reproduce the original image.

Figure 36:
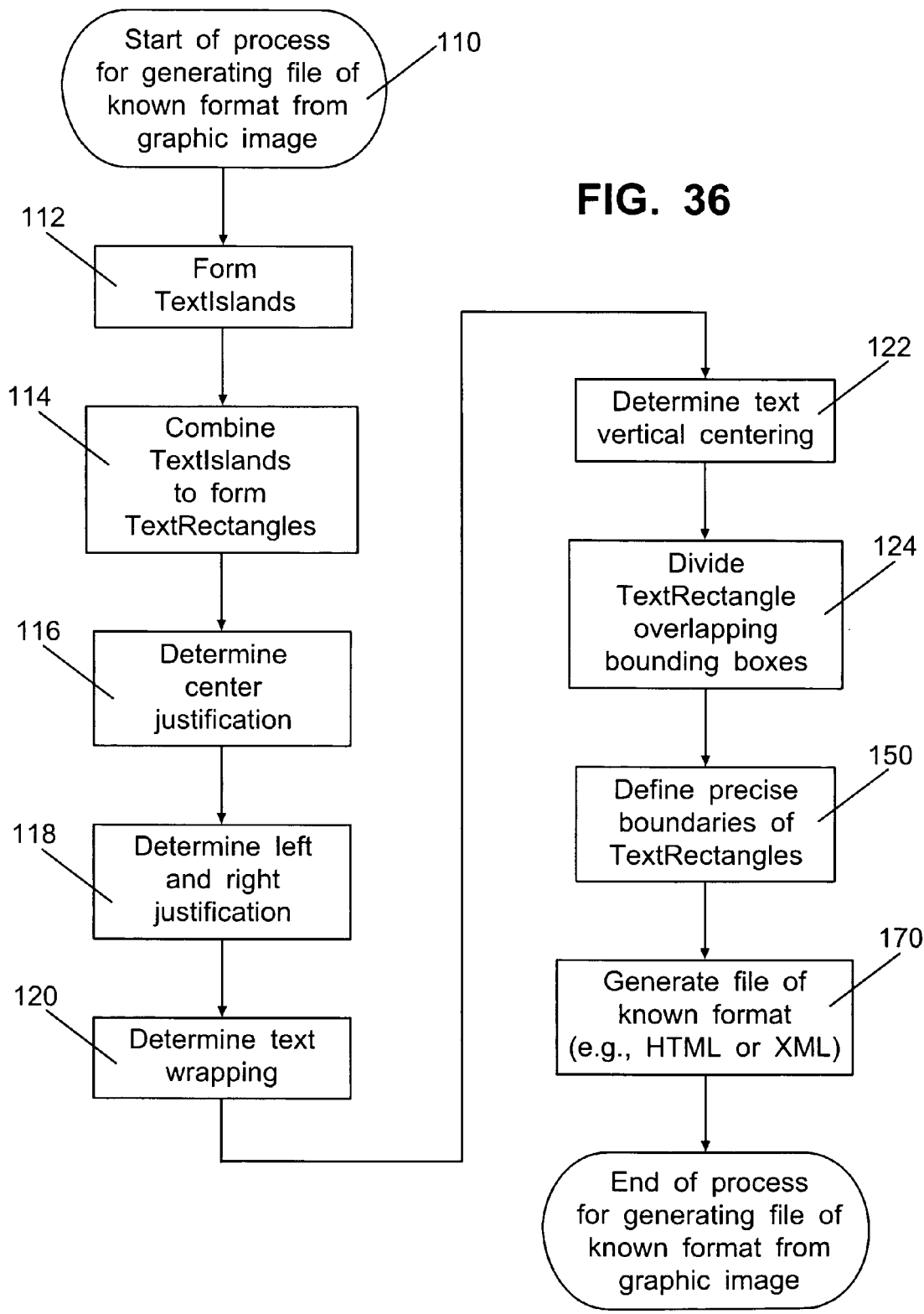
FIG. 36 shows a logic flow diagram of an exemplary process for generating a file of a known format from a graphic layout.

With reference to FIG. 36, an exemplary procedure 110 for identifying text rectangles in a screen or graphic image and generating a known file format (e.g., HTML code) including the formatting and positioning information necessary to recreate the original graphic layout will be described. In the description of procedure 110 below, various terminology and phraseology will be used to provide both brevity and a better correspondence with certain programming examples contained in the attached appendices. In particular, the following terms are used and will have the following meaning:

| Terminology | Meaning |
| --- | --- |
| CharacterWidth | This is the same value derived from the MS WINDOWS ® API function GetCharWidths( ). This width includes the sum of all three values from the GetCharABCWidths() API function. These values are used as follows: The "A" spacing is the distance to add to the current position before drawing the character glyph. The "B" spacing is the width of the drawn portion of the character glyph. The "C" spacing is the distance to add to the current position to provide white space to the right of the character glyph. |
| FontHeight | This is the natural height of the FontInstance. It is the same value that is referred to as tmHeight in the MS WINDOWS ® architecture. This value includes some white space (leading) between lines of text. |
| CharacterSpacing | Spacing in whole CharacterWidth increments. |
| LineSpacing | Spacing in whole FontHeight increments. |
| CharacterRectangle | The rectangular boundary of CharacterWidth by FontHeight dimensions that surrounds a character. |
| TextWord | Any sequence of contiguous characters all of the same FontInstance (including identical FontColor), with no embedded spaces. This can include a single character by itself. |
| TextPhrase | Any contiguous sequence of TextWords that are separated from each other horizontally by exactly one space. |

-continued

| Terminology | Meaning |
| --- | --- |
| TextLine | Any contiguous sequence of TextPhrases and/or TextWords that are separated from each other horizontally by exactly one space. In the case of TextLines, the TextWords and TextPhrases that are combined together are not required to be of the same FontInstance. |
| TextIsland | Any contiguous sequence of TextLines that are immediately physically adjacent to each other such that their respective top and bottom margins touch each other. |
| TextRectangle | The smallest bounding box rectangle that encloses a text element. TextRectangles are constructed to be the largest area of text that has a single justification and is entirely formatted with whole increments of CharacterSpacing and LineSpacing. TextRectangles can be directly translated into page layout language specifications, such as HTML table elements. |
| TextColumn | Most often this is left justified text that is wrapped at the same right margin boundary. In any case, the justification basis and margins must be the same for all text within a TextColumn. |
| GraphicImage-Rectangles | The bounding box rectangle that encloses a graphic image. |
| ObjectRectangle | This includes TextRectangles and GraphicImageRectangles. |

Procedure 110 begins with a step 112 of forming TextIslands. This may be accomplished by collecting TextWords to form TextPhrases, and collecting TextPhrases to form TextLines. Vertically adjacent TextLines may then be combined to form the TextIslands. In all of these cases, every character on every TextLine should be within whole CharacterWidth increments from every other character. In addition, every TextLine should be physically adjacent to every other TextLine, and all of these TextLines should be positioned relative to each other according to a single criteria (e.g., left justified, right justified, or centered). A TextIsland derives its name from being an island of text surrounded by a sea of white space. All Text is placed into TextRectangle structures as it is recognized by the DFA. By way of example and not limitation, an exemplary TextRectangle structure for storing this information is shown in FIG. 37.

As discussed in detail below, the restrictions force the TextIslands to conform to the requirements of the "Generating HTML Tables" process. This process can be transformed into the requirements of many page layout specification languages. The basis for grouping TextLines together is that TextLines have identical justification, and any deviation from this justification is within whole CharacterSpacing or LineSpacing increments.

Another aspect that needs to be considered at this stage of processing is whether or not the TextIslands have a wrapping margin. Details of this procedure are provided below. If wrapping is determined to exist, it is also necessary to estimate the pixel position of the wrapping margin.

According to a second step 114 of process 110, TextIslands are combined to form TextRectangles. The basis for combining TextIslands into TextRectangles is that (1) the gaps between the TextIslands are in whole LineSpacing and CharacterSpacing increments, and (2) all the TextIslands to be combined are of the same Justification (including the same Justification margin). In most cases this will merely be a matter of combining together several paragraphs that are in the same TextColumn. However, it is also necessary to consider the text wrapping margins. These are described below in connection with a step 120. Every TextIslands that is combined with every other TextIslands must have identical text wrapping boundaries. Alternatively, it may be that none of the TextIslands being combined are wrapped at a margin. The width of TextRectangles are originally specified in pixels. If desired, however, this may be later transformed into percentages of the screen width. This would allow the layout to dynamically adjust itself to the actual size of the screen.

A third step 116 of process 110 involves determining center justification. This can be done, for example, by noting that the longest line in the TextIslands forms the basis for the width of the TextIsland's bounding box rectangle. All of the other lines will have their left and right margins at an equal distance from the bounding box margins. In some cases the amount of space to allocate is an odd number of pixels. In this case (in MS WINDOWS®) the extra pixel is allocated to the left side.

Process 110 continues with a step 118 involving determining left and right justification. This can be done by noting that all TextLines that have left or right justified margins will precisely align to a CharacterRectangle boundaries. That is, a left justified margin will have its TextWords all align to the exact same pixel position, based on CharacterWidth boundaries. It is also possible to determine whether any deviation from this margin is in whole CharacterSpacing increments. The CharacterSpacing increment is defined as the CharacterWidth of a space character for the underlying FontInstance. Every TextLine that is included in a TextRectangle must be in whole LineSpacing increments from other TextLines. The LineSpacing increment is defined as increments of FontHeight as previously defined.

Continuing with process 110, step 120 determines whether a TextIslands or TextRectangle is wrapped at a margin. For example, it is possible to determine whether a TextRectangle is left justified (and wrapped at the right margin) by the following process: If for all TextLines in a TextRectangle, the first word on the next line can never fit within the remaining space on the current line, then the right margin is likely a text wrapping margin. For right justified text this process works in the same way. The sole difference is that the space remaining on the current line is on the left side of the line, rather than the right side. For center justified text, the space that remains on the current line is distributed equally to both the left and right sides of the line.

According to a preferred embodiment, the coordinates of this text-wrapping margin can be estimated. For example, in the case of text that is left justified and has a text wrapping right margin, the minimum value for the pixel coordinate of the right wrapping margin would be the right pixel coordinate of the widest line. Similarly, the maximum value of the wrapping margin will be one pixel less than the smallest increase from the minimum value such that a change in text wrapping would occur. Then, the smallest difference between the space remaining on the current line and the pixel length of the word on the next line is the deciding line pair. The value of this difference minus one is then added to the minimum wrapping margin to obtain the maximum wrapping margin.

Still referring to process 110 shown in FIG. 36, a step 122 determines cases of text centering. The most typical cases of text centering are: (1) TextLines that are centered relative to each other; (2) a TextLine that is centered relative to the whole page; and (3) a TextLine that is centered above one or more columns of TextLines. In the event of case (1), the TextRectangle is center justified. There is nothing to do for this case because the center justification has already been processed by step 116 discussed above.

For case (2), the "whole page" is defined as the rightmost margin and the leftmost margin of all of the ObjectRectangles on the page. An example of this can be seen on the top and bottom lines of FIG. 38.

For case (3), this is most often a column heading. This brings up another complexity. In most layout specification systems, text is most often centered relative to an invisible margin, rather than the actual text data itself. This invisible margin would be the margin that forms the basis for text wrapping. This means that it is not always possible to examine the precise position of text to determine centering. The basis for centering may be several pixels wider than the actual text. The TextIslands have already been determined in step 112. As a part of this determination, the possible values of wrapping margins were also determined. Any TextLines (especially those immediately above TextRectangles) that are centered relative to a justification margin, and a value within the range of possible values for the text-wrapping margin, is considered centered relative to these margins. Unless any contradictory information is discovered, this specific value for the text-wrapping margin is considered the correct one of the possible values.

There are other cases where text is vertically centered between two horizontal margins. This needs to be detected and represented in the TextRectangle structure. An example of this can be seen in FIG. 38. The line of text that says "Thank you for your payment" is vertically centered between its upper and lower margins.

It is important that all the vertical and horizontal centering be accurately recognized. The reason that this is important is when this layout is translated into a page layout language (e.g., HTML or XML), it may be translated using percentages of the screen width instead of actual pixels. This representation allows the page to dynamically expand and contract according to the actual width of the screen where the page is displayed. By explicitly encoding all the horizontal and vertical centering, the elements on the page are best able to retain their relative position to each other.

Continuing with process 110, a step 124 performs the operation of dividing TextRectangle overlapping bounding boxes. This step is performed because in many cases when one bounding box rectangle overlaps another bounding box rectangle, these overlapping rectangles cannot be correctly translated into a page layout language such as HTML.

One bounding box rectangle can only overlap another if the contiguous text within at least one of these two bounding box rectangles is not very rectangular in shape. This contiguous text may not be very rectangular in shape because of substantial portions of whitespace within its bounding box rectangle. For example, in FIG. 40 the text is contained within two contiguous portions. The portion in the lower right corner nearly approximates the shape of a rectangle. The other portion of contiguous text has a shape that looks more like the capitol letter "L" rotated ninety degrees clockwise. Because of the shape of the text in this latter portion, the text in the former portion can fit inside the latter's bounding box rectangle.

The way to correct this problem is to divide the TextRectangle up so that it contains less white space. For example, the dotted lines surrounding the two portions of text in FIG. 40 form the overlapping bounding box rectangles. When it is determined that one bounding box rectangle overlaps that of another, step 124 divides up one or more TextRectangles on one or more horizontal lines to define two or more vertically stacked TextRectangles. The objective of this step is to derive TextRectangles that are more rectangular in shape. Minimizing the white space areas accomplishes this objective. The step also attempts to make the minimum number of horizontal divisions, which reduces the complexity and thus the size of the generated web-pages. It also permits a page layout to be readily translated into a layout language such as HTML.

Figure 39:
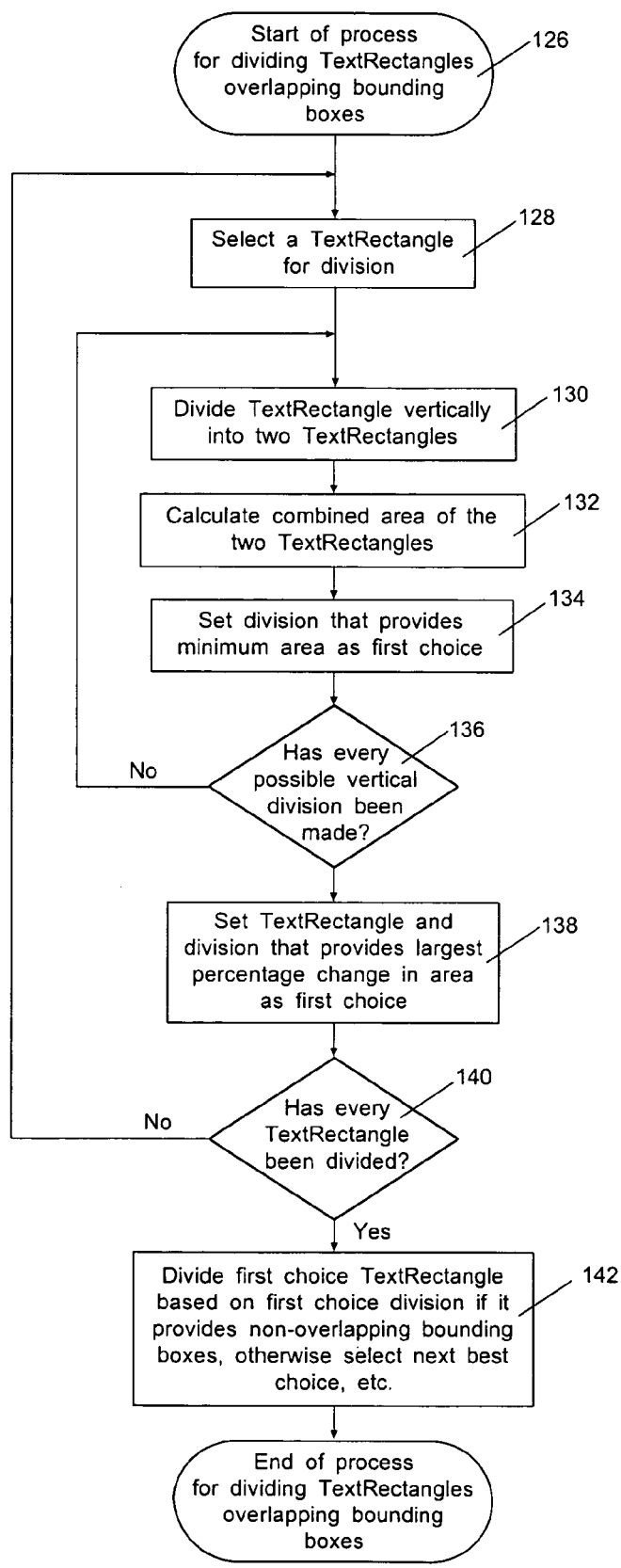
FIG. 39 shows a logic flow diagram of an exemplary process for dividing text areas with overlapping minimal bounding boxes into text areas with nonoverlapping minimal bounding boxes.

An exemplary subprocess 126 for dividing up TextRectangles is illustrated in FIG. 39. Subprocess 126 includes a step 128 which selects every TextRectangle for division, one at a time. As each TextRectangle is selected, a step 130 makes every possible vertical division one at a time so that a step 132 can calculate the combined area of the two TextRectangles. This can be done by, for example, adding together the product of the height and width (in pixels) for the two divided TextRectangles. In a step 134, the division that provides the minimum area is set to be the first choice for a division point within the selected TextRectangle. If every division of the selected TextRectangle has been made (as determined by a step 136), then a step 138 sets as the first choice the TextRectangle and division that provides the largest change in original area relative to its divided area. If every TextRectangle has been divided (as determined by a step 140), then a step 142 divides the best choice TextRectangle based on the best choice division that results in bounding boxes which do not overlap.

Referring now to FIGS. 40–42, the application of process 110 to a sample passage of text having a generally rectangular layout will be described. In FIG. 40, the text passage is shown after processing of process 110 through step 122. At this point of operation, a small TextRectangle 143 has been defined within a larger TextRectangle 144. In FIG. 41, the same text passage is shown after execution of process 110 through step 126. At this point of operation, TextRectangle 144 has been divided into two smaller TextRectangles 146 and 148 that are non-overlapping with TextRectangle 143.

TextRectangles 146 and 148 are derived by creating two minimal bounding box rectangles. These minimal bounding box rectangles are created by dividing the sidewise "L" shaped region of contiguous text into two smaller regions of contiguous text. The first step in doing this is to find a dividing line 147 as illustrated in FIG. 41. This process is applied only to the sidewise "L" shaped portion of contiguous text. There are eight possible horizontal lines of division between these nine contiguous lines of text. At each division point, two corresponding minimal bounding box rectangles are constructed for the corresponding text. The ideal division line is the division line that produces the minimal pixel area of the sum of the possible pairs of minimal bounding box rectangles. This point occurs between lines three and four at line 147 as shown in FIG. 41.

In FIG. 42, a final step has been added of defining the empty rectangles (e.g., rectangles 166 and 168 labeled (A) and (B) in FIG. 42) to prepare the text for generating HTML tables. As discussed in detail below in connection with a step 150 of process 110, the empty rectangles 166 and 168 are selected such that they will have one of their dimensions identical to the rectangle that they are adjacent to, and the other dimension becomes whatever is required to fill in the gap.

Returning now to process 110 shown in FIG. 36, step 150 involves defining the precise boundaries of the TextRectangles. The process of translating TextRectangles into HTML begins with the assumption that the following requirements have been met. All of the text has been divided into TextRectangles that: (1) have a single text justification (e.g., left, right, or centered), (2) do not overlap any other rectangles, (3) are entirely formatted with only the CharacterSpacing and LineSpacing of their underlying FontInstances, and (4) have their vertical and/or horizontal centering correctly determined and represented in the TextRectangle structure. Additionally, the process also assumes that all of the GraphicsImageRectangles have been defined. These are derived from the space that remains that is neither a TextRectangle, nor solid color background. As persons skilled in the art will understand, there are two types of formatting that may be required: (1) formatting that requires text wrapping, and (2) formatting that is wrapped by an explicit carriage return character ("<cr>").

In cases where text wrapping is not needed, the number of rectangles that will be required can often be reduced. This can be done by placing EndOfLine characters (e.g., ASCII (13) or ASCII (10), or both) at the end of the specified TextLine. This reduces the total number of rectangles and thus can simplify the structure of the page layout. The simplified page layout makes the corresponding page layout language specification simpler. Within HTML, the simpler the page layout, the quicker that the page is transmitted. (See FIG. 38 which provides the end result of this process).

Still describing step 150 of process 110, the right margins of all left justified TextRectangles are expanded to meet the left margins of other Rectangles (text and otherwise). Similarly, the left margins of all right justified TextRectangles are expanded to meet the right margins of other Rectangles (text and otherwise). In other words, the non-justification left and right margins are expanded to the justification margins. In cases where two non-justification margins are expanding toward each other, the new margin is placed at the halfway point between these two. However, step 150 does not expand a justification margin because this would change the page layout from what is specified. The results of the foregoing operations can be seen in FIG. 38. In FIG. 38, the left (non-justification) margin of a column 152 of dollars was expanded left, and the right (non-justification) margins of four rectangles 154, 156, 158 and 160 were expanded to the right, with the new margin halfway between the two.

If some of these lines are auto-wrapped by a margin, then the operation of step 150 is different than explained above. For every TextRectangle that is auto-wrapped at a margin, its margins cannot be arbitrarily expanded. Instead, the margin can only be expanded within the range of possible values for the wrapping boundaries. Often there will be column headings that are centered relative to these justification and wrapping margins. In this case, the value of the wrapping margin can be determined from its possible values. If this value cannot be determined, then the mid-point between the minimum and maximum possible values is derived and used.

Generating HTML Tables from Pre-Defined Rectangles

When TextRectangles are translated to HTML, all text is assumed to be positioned within its TextRectangle aligned at the top of the TextRectangle (e.g., valign="top"). This eliminates any extra space that would otherwise enter the process. Because all the text is aligned to the top, all vertical spacing must be applied to the bottom of the TextRectangle. This works the same way in reverse, i.e., the choice is arbitrary. The exception to this rule is when vertical centering is detected. One example of this is provided in FIG. 38. The text that states "Thank you for your payment" is vertically centered between its top and bottom margins.

In some cases, spacer rectangles may be required. For example, spacing rectangles are required if the vertical or horizontal space is not in whole CharacterSpacing or LineSpacing increments. One example of this can be seen in FIG. 38 along the left margin of the figure as small rectangles 162 and 164. As illustrated, rectangle 162 is used to indent "Charges" and "Payment" from "Previous Balance" and "Balance Forward."

In the case of vertical spacing, this process may proceed by beginning at the top most rectangle and creating another rectangle below each rectangle, as wide as the rectangle above, and tall enough to fill in the gap between two rectangles. This process need only occur if the required spacing is not in whole LineSpacing increments. If the required spacing is in whole LineSpacing increments then, then all that need be done is to embed NewLine characters at the required point in the text.

In some cases, it is necessary to create another spacing rectangle to bridge the gap between one spacing rectangle and another non-spacing rectangle. For example, FIG. 42 shows spacing rectangle 166 which bridges the gap between TextRectangles 143 and 148 and spacing rectangle 168 between TextRectangle 168 which bridges the gap between TextRectangles 143 and 146. Each spacing rectangle 166, 168 is defined such that one of its dimensions is exactly the same as the rectangle to which it is adjacent. The other dimension of this spacing rectangle 166, 168 is exactly the same as the gap that must be filled. Two additional examples of this can be seen in FIG. 43 as sections (F) and (Q).

Finally, step 150 of process 110 processes any rectangles that remain after all TextRectangles have been determined as follows. If a left over rectangle is a solid color, it can be classified as an HTML table's background color. If repeating patterns can be recognized, these can become an HTML background image. Everything else (i.e., any rectangles left over after Text Rectangles and Background rectangles have been recognized) are treated as image rectangles. For HTML, there are several forms of representation, including ".jpg", ".gif" and ".png".

Following step 150, process 110 concludes with a step 170 (described in detail below) which generates a file in a known format using a page layout language such as HTML or XML. Prior to execution of step 170, the entire screen has been divided up into non-overlapping rectangles, and every portion of the screen has a corresponding rectangle. In addition, all of the details of every TextRectangle are known. As mentioned previously, an exemplary TextRectangle structure for storing these details is illustrated in FIG. 37. Each graphics image has its own corresponding rectangle structures.

The information stored in the TextRectangle structures may have been derived in one of three ways: (1) the DFA recognizer may have processed a bitmapped representation of the screen (or window) using one of the methods or processes described above; (2) operating system function calls that display this information to the screen (or window) may have been intercepted as described above; (3) a page layout specification user interface may have been used to create the graphic layout as described in detail below. For case (1), all of steps 112–170 of process 110 must generally be performed. For case (2), some or all of the same steps 112–170 may be performed need to be performed as the preceding case. For case (3), the user interface can be directly linked to Generating HTML Tables with no need for steps 112–150, i.e., all that is needed is step 170. In this case, user specified actions can provide all of the data in the required format.

According to an exemplary embodiment, step 170 generates a page layout language specification file (e.g., an HTML file) from the TextRectangles, GraphicImageRectangles, and background as follows. First, an imaginary line is drawn along the borders of every rectangle, including the rectangle that is formed by the screen itself. The screen is considered the highest parent rectangle. Any dividing line that traverses either the entire width or length of this parent rectangle defines its immediate children. The immediate children are all the rectangles that span the entire length or width of the parent rectangle.

In some cases there may be at least one horizontal dividing line and one vertical dividing line, both spanning the entire parent rectangle. In this case we may be required to select either the horizontal or the vertical dividing lines. The basis for this decision is the HTML requirement that all the rows within a table must be the same height or all its columns must all be the same width. One exception to this requirement is using rowspan if the rows are in whole multiples of the same height or colspan if all the columns are in whole multiples of the same width. If none of these four criteria are met, then we choose either the horizontal or vertical set of dividing lines that produce the fewest total number of HTML tables.

When a computer is programmed to implement step 170, the data structures that contain the pixels coordinates (e.g., top, bottom, left and right) of every rectangle are derived. This set of rectangles completely defines the whole screen. To find this imaginary line, the computer searches these rectangles for one of the parent's row coordinates and one of its column coordinates based on this set of rectangle's coordinates. The computer does this in an attempt to find a set of rectangle borders that trace directly back (in a straight line) to the corresponding other coordinate of the parent. In all the cases where the computer succeeds at this, the imaginary line has been drawn.

By way of example and not limitation, an imaginary line through a parent rectangle (e.g., the screen) would be found in the Endangered species magazine cover of FIG. 43 as follows. First, the programmed computer would find a left column 172 of the parent and two rectangles (B) and (C) whose top borders span from this parent's left column to its right column 174. The computer would also find rectangle (A) which also spans these same left and right coordinates of the parent rectangle, thus defining the other side of an imaginary line 176. Thus, the imaginary line 176 is the top borders of (B) and (C) and the bottom border of (A).

The computer repeats this process recursively with the immediate children rectangle of every parent rectangle until every necessary rectangle is defined. Every time the computer defines immediate children rectangles of a parent rectangle, it generates an HTML table within the parent rectangle which specifies its children rectangles based on their coordinates.

As persons skilled in the art will understand, in HTML all rows within a column must be the same width, and all columns within a row must be the same height. Because of this, many of the tables that the computer creates will have either rows or columns, but not both. The only tables that will have both rows and columns will be tables that can meet this HTML restriction. The purpose of dividing up the rectangles based on imaginary lines that extend the full width or height of their parent rectangle is to meet this HTML restriction by generating the simplest HTML.

In some cases, it may also be possible to use the rowspan and/or colspan HTML tags to produce this same result, rather than always generating another HTML table. The table generation method is preferred for the general case, however, because the rowspan/colspan variation cannot concisely specify screen layouts of arbitrary complexity. This is because the rowspan must be in whole increments of the row that it is spanning, and colspan must span whole increments of columns. Thus, in those cases where the specification rectangles dimensions are within these whole increments of the dimensions of other rectangles, this variation may be used. It may also be possible to generate many "dummy" rows or columns that are one pixel tall or wide to achieve arbitrary alignment. However, this would make the generated HTML larger and more complex than required, thus lowering quality.

The table generation method may have its table (or column) widths specified as either a fixed number of pixels. Alternatively, the table (or columns) widths may be specified as a percentage of the screen based upon the relative pixel widths in the original specification.

Figure 43:
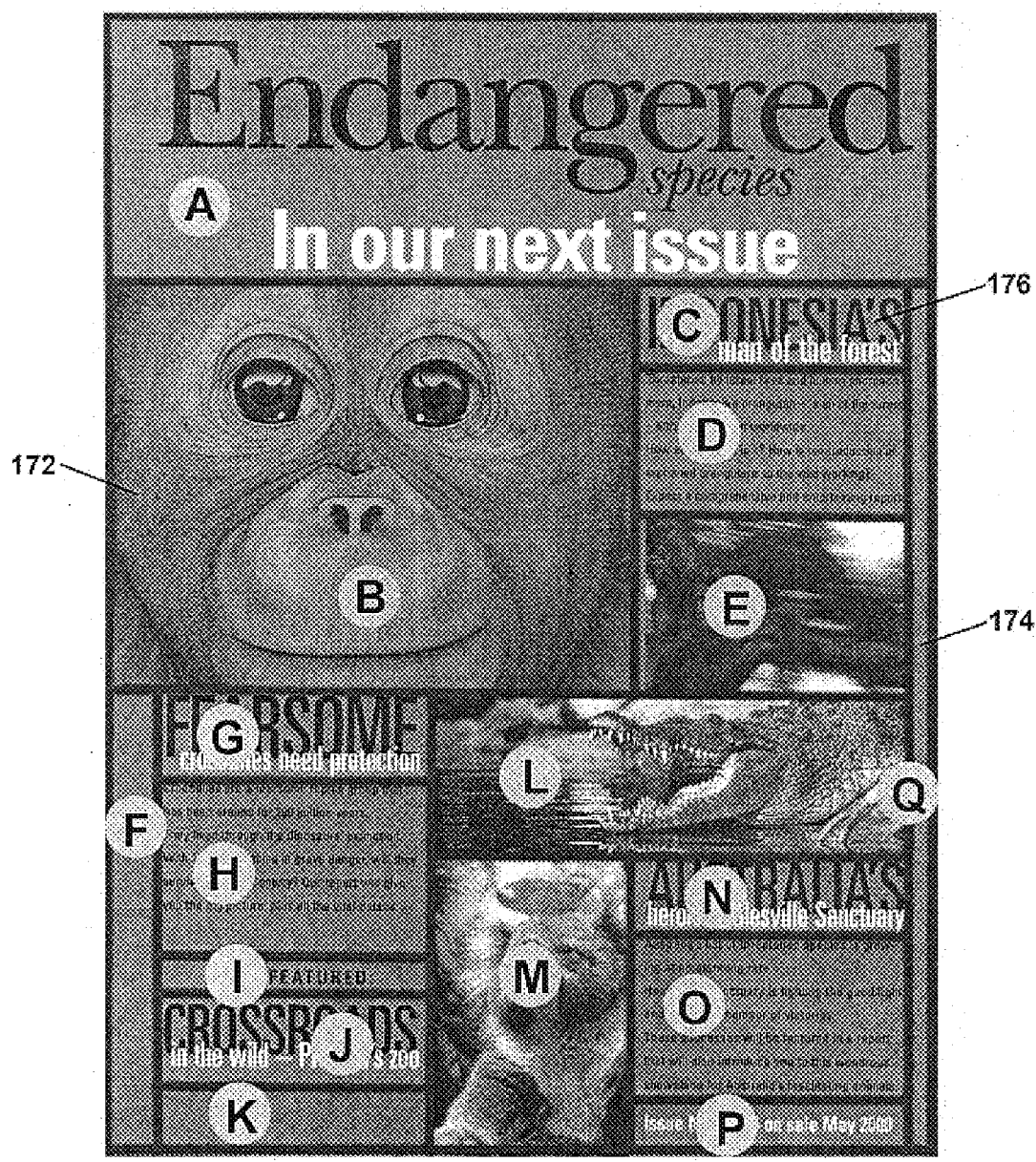
FIG. 43 shows a complex page layout that has been divided up into a plurality of rectangles that contain graphic and text.

Returning to the previous example of processing the magazine cover shown in FIG. 43, the first table thus includes (A) as the top row and (B) through (Q) as the bottom row of the master table. This is because the line that divides them extends the whole width of the page, which is the screen and thus considered to be the highest parent rectangle. Since there are no more lines that extend the full length or height of the page, the computer is done specifying the master table after this operation.

Continuing with processing of the magazine cover, the bottom row of the previous table becomes the next parent rectangle, and the line dividing (Q) from (B) through (P) specifies the left and right columns of the next table, respectively. Since there are no more lines extending the full length or width of this parent, the computer is done with this parent.

The left column of the previous table becomes the new parent, and the line dividing (B) through (E) from (F) through (P) becomes the next table's top and bottom rows, respectively.

The top row of the prior table is divided into left column (B), and right columns (C), (D), and (E). Another table is generated from the right column of this table with (C), (D) and (E) as its three rows.

The bottom row of the table that has (F) through (P) as its bottom row is divided into three columns including (F) as a first column, (G) through (K) as a second column, and (L) through (P) as a third column. The column including (G) through (K) is divided into a table with five rows. The column including (L) through (P) is divided into (L) as the top row, and (M) though (P) as the bottom row. This bottom row is further divided into (M) as the left column, and (N) through (P) as the right column. This right column is divided into three rows for (N), (O) and (P), respectively, to complete the parsing of the magazine cover.

DFA Recognition of Full Color Icons

The term "Full Color" is intended to mean any color depth corresponding to the screen image such that text of possibly differing colors and icons can be processed using a single set of DFA states. As persons skilled in the art will appreciate, many different DFA recognizers and variations could be constructed based on the principals and basic methods described above. With some of these variations, it is possible to recognize all types of text as well as icons in a single pass of the DFA recognizer over the bitmap representation of the screen. This can be done, for example, where all of the FontInstances and text foreground and background colors are known in advance. The basic change to the above-described methods and processes is that the _RECOGNIZE_RESUME ActionCode is no longer needed. It is no longer needed because each character or icon is processed as a separate full color rectangle. This technology would also allow dithered (i.e., anti-aliased) text to be efficiently recognized.

Figure 44:
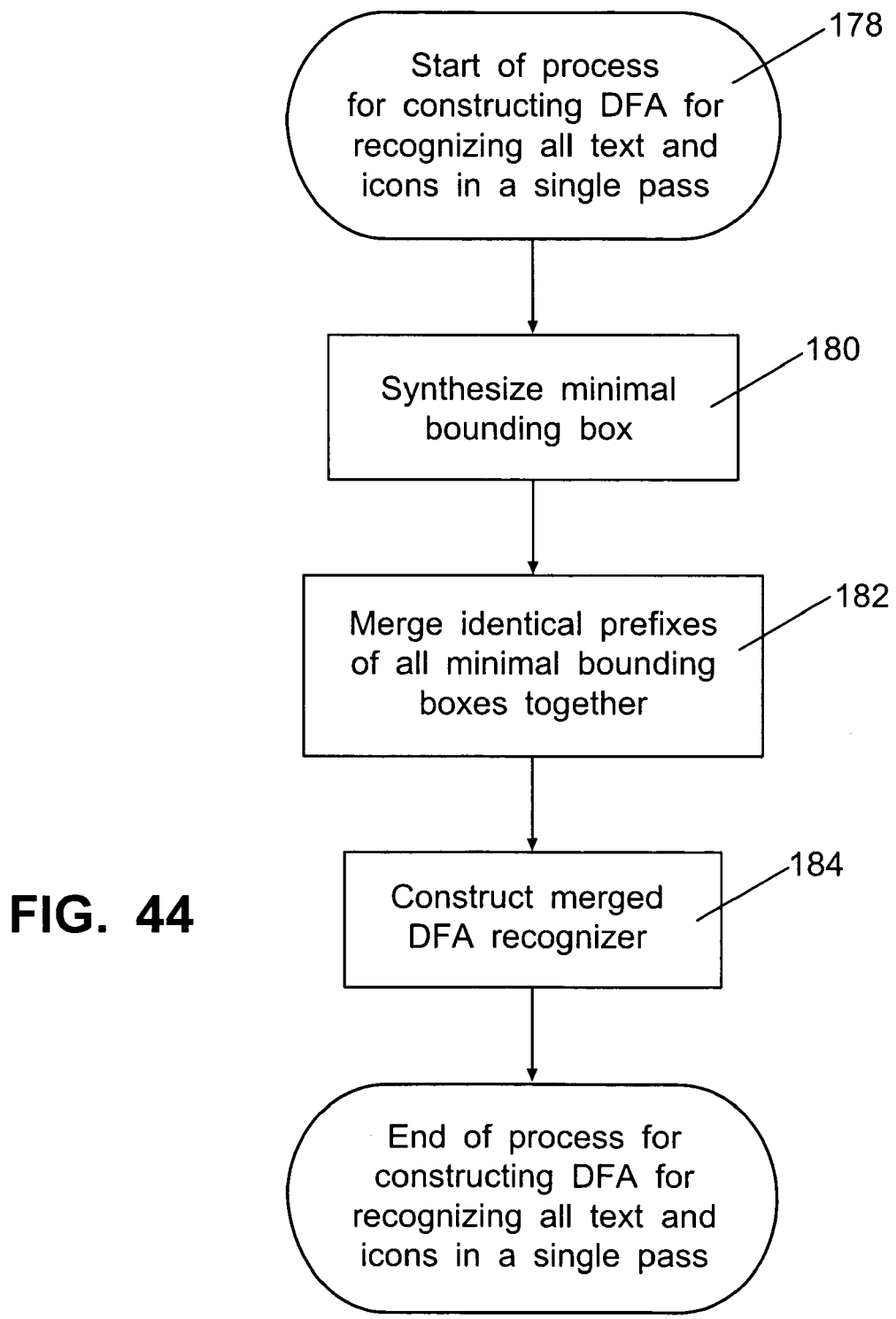
FIG. 44 shows a logic flow diagram of an exemplary process for constructing a DFA for recognizing all text and icons in a single pass.

Referring now to FIG. 44, an exemplary process 178 for creating a DFA capable of recognizing all text and icons in a single pass will be described. For this process, it is assumed that the background color for the text and icons is a single solid color. If this is not the case, an alternative method (described below) can be used. The description of process 178 will begin by fully explaining exactly how this process would be used to create a DFA capable of recognizing full color icons in one pass. After this, the discussion is expanded to include a DFA capable of recognizing text in a single pass.

Process 178 begins with a step 180 of synthesizing (or deriving) the minimal bounding box rectangles for every item to be recognized using the local machine's color scheme and FontInstances. (The synthesizing step is elaborated further below). An alternative to this synthesis is to merely capture the portion of data from the screen that represents the graphical user interface (GUI) control element (defined in APPENDIX G) to be matched. This synthesis (or screen capture) occurs for icons and keywords. The synthesis occurs for character sets, including every instance of overlapping glyphs. A sample code snippet for determining the overlapping glyphs that must be represented in the DFA is shown in FIG. 47. Because the process associated with the _RECOGNIZE_RESUME ActionCode is no longer used, there are far more overlapping glyphs that need to be represented. This fact, taken together with the fact that each DFA record only represents a single full color pixel instead of as many as 32 pixels, makes the DFA recognizers much larger. If a large quantity of text must be processed, however, this alternative process could be much faster than the original method because it eliminates the translation of the screen to a vertical monochrome representation, and, processes every FontInstance in a single pass. This process is ideally suited for the recognition of graphical user interface (GUI) control elements (defined in APPENDIX G) for the specific use of automating graphical user interface (GUI) applications described in appendix G.

A second step 182 of process 178 involves merging all of the identical prefixes of these minimal bounding box rectangles together. Step 182 assumes that these rectangles will all be aligned to a common point of origin, e.g., the upper left corner of the rectangles. These bitmaps are treated as strings of fill color pixels. According to a preferred embodiment, the upper left corner is the first pixel, followed by the next pixel to the right, in book read order. Thus, the top row of pixels from the first part of this string of pixels, followed by subsequent rows. All of these (numerically sorted) strings of pixels are merged together in the same way that was described above for the text DFA. In this case, however, step 182 must also keep track of the end of each bitmap row.

A third step 184 of process 178 involves constructing the merged DFA recognizer. This can be accomplished in a process very similar to the text DFA recognizer described above. The primary difference is that the merged DFA recognizer makes use of another ActionCode: _NEXTROW. The NEXTROW ActionCode informs the DFA recognizer to resume its scanning at the screen coordinates that correspond to the first pixel of the next row of the set of icon/text rectangles being matched. In some cases, _NEXTROW is the default action of a _SUBSTRING ActionCode. (Note: _SUBSTRING was previously described as _SUBSTR_NEXT, and _SUBSTR_BSEARCH).

Figure 45:
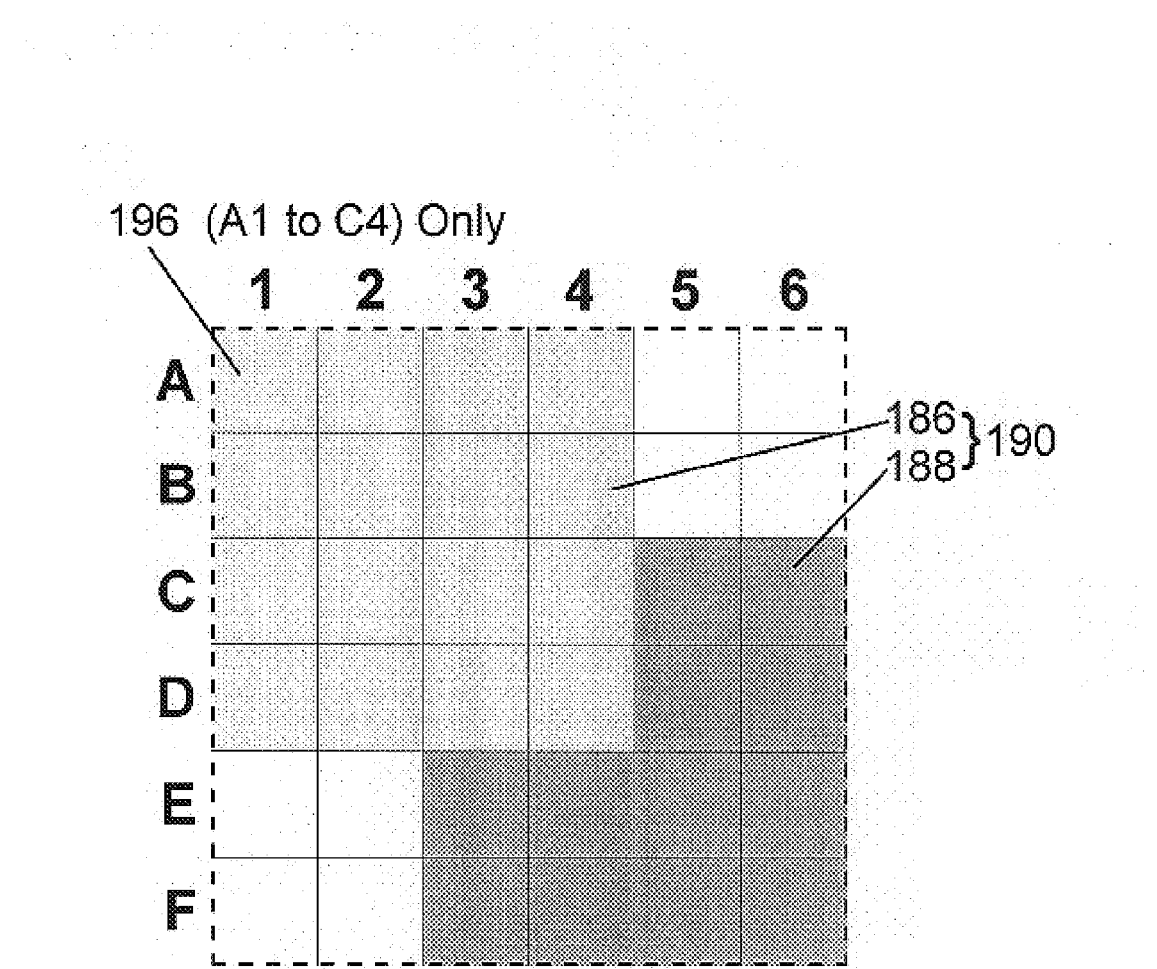
FIG. 45 shows a bitmap for two full color simplified icons, where one icon forms the subset of another because of the way that the larger icon overlaps the smaller one.
Figure 46A:
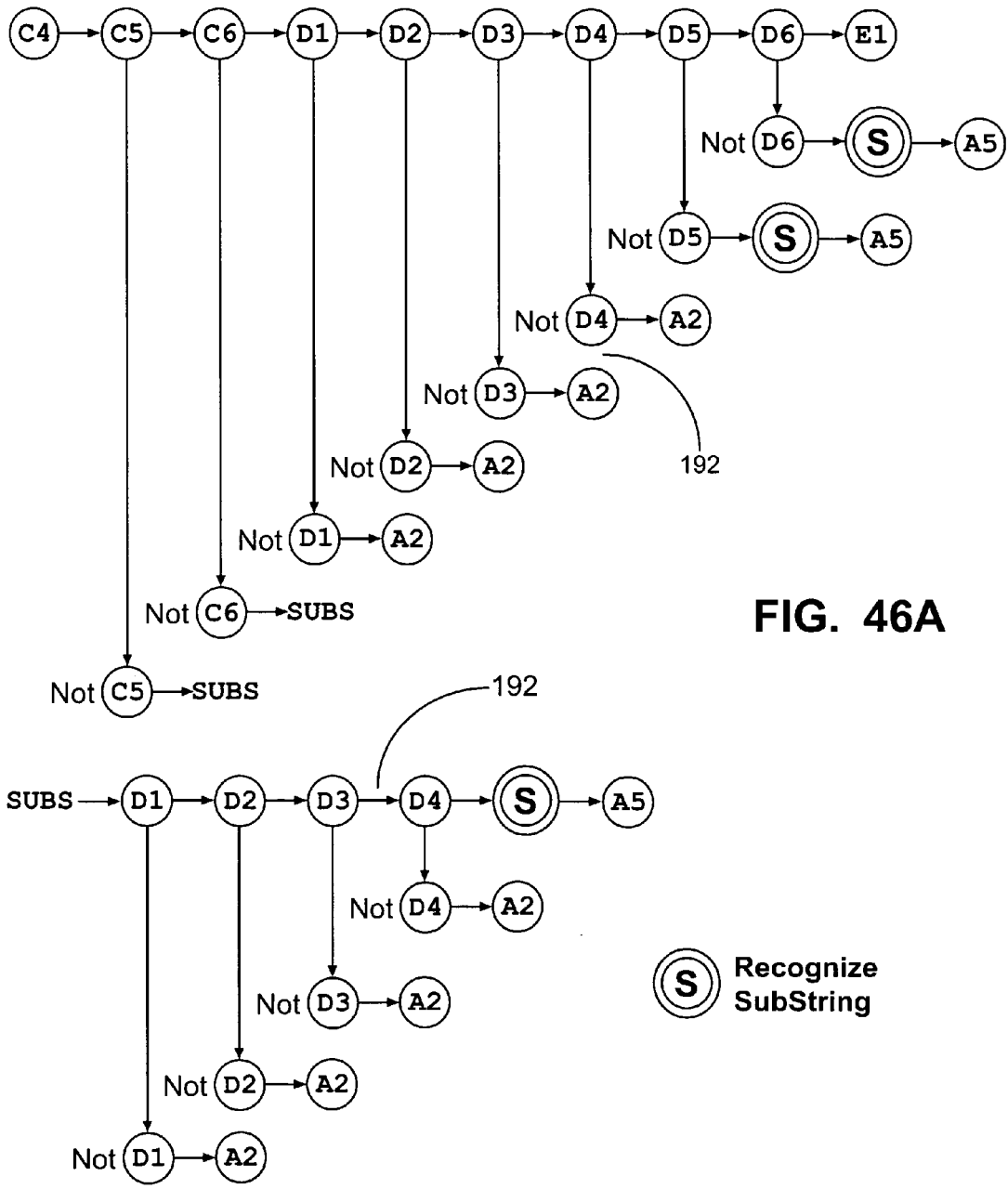
FIG. 46A shows a state transition graph for recognizing the two simplified icons shown by the different colors in FIG. 45 and a third simplified icon contained within the two icons.
Figure 46B:
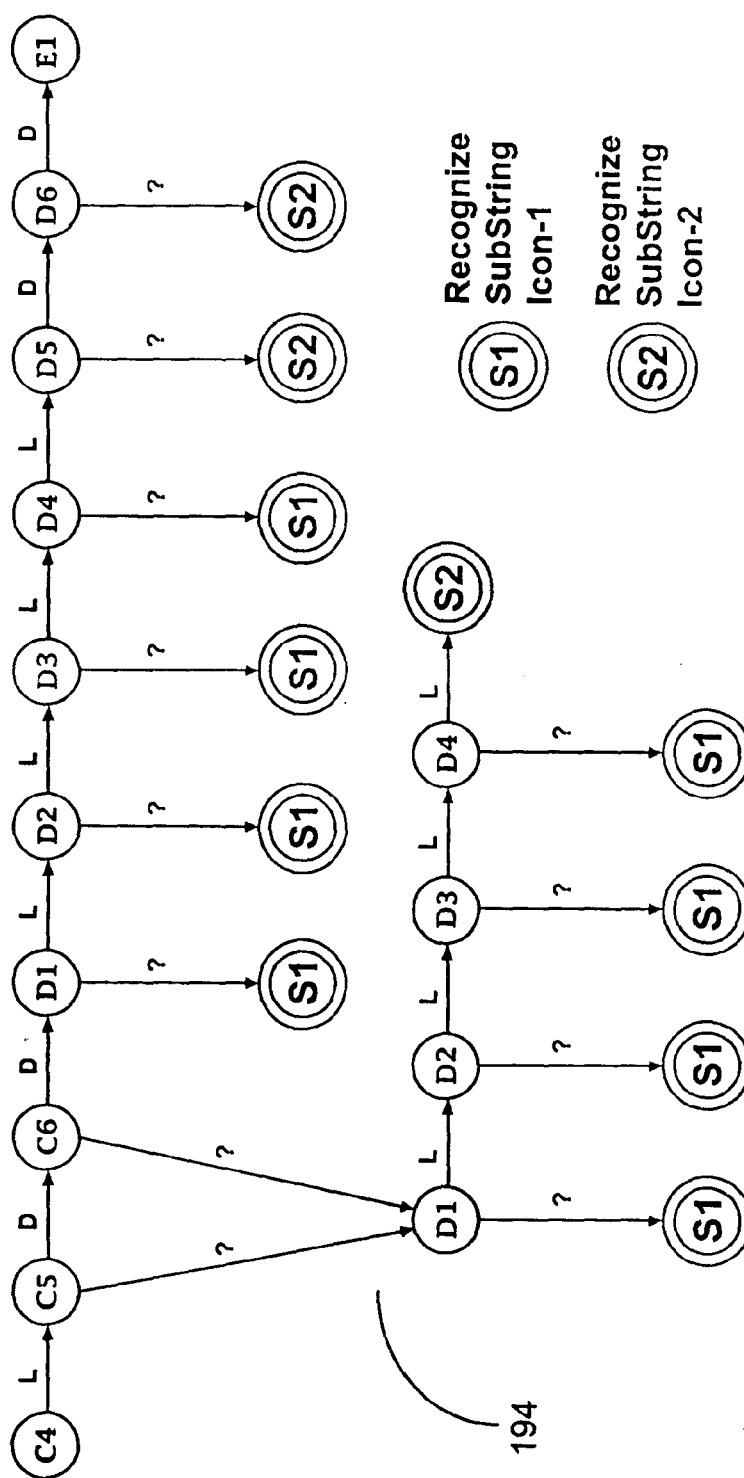
FIG. 46B Shows a state transition graph for recognizing the two simplified icons shown in FIG. 45
Figure 46A:
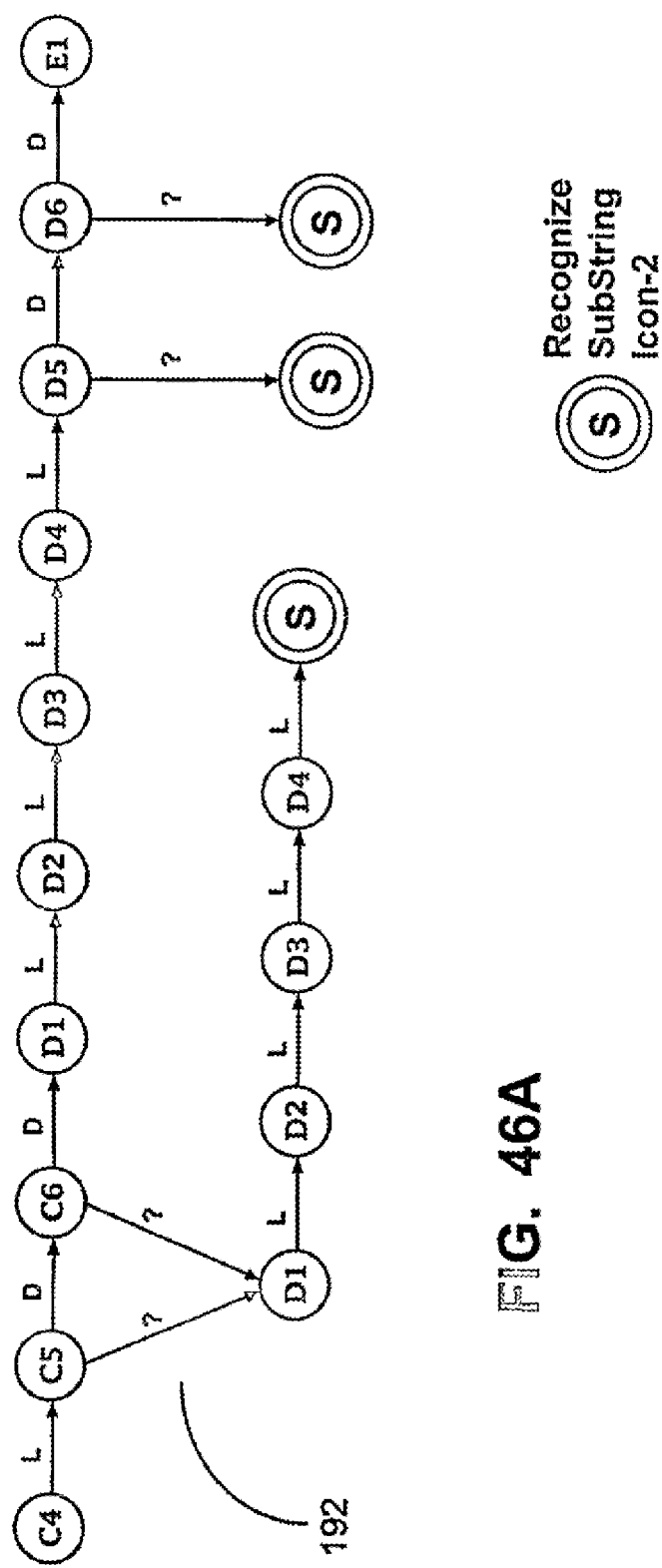
Figure 46B:
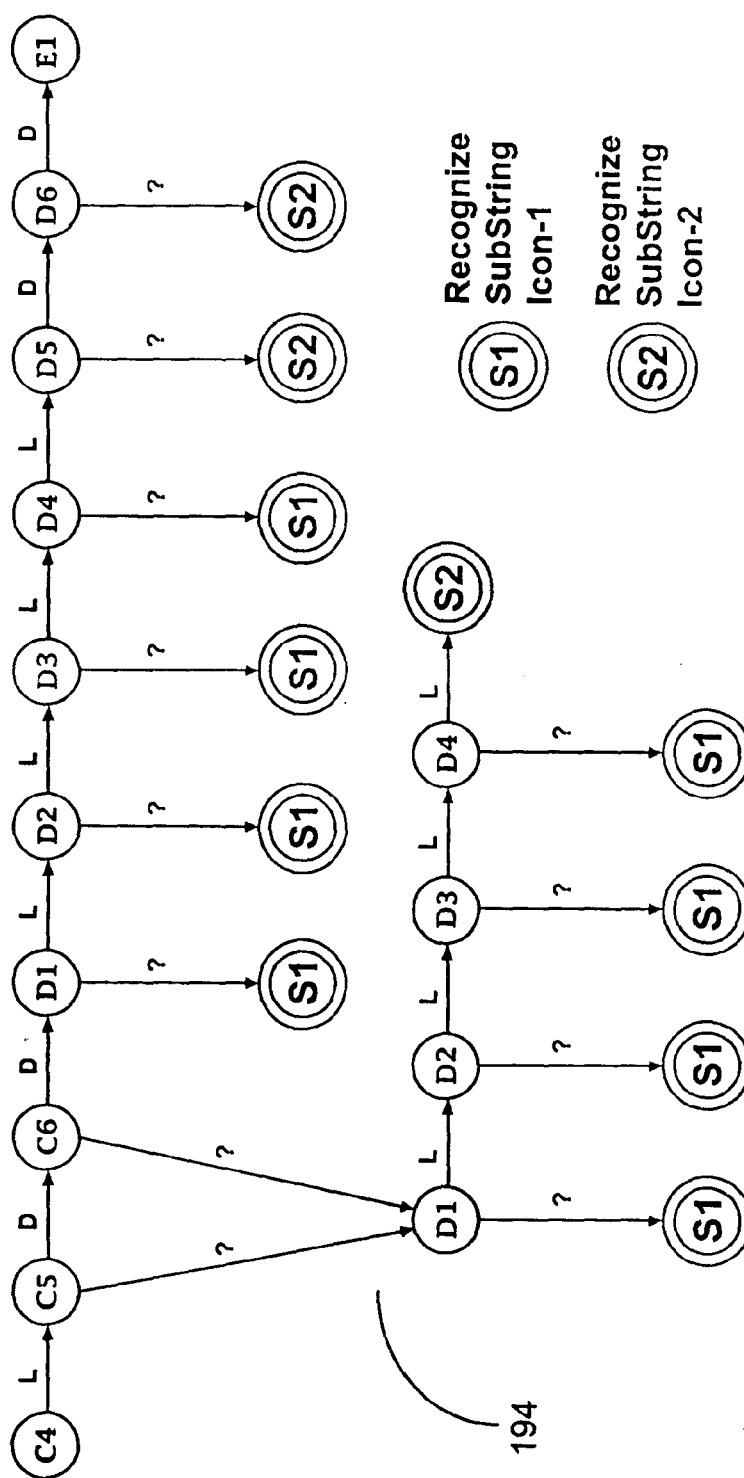

Referring now to FIGS. 45, 46A and 46B, a simplified example of using a one-pass DFA recognizer (constructed using process 178 described above) to recognize two icons will be presented. In FIG. 45, the light colored squares (A1) through (D4) inclusive are assumed to be a four by four pixel representation of an icon 186. Icon 186 is combined with the dark color pixels (indicated generally by 188) to form the larger super string icon 190, i.e., icon 186 forms a sub string of super string icon 190. The white areas within the dashed lines (i.e., squares A5, A6, B5, B6, E1, E2, F1, F2) are not part of either icon and are assumed to be the background color.

Turning now to FIG. 46A, an exemplary state transition graph 192 of a simplified DFA recognition processing of icons 186 and 190 is shown for processing of the points between states (C4) and (E1). One example of the use of the new _NEXTROW ActionCode as the default action for a _SUBSTRING ActionCode would be the transition from state (C5) to (C6). The default action of failing to match (C5) results in executing a _NEXTROW ActionCode that transitions to (D1).

Turning now to FIG. 46B, a more complex one-pass state transition graph 194 for processing several levels of a sub string within a super string is shown. In particular, squares (A1) through (C4) in FIG. 45 are assumed to form another sub string icon 196, which in FIG. 46B is named SubString01. The larger sub string (A1) through (D1) is named SubString02. There are two basic types of _SUBSTRING: (1) recognition (_IDENTIFIER, _DUPLICATE), and (2) cursor positioning (_NEXTROW). Whenever the first type is encountered, this state is stored so that if subsequent matching fails, this default recognition will take place. If there are multiple levels of this type of SubString encountered, the DFA is constructed such that the most recent one supersedes all of the others.

Now that the method for constructing a one-pass DFA has been explained, an alternative method of using such a DFA for recognizing text as full color icons will be provided. To integrate character text DFA matching capabilities into the full color icon recognition process, the text DFA data must be recognized as bounding box rectangles of tmHeight by ABC.abcB width. This is done for every character in every FontInstance of every foreground and background color combination that will be specifically required. Triple overlaps and double overlaps will be represented as these same sized bounding box rectangles. The remainder of the process is substantially the same as the full color icon DFA matching process.

The following table shows how the strings of data from the state transition graph examples shown in 46B and 46A would need to be preprocessed to enable them to be translated into these state transition graphs:

| | |
|---|---|
| substring icon<br>GGGGGGGGGGGGGGGG | 4 * 4 pixels |
| above icon after preprocessing<br>GGGGWWGGGGWWGGGG??GGGG | 6 * 4 pixels |
| superstring icon<br>GGGGWWGGGGWWGGGGBBGGGGBBWWBBBBWWBBBB | 6 * 6 pixels |

G = Gray pixel
B = Black Pixel
W = White (background) pixel
? = Wildcard pixel (matches any color) also known as a dontcare state The only reason that this preprocessing needs to be done is because these two icons have different widths, and one of them forms a substring of the other.

The way that we can detect the need for this preprocessing is that the first pixel rows of various icons match each other up to the length of their respective rows, and the lengths of these rows vary.

Recognizing Text as Full Color Icons

An alternative way to process text as full color icons would be to process text as minimal bounding boxes, instead of boxes of tmHeight. The advantage to this is that it would tend to reduce the requirement for preprocessing, and reduce the number of pixels needing to be processed. Both of these would reduce memory requirements. We would know the FontInstance of any matching characters. From this information we can discern the set of characters sharing a common baseline. This is determined by the rectangular pixel coordinates of the matching glyph, adjusted by the offset from this character's top black pixel to its baseline. The disadvantage of this approach is that it would tend produce a larger set of duplicate matches that would need to be disambiguated. This would especially be the case for tiny punctuation characters when several different FontInstances are being recognized in the same pass. The FontInstances of immediately adjacent text will be used in this disambiguation process.

A vertical bar character of two different font sizes would form one example where preprocessing would still be required, even if we reduced the pixel area of the glyphs to their respective minimal bounding boxes.

The dontcare state is translated into a _SUBSTRING state when it is encoded in the DFA. This state contains all the pixels to be matched. In the event of failing to match these pixels, the DFA transitions to another nonfailure state. This can be seen in FIG. 46B in the node named Not(C5). This node transitions to SUBS, which processes the substring icon.

Dontcare states are encoded in the input to the DFA build process. Since each state must represent a 24-bit RGB value, and we encode this value in a 32-bit unsigned integer, we can use the high order byte to encode a flag indicating a dontcare state. By setting any of the bits in the high order byte to a one, the dontcare state will always sort to the bottom of any set of state transition values. The background color is merely encoded in the DFA as a pixel of the actual background color. After this preprocessing has been done, the translation into the DFA now has input of the same basic form as specified in the preferred embodiment.

As persons skilled in the art will appreciate, this process may not be feasible today for processing many different italic FontInstances at one time. This is because there are generally too many overlapping characters to fit in memory according to current memory prices. However, this will likely change within the next few years. Thus, this method will likely become a preferred method over time. This method can currently work very well with most any other case besides italic FontInstances. For example, it works just as efficiently with both dithered (anti-aliased) text as well as text with a single solid foreground color.

Figure 48A:
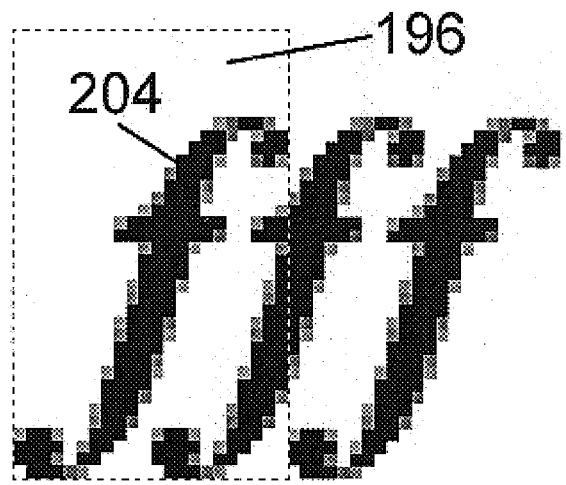
FIG. 48 shows minimal character bounding boxes for each character in a sequence of three overlapping text characters in a dithered (anti-aliased) font.
Figure 48B:
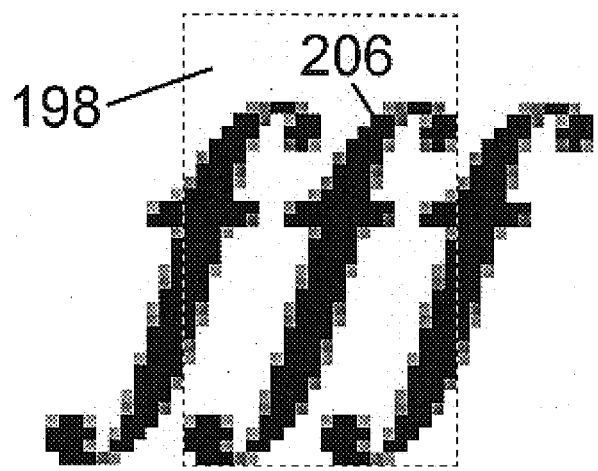
Figure 48C:
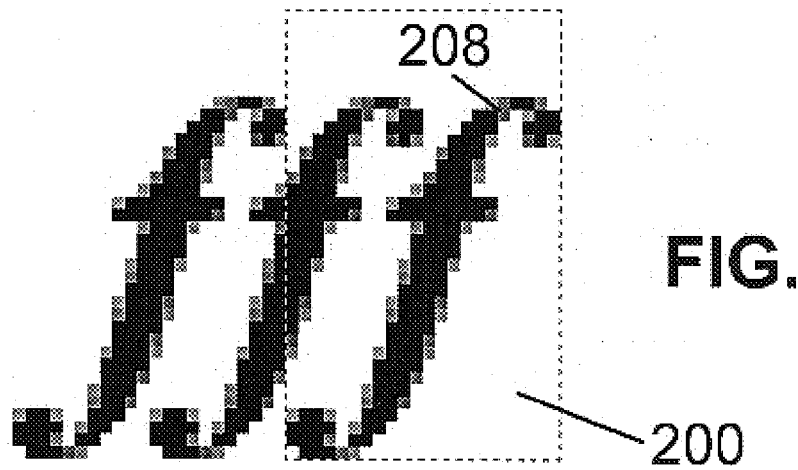

This variation of the color icon DFA matching makes a few changes to its basic process. In particular, every pixel of the screen is scanned by the DFA. The DFA can no longer ignore regions of the screen that have already been matched. Because this DFA processes the character bitmap as a rectangle that is ABC.abcB width wide, (this is precisely the black pixel width of the character) some of the overlapping portion of overlapping bitmaps would be included within the boundaries of this rectangle. This is shown in FIGS. 48A, 48B and 48C, in which bounding box rectangles 196, 198 and 200 are shown for the first, second and third characters 202, 204 and 206, respectively. In this example, the bounding boxes 196 and 200 of the first and third characters 204 and 208, respectively, both overlap the bounding box 198 of the second character 206. Because of this, the DFA must either backtrack and process the overlapping portion again, or simply process every pixel on the screen regardless of prior matching. The simpler approach is to merely process every pixel on the screen. Another method could be developed that keeps track of all the possible combinations of backtracking, and changes the scanning order of the screen accordingly. This method might produce faster results than merely processing every screen pixel.

The DFA must also keep track of every possible match. SuperString matches will still take priority over SubString matches. However, SubString matches will no longer be completely superseded by SuperString matches. When the DFA matches a character, the screen coordinates of the matching character are stored. Because each DFA sequence has less information than the text DFA sequences, the matching process for each of these sequences may at times be less definitive. Instead of precisely matching a single character within a single FontInstance, the process might match a small set of these. Which of these is the correct one can be determined by forming set intersection with the adjacent matching rectangles. The process must also consider whether or not these rectangles have an alignment relative to each other that is compatible with the results of the set intersection.

Figure 49:
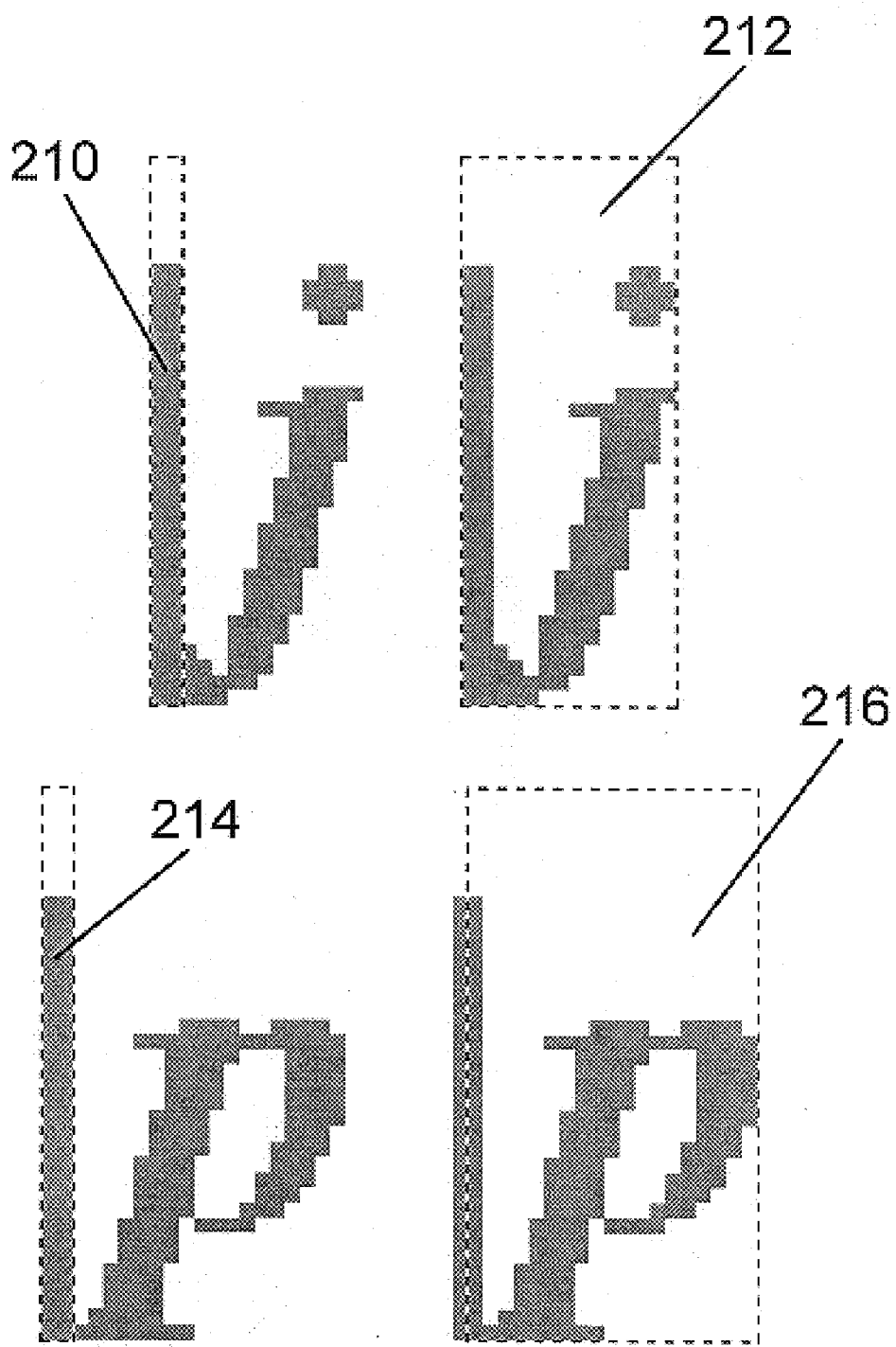
FIG. 49 shows minimal character bounding boxes for each character in two different pairs of overlapping characters.

FIG. 49 shows how this process would work. The FontInstance is TrueType "Times New Roman", bold, italic, 24 point font. From this figure, we can see that the bitmap for the "l" portion 210 of the "lj" sequence 212 is identical to the bitmap of the "l" portion 214 of the "lp" sequence 216. In this example, it is assumed that the complete set of overlapping character bitmaps that can follow the character "l" are the characters "j" and "p". Moreover, it can also assumed that the complete set of overlapping prefixes to characters "j" and "p" is only "l". Thus, the DFA recognizer can determine that the second bitmap in the first row must be the bitmap for the overlapping sequence of "lj". Also, the second bitmap in the second row must be the bitmap for the overlapping sequence of "lp".

Often these sets are much larger. In some cases, set intersection may derive more than one result. In this case, the process can use the PixelsBetween[ ][ ] array to find which matched glyph patterns correspond to the set of possible overlapping glyphs that have been derived.

DFA Portability Across Different Machines

Figure 63:
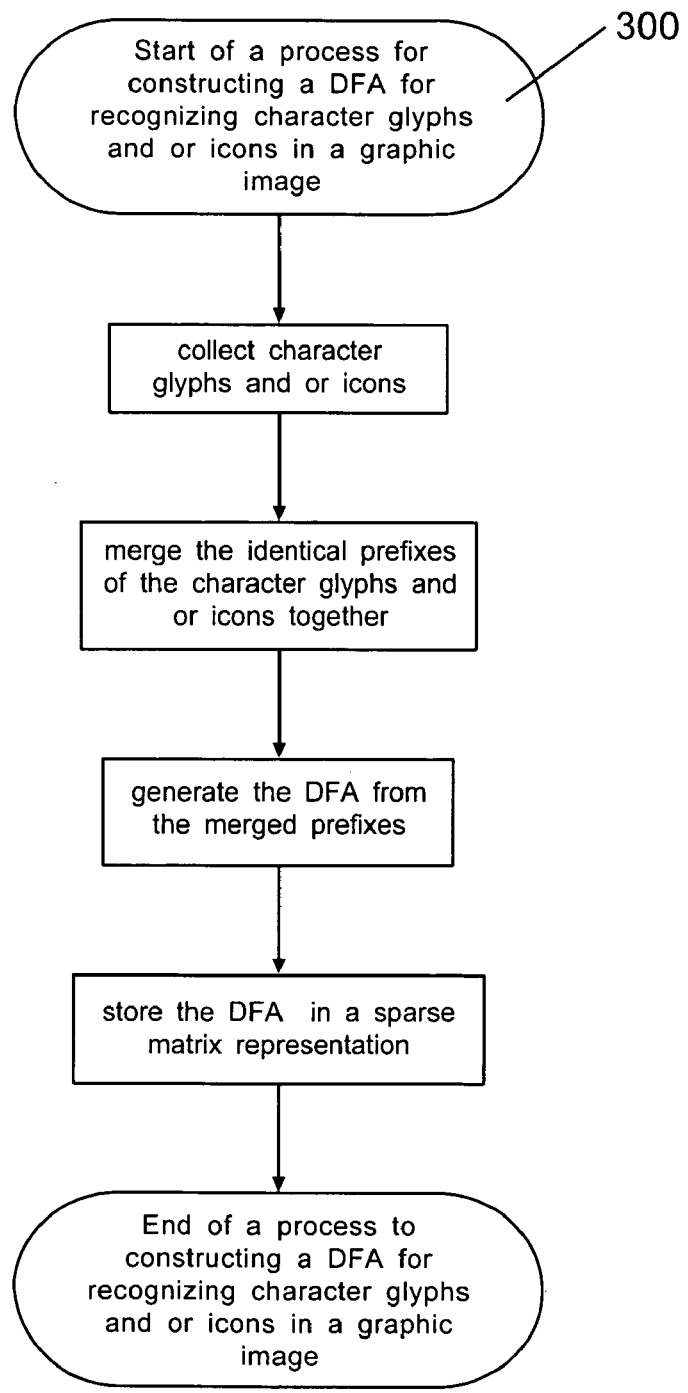
FIG. 63 shows a logic flow diagram of an exemplary process for constructing a DFA for recognizing character glyphs and or icons in a graphic image.

FIG. 63 shows a generalization of the DFA build process as it applies to the preceding two sections DFA RECOGNITION OF FULL COLOR ICONS and RECOGNIZING TEXT AS FULL COLOR ICONS.

As persons skilled in the art will recognize, it may be necessary to synthesize the DFAs to account for local machine differences. To make the DFA recognizers portable across many different computers, DFA recognizers can be stored as generic parameters. For example, each DFA recognizer can be synthesized such that it can be represented in a bounding box rectangle of at least two colors (foreground and background). These parameters might include the following:

| Text | Icon |
| --- | --- |
| Text strings sought - this is an optional parameter, and only included in special cases. | Icon bitmap with transparent background color (or we may merely store which color is the background) |
| FontInstance - MS Windows® SystemParametersInfo( ) SPI_NONCLIENTMETRICS | Icon actual background color MS Windows® GetSysColor( ) COLOR_DESKTOP, for application icons |
| Foreground and background colors - MS Windows® GetSysColor( ) | Icon selected color - MS Windows® GetSysColor( ) COLOR HIGHLIGHT |
| Dithered or not dithered - MS Windows® SystemParametersInfo( ) SPI_GETFONTSMOOTHING | Icon disabled color - MS Windows® DrawState( ) DSS_DISABLED |

The purpose of this synthesis is to construct DFA recognizers that can be transported to different computers, and then compiled to work within the local machine's color scheme and FontInstances. This is especially useful in the case of using the DFA recognition technology for the application in APPENDIX G. The foregoing parameters form the set of user selectable local machine color and FontInstance choices. They also provide the FontInstance and color choices that MS Windows® itself uses. By knowing the FontInstances and color choices that MS Windows® itself uses, it is easy to derive a DFA recognizer that can intelligently "see" the current is state of MS Windows®.

In the case of the FontInstances, foreground colors and background colors that MS Windows® itself uses, these can be obtained from the operating system. These values can be seen and modified by users using the Settings, Control Panel, Display, Appearance menu sequence. Application programs use many of these same values for their graphical user interface (GUI) control elements. These values are associated with generic names. For example, "menu" provides the FontInstance information, including both foreground and background colors for application menus. Additionally, the "desktop" parameter provides the background color upon which application icons are placed. Together the set of all of these parameter names will be called "DFA portability parameters". If certain menu items need to be selected from an application program by another control program, then the text strings that need to be selected and that selection is from a menu form the required generic parameters. When this control application is run on a particular host machine, the specific DFA required is generated from the specific values associated with these generic parameters. Thus, if a control program of the nature mentioned in APPENDIX G needs to control a word processing program, it could look up the FontInstance and colors for "menu", and then automatically generate a DFA recognizer for this FontInstance and colors. Then it would enable the control program to "see" all of the elements on the menus generated by the application program. The control program could then make selections from these menus, based on the technology further elaborated in APPENDIX G.

Alternative Method for Recognizing Full Color Icons

Figure 50:
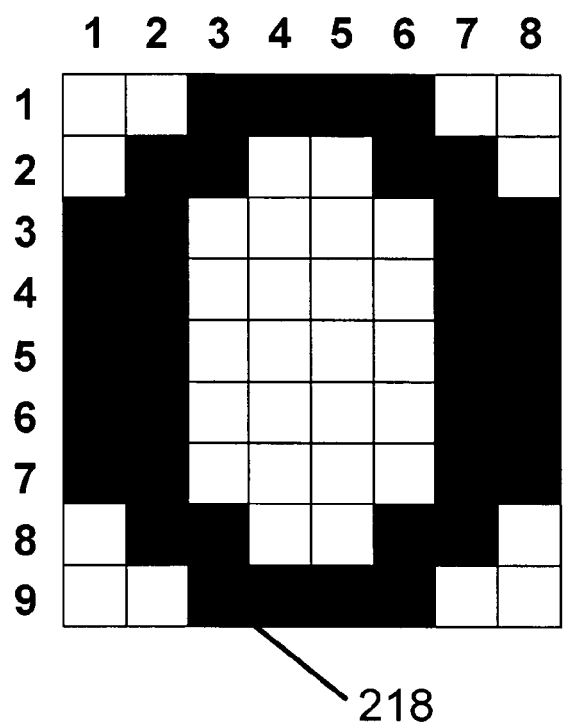
FIG. 50 shows a bitmap grid of a full color icon that has an "0" shape which allows background color to show through the center of the icon and around the icon.

Referring now to FIG. 50, an alternative method for recognizing full color icons will be presented. In FIG. 50, an icon 218 shaped like the capitol alphabetic letter "O" is shown. With this example, the center of icon 218 must be ignored because it is transparent, thus allowing the background color to show through. In addition, all of the pixels (forming the remaining background) surrounding the edges of icon 218 must be ignored. By explicitly ignoring all of the background portions of icon 218, it is possible to recognize icon 218 on a background that is a full color image. This may be accomplished in MS Windows® by selecting "wallpaper" for the "desktop". Because this image has many different colors, and the fact that icon 218 can be moved, the only reliable way to recognize icon 218 (in the case of "desktop wallpaper") is by explicitly ignoring the background colors. This same process can be used to make the DFA portable across different color schemes. The tradeoff is that at least two passes over the screen data will likely be required to recognize both icons and text. The number of passes may also increase beyond two if, for example, there are incompatible text foreground and background colors, e.g., black text on a white background coupled with white text on a black background. Although these can be processed together in one pass using the "text as full color icons" method (described above with reference to FIGS. 45, 46A and 46B), they must be processed separately in the original vertical "slice" method.

To restrict the processing of icon 218 to only its foreground pixels, the one-pass method must be able to move the cursor (i.e., the current screen pixel position being examined) in two ways. First, it must be able to move the cursor to the next row, then backward or forward as required to a column position relative to the current column position. Second, it must be able to move the cursor to a column position relative to the current column position.

The two foregoing movements can be accomplished with two more ActionCodes: _NEXTROW_OFFSET and NEXT-COL_OFFSET. The _NEXTROW_OFFSET ActionCode is similar to the _NEXTROW ActionCode but includes a new feature. In particular, the new ActionCode moves to the next pixel row, and also moves forward or backward from the current pixel column by a stored, signed OFFSET value. The new NEXTCOL_OFFSET ActionCode is similar but in this case the offset will always be positive value.

As persons skilled in the art will recognize, the foregoing movements allow processing of icons of arbitrary shapes while ignoring the background portions of the icon. For convenience, processing may begin at the top left most pixel.

FIG. 50 shows how this process works with "O" shaped icon 218. Processing begins at row one and column three, and it proceeds through column six. Then, the _NEXT-ROW_OFFSET ActionCode moves processing to row two, column two. In this case, the offset value is a negative four, so processing continues until row two, column three. At this point, the _NEXTCOL_OFFSET ActionCode moves processing to column six, with the offset value being two. Processing continues in this same way until row nine, column six is reached. At this point the icon is recognized.

Figure 60:
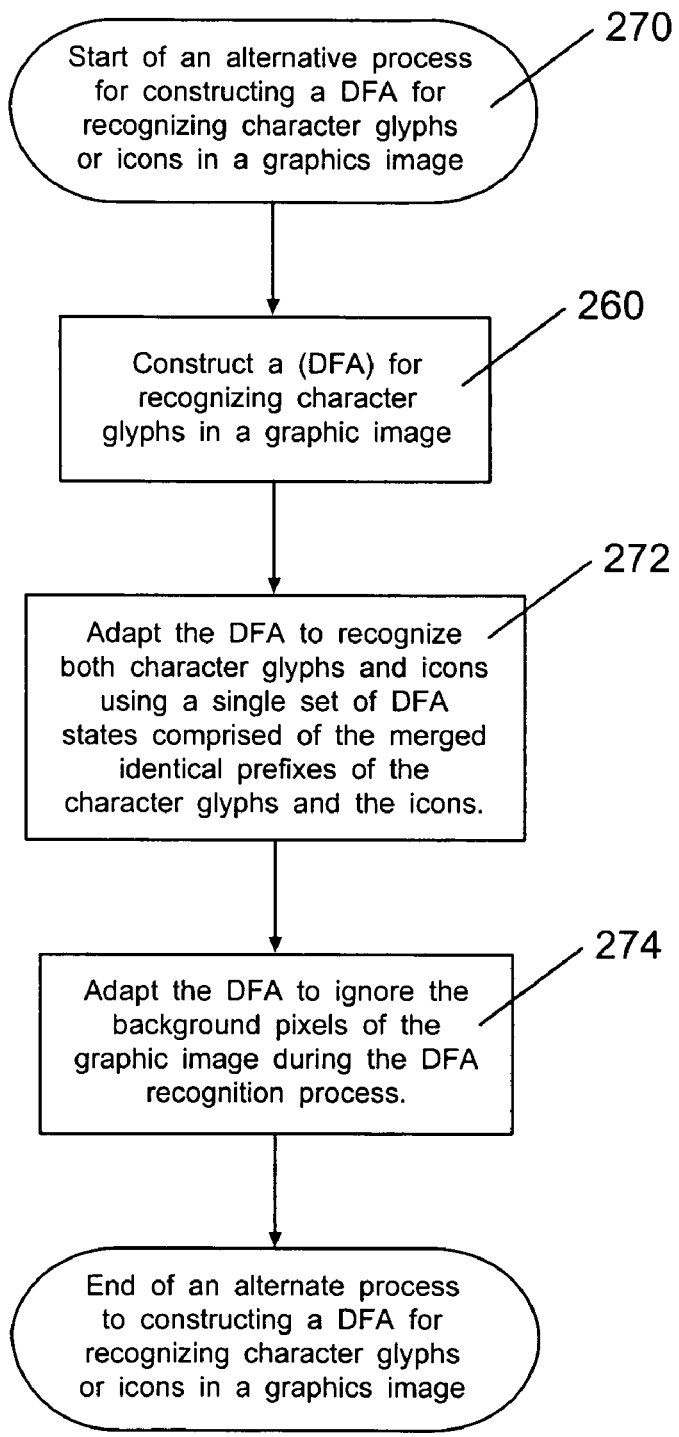
FIG. 60 shows a logic flow diagram of an exemplary process for constructing a DFA for recognizing character glyphs or icons in a graphics image.

FIG. 60 shows a generalization of the DFA build process as it applies to constructing a DFA capable of ignoring the background pixels of icons and character glyphs as elaborated in this section. FIG. 60 includes the process outlined in FIG. 59 as its step 260. Step 272 summarizes the process outlined in FIG. 63. Step 274 summarizes the steps elaborated in this section.

DFA State Transition by Hash Functions

As previously explained, persons skilled in the art will understand that there are numerous adaptations and changes that can be made to the processes and DFA recognizers described herein. For example, an alternative embodiment of the present invention utilizes state transition augmented by hashing. That is, different hashing functions are used as the means for state transition instead of the previously described binary search. According to one such embodiment, the hashing functions might be used only for the first few largest states. By using the hashing only here, the additional memory cost is slight even though the performance gains are significant. For example, it has been estimated (from testing using random data) that about 10% more total memory can about double the overall speed of the foregoing processes.

As persons skilled in the art will recognize, there are many possible hashing functions. One function that is very fast is known as an adjacent bits method. This method selects from the data to be hashed sequences of adjacent bits that are capable of representing a number at least equal to the number of integers to be hashed. An ActionCode with 32×32 1024 combinations can efficiently specify any possible required combination of adjacent bits hashing for 32-bit integers. For example, the low order five bits may be used to store the left most bit position of the adjacent bits, and the next higher five bits may be used to store the number of adjacent bits to be hashed. In the most ideal case, a minimal perfect hash is possible. This requires no more extra memory.

The term "Sparse Matrix" is taken to have the common meaning of the term "Sparse" combined with the common computer science meaning of the term "Matrix", a two dimensional array of elements. Thus a "Sparse Matrix" is to include every means of storing any two dimensional array of elements such that the number of elements stored is significantly less than the number of columns times the number of rows in the matrix. This includes, but, is not limited to storing a two dimensional array as a single dimensional array. The hashing method defined herein involves creating a sparse matrix, where elements are located by a binary search that may be combined with hash algorithms. The specific application of this sparse matrix representation is in the creation of a DFA. This same methodology can be easily adapted for use for many other forms of automatons such as, for example, recursive transition networks, push down automata, augmented transition networks, and many others.

The best approach for implementing this methodology is to expand the space of the earliest few states such that they can be hashed using very simple hash algorithms. The fastest possible hash algorithm involves selecting a sequence of adjacent bits that is either left justified or right justified within the set of integers to be hashed. As persons skilled in the art will recognize, the selected number of bits must be capable of representing a number that is the next power of two larger than the number of integers to be hashed, unless the number of integers to be hashed is itself a power or two. In the best case, the number of integers to be hashed is exactly equal to the maximum value capable of being represented by this sequence of adjacent bits.

In progressively worse cases, more bits are required, which begins to waste more memory. More memory is wasted because the hashing strategy requires use of as much space as the number of bits is capable of addressing. Before proceeding to more bits, however, every other combination of adjacent bits is tested. In tests on random data it was found that the speed of the DFA could be increased at least double, with only about 10% more total memory required. This involved using ten-fold more memory on the earliest states, i.e., the largest and most frequently accessed states. Every possible combination of adjacent bits hashing can be specified in ten bits. This allows 32 combinations of starting bit positions, and 32 different sizes, providing a total of 1024 different forms of adjacent bits hashing. If this is combined with all of the different other forms of state transitions, then a 16-bit ActionCode that forms an index into a jump table will most efficiently select the appropriate form of state transition. The lower six bits could be used for the Action-Code, and the upper ten bits could be used for the required pair of five bit data fields. This provides the DFA with thirty-two different possible actions.

Non-Sparse Matrix DFA State Transitions

According to another alternative embodiment, a non-sparse matrix implementation may be used in place of the sparse matrix processes outlined above. Although this representation would take much more memory, it would also be much faster in its processing. A way to minimize wasted memory would be to use (possibly multiple) sequences of bytes to represent each character column. For example, sequences of three of these bytes could also be used to represent a single full color pixel.

In this embodiment, the state transition is not based on sequences of adjacent bitmap columns alone. Instead, this sequence is preferably defined in terms of processing portions of a column until the whole column is processed, and then proceeding to the next column. Alternatively, the processing could be performed in byte increments of the red, green, or blue portion of a full color pixel. With a Non-sparse matrix representation, the BinarySearch( ) algorithm is replaced with a table lookup. Thus, the Offset field is no longer needed. In addition, the Next field is now used for the NextState. The ActionCode field remains unchanged. The "Bitmap" field is no longer needed because the subscript into the non-sparse matrix takes its place.

The non-sparse matrix DFA is constructed differently than the sparse matrix DFA described above. The non-sparse matrix DFA does not require a list of nodes that are to be transitioned to, based on a binary search match with the current bitmap column. Instead, with the non-sparse matrix method all of the nodes that were previously in the binary search list are placed into a single 256 node wide state. The state transition thus becomes a simple table lookup in a matrix that has the CurrentState, and the ScreenPixelColumnData as its two subscripts. The ScreenPixelColumnData is defined as an unsigned char to correspond to the restriction of the eight-bit wide character column data. This ScreenPixelColumnData field may represent one third of a three-byte pixel to a whole column of an eight-pixel tall character, to several different levels of color depth in-between.

With this alternative method, the only two fields that are retained are the ActionCode field and the Next field. The Next field is used to store the NextState subscript into the state transition matrix. The ActionCode field is used the same way as in the sparse matrix representation method. However, the state transition has the following form:

$$\text{NextState}=\text{TransitionMatrix}[\text{ScreenPixelColumnData}][\text{NextState}].\text{Next}; \quad (3)$$

Because it would take much more memory than the sparse matrix form of this method, this alternative method is not presently preferred. As memory costs drop, this method is expected to become relatively more attractive. As persons skilled in the art will recognize, this method could also be used in conjunction with the BinarySearch( ) method limited to the first few states. This would provide another way of producing very fast state transitions.

Benefits of the DFA Technology

As persons skilled in the art will recognize, the foregoing preferred and alternative embodiments provide a number of very significant benefits. For example, it has been found through empirical testing that the DFA recognition of machine generated characters can most often be accomplished with 100% reliability in the recognition process. Also a DFA recognition process can be performed much more quickly than the typical stochastic processes involved in conventional OCR technology. Because of these two factors, numerous diverse applications can be made of this technology that would not be possible using to conventional OCR technology. (See the appendices).

One of the primary benefits of the foregoing embodiments is they permit anything displayed on a computer monitor (using machine generated characters) to be converted into a near perfect web-page with a single mouse click, often in a few seconds. A similar process to this one could be used to automatically generate the underlying screen layout specification that corresponds to other page layout or programming languages.

Text Data Entry Interface

The present invention also relates to a novel graphical user interface for designing a graphic layout including text and graphics images. As persons skilled in the art will appreciate, an efficient text and graphic image data entry interface can be used in combination with the foregoing methods and systems for processing graphical layouts to quickly generate efficient page layout specification files, e.g., HTML files. After describing a preferred embodiment of one such graphical user interface in detail below, an exemplary process for using this interface to design an HTML file is described in connection with FIG. 51.

The graphic data entry interface of the present invention is especially adapted for very complex page layouts. For example, the interface would be well suited for desktop publishing type applications where text and graphics are arranged on the page with a very specific and precise layout. However, the interface would also be useful for word processing applications that have no need for graphic image layout capability.

In describing the text data entry interface, the following terminology may be used with the following meanings:

| Terminology | Meaning |
| --- | --- |
| FontInstance | The concatenation of the properties of: FontName + FontSize + FontWeight + FontStyle + FontColor |
| CharacterSpace | The return value of GetCharWidth( ) in MS Windows ® for a space character, e.g., ASCII(32) of a FontInstance. |
| NewLine Character | Typically ASCII(13), ASCII(10), or both, depending upon the operating system. |
| Line Space | TEXTMETRIC, tmHeight for a FontInstance in MS Windows ®. Stored as a NewLine Character. |
| Static Text Rectangle (also known as a TextWrapping-Rectangle) | Often this is implemented as the conventional method of placing text in text edit boxes. These are rectangles or "child" windows for text data entry. Most typically they are drawn by clicking and then dragging the mouse. In most cases these text rectangles force text wrapping at their right margins. These are contrasted with Dynamic TextRectangles, as defined below. |
| Dynamic TextRectangle | This is an object (data structure and process) whereby the placement of text can be made within a page layout specification by merely moving the text caret or the mouse cursor to a position and typing. The need to explicitly specify text-wrapping boundaries (required by a static TextRectangle) is eliminated. A Dynamic TextRectangle is called dynamic, because its |

| Terminology | Meaning |
| --- | --- |
| | size is dynamically readjusted as text is added or removed. These TextRectangles are dynamically created, merged together, and deleted as needed. Also text may be dynamically reallocated between TextRectangles. |

The TextRectangle structure that was described above (and illustrated in FIG. 37) could provide one simple way to represent the data of either a Static or Dynamic TextRectangle. The Wrapped2Margin field would distinguish these two types of text rectangles from each other.

According to a preferred embodiment, character spacing and line spacing need not be explicitly specified but may be specified if desired. For example, this spacing may be specified using the spacebar and the <Enter> key, and stored as ASCII(32) and the NewLine Character(s) respectively. Instead of using the spacebar to specify spaces, the user could instead merely use the right arrow key or the mouse to move the TextCaret (i.e., the present cursor position for text input in the TextRectangle). Any required space characters would automatically be added to the TextRectangle→TextDATA field. These space characters would only be added if needed to provide spacing for entered text data. If the TextCaret is moved but no data is entered, then no space characters are inserted. This same process would also apply to NewLine characters. These spacing characters are automatically deleted if the text that they are positioning is deleted.

This process essentially merges the two different user interfaces for text placement from MSDOS® and MS Windows®. It provides the freedom to move anywhere on the page as in MSDOS text editing applications. However, it also provides for the exact placement of variable fonts, that heretofore has only been available in operating systems based on graphical user interfaces (GUI). The significant benefit of this is that precise positioning of variable width, variable size, characters can be accomplished in fewer, simpler steps. All the user needs to do to enter text anywhere on the page is to merely move to the position on the page where the text is desired to appear, and type.

As persons skilled in the art will recognize, the typical interface for accomplishing this same task requires all the following steps: (1) creating a Static TextRectangle on the page defining the area where the text will appear; (2) manually entering any spacing characters or tab stops' required to position the text within this TextRectangle; and (3) entering the text. The novel interface eliminates both steps (1) and (2). In particular, the steps associated with the present text entry interface are: (1) positioning the TextCaret; and (2) entering the text. Step (1), positioning the TextCaret, can be done using CharacterSpace increments or pixel increments. The former could be accomplished using the mouse or keyboard, and the latter could be accomplished using, for example, the <Alt><Arrow> keys.

According to a preferred embodiment, every TextRectangle has all of its text within whole character spacing increments of each other. This allows all the text within the TextRectangle to be formatted entirely with the combination of character spacing (e.g., Space and NewLine) and text justification. There are some cases, however, where it is not possible to keep text within whole character spacing and line spacing increments of nearby text. One example of this is when two text columns of variable width text are placed side by side. In order to make both of these columns exactly left justified, the space between them often cannot be in whole character space increments. In this case, another Dynamic TextRectangle can be created and the newly entered text is allocated to this newly created data structure. When the user moves the TextCaret in pixel spacing increments, this forms another case where another Dynamic TextRectangle may need to be created. Whenever text cannot be reached within whole character spacing and line spacing increments of previously entered text, then another Dynamic TextRectangle must be created.

In a preferred embodiment, the text data entry interface can determine when new Dynamic TextRectangles need to be created, deleted, or merged together. The only thing that the user would need to do (besides selecting the FontInstance) is to position the text caret anywhere on the page, and type. Other operations would be available to the user, but, none would be required. The technology stated in the section entitled DETERMINING TEXT RECTANGLES above may prove useful for accomplishing this interface. This earlier mentioned technology shows a method for dividing up the screen into TextRectangles. These TextRectangles have several common parameters and requirements as specified in FIG. 37.

Figure 58:
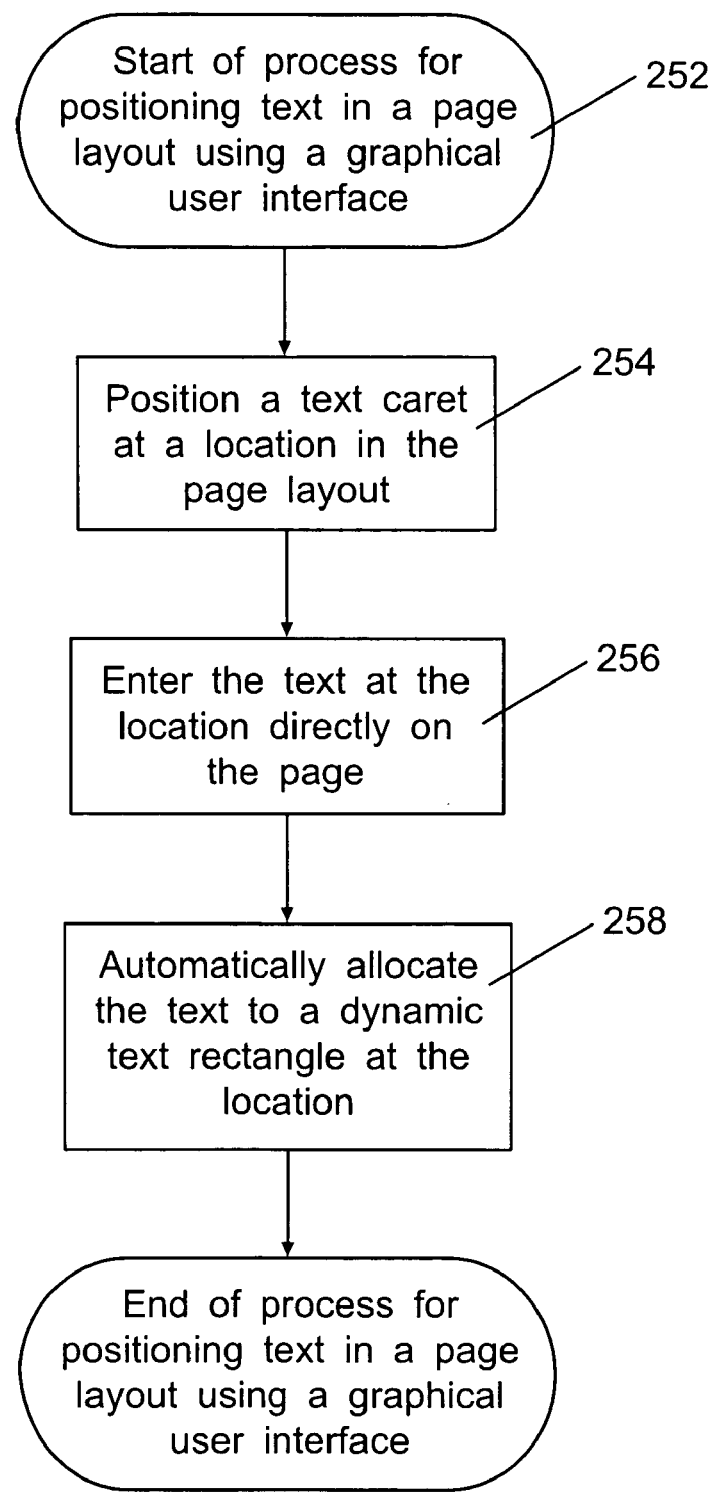
FIG. 58. shows a logic flow diagram of an exemplary process for positioning text in a page layout using a graphical user interface.

Referring now to FIG. 58, a process 252 for controlling a first program using a second program will be described. According to a first step 254, a user positions the text caret at a specific location in the page layout. After this step, the user enters text directly on the page in a step 256. Step 256 is most typically accomplished by entering keystrokes using the keyboard. Several other options such as other input devices are possible. Text could also be entered through cut-and-paste operations, dragging text from other locations on the page. These examples are for the purpose of illustration and in no way meant to be limiting. The next step 258 is the most crucial step. This step uses the technology from this section, and may involve technology from the earlier reference to FIG. 37. The crucial aspect of implementing this interface involves determining which text is to be automatically allocated to which text rectangles, according to the criteria discussed at length in the earlier section entitled DETERMINING TEXT RECTANGLES above. It is this step that removes this burden from the application user. Removing this burden from the application user is the primary benefit of this novel interface. It is through the Dynamic TextRectangle object that the user becomes free to position text anywhere on the page in fewer steps than previously known methods.

There are several ways to reposition the TextCaret after entering a line of text in a newly created TextColumn. According to one such method, the TextCaret could be automatically aligned to the starting position of the prior line. This would occur when, for example, the user hit the <Enter> key on a Dynamic TextRectangle. Text would automatically wrap to this position if the TextRectangle had text wrapping invoked. According to a second (alternative) method, the system could automatically set tab stops to the beginning position of any new TextColumns. This tab stop setting could be retained for the whole page. This would make it very easy to align other columns to this same position. According to a third embodiment (referred to herein as "Leap2Alignment"), the mouse cursor and/or TextCaret would automatically precisely align itself to pre-existing alignment boundaries whenever it gets within a user selectable pixel proximity of alignment. In the specific case of TextColumns, the mouse cursor (and thus TextCaret) would leap to align itself with, for example, the left column of a left justified text column. This is most useful if additional will text be added after other operations were performed on other parts of the page.

Typically, changing the position of the TextCaret with the mouse requires movement of the mouse and then clicking the mouse. Movement of the TextCaret with the keyboard can be accomplished using keystroke combinations such as <PageDown>, etc. Text can also be moved from anywhere on the page to anywhere else by merely selecting and dragging this text. With conventional technology, by contrast, this often involves cutting the text from one text edit box and pasting it into another.

The Dynamic TextRectangle is stored in the previously specified TextRectangle structure. When the user moves the TextCaret or the mouse cursor across the screen, the system determines which TextRectangle structure corresponds to this movement by the proximity of this TextCaret or mouse cursor to the pixel coordinate boundaries of the TextRectangle structure.

Using the novel text entry interface, the TextCaret and mouse cursor can be moved in any of three different ways: (1) character spacing increments; (2) pixel spacing increments; and (3) Leap2Alignment. Method (1) is the default, which has already been described above. Method (2) is used for very precise alignment. One possible means of implementing this method is to use the <Alt><Arrow> keys. In this case one keystroke corresponds to movement by one pixel. Method (3) is leap to alignment in increments. This is used to quickly align two of more elements together. Whenever an element is being moved with the mouse, for example, it leaps to align itself with other page elements whenever it comes within a user selectable proximity of this alignment. For example: If a TextRectangle is being moved to be left justified with a GraphicImageRectangle, then this TextRectangle leaps to exactly align itself with the GraphicImageRectangle when it comes within (for example) five pixels of actual alignment. The pixel proximity is a user selectable value. This alignment can be superceded by pixel increment alignment.

With the present embodiment, the page might begin as a fixed size that is user selected. In this case, the page would have sizing handle borders. Alternatively, the page size could be purely dynamic, always expanding and contracting as needed. These would correspond to Static TextRectangles and Dynamic TextRectangles, respectively. Moving the mouse cursor or text caret could automatically enlarge the page. The size of the page would be considered to be based on the minimal bounding box that contains all of the page's data, thus a movement of a cursor or caret that is not accompanied by data entry would not change the size of the page. If data is later deleted from the page, then the page could automatically reduce its boundaries. If the page were constructed to expand dynamically in any direction, then this page would not require any borders displayed on the computer screen.

It is also possible to have a page with one pair of its margins as fixed, and the other pair automatically expanding as needed. This could be useful in web page development, where a fixed width but expanding length could be used.

Text wrapping can also be added to the Dynamic TextRectangles with a single keystroke. This can be accomplished by merely positioning either the mouse cursor or the text caret over the appropriate text, and touching a key that corresponds to "add text wrapping to TextRectangle". All text that is within whole character spacing or line spacing increments of this text is then surrounded by a minimal bounding box rectangle with sizing handles. This indicates that this text will wrap on these boundaries. Moving the sizing handles can change these boundaries. Text wrapping boundaries could also be removed in a similar way. When changing from a Dynamic TextRectangle (without wrapping margins) to a Static TextRectangle (with wrapping margins), the system could automatically remove the embedded New-Line characters. Likewise, when converting from a Static TextRectangle to a Dynamic TextRectangle, the system could automatically insert NewLine characters.

Another possible method for changing the lower boundary is to merely add text. This lower boundary can have the option of automatically expanding. If this boundary begins to touch another boundary, then it could stop expanding and display a message explaining what has occurred. It is also possible to explicitly draw the text wrapping boundaries using the mouse. This interface already exists and will conform to typical conventions. Preferably, the process of adding these interface enhancements does not involve changing any existing conventions, but instead involves adding these improvements as extensions to the interface.

Until text wrapping is explicitly added to a Dynamic TextRectangle, this TextRectangle only exists as a rectangle implicitly. There are no visible rectangular borders. Part of the nature of this implicit rectangular shape is that any text entered that is nearest to the previously entered text is has its placement automatically adjusted so that it always remains within whole character spacing and line spacing increments of this other text.

As persons skilled in the art will recognize, the above described Dynamic TextRectangle technology provides a number of significant benefits. In particular, it can often save significant time. With conventional approaches for designing complex page layouts, adjustments to the layout often require adjusting the borders of the static text rectangles. Often when these borders are changed, text must be reallocated from one Static TextRectangle to another. This requires cutting the text from one static rectangle, pasting it into another rectangle, and resizing of both rectangles to correspond to their new contents. None of these steps are required with Dynamic TextRectangles. With Dynamic TextRectangles, the TextCaret is merely moved to the point where the text is to be entered, and then the text is typed. Text can be marked and dragged to any location without the need for a containing text rectangle or window. If text rectangle boundaries do exist, then this text is merely dragged across this boundary and the text within the boundary is automatically re-justified, if needed.

Another aspect of the novel user interface that can be changed is the concept of "input focus". This is closely associated with the concept of "active window". Typically in MS Windows® applications, only one window can have the "input focus" at a time. This window is called the "active window". Quite often, this also affects controls such as a text edit box because these controls are implemented as "child" windows.

In order to accomplish the above interface, the concept of "focus" is slightly modified. This can be done by using a keyboard hook and mouse hook. The MS Windows® SetWindowsHookEx( ) API function call provides this capability. Persons skilled in the art will recognize that other means of achieving this same result exist. By doing this, the place where the data entry should occur can be automatically chosen and/or changed. It is even possible to permit data entry with both the mouse and the keyboard at the same time, on the same page. For example two people working on the same computer, on the same page, at the same time.

Controlling the input "focus" may at times require construction of pseudo windows. These are rectangles that look and work as if they were "child" windows, yet they are manually constructed by the application. From the point of view of MS Windows®, there is only one large window. Thus MS Windows® does not interfere with the modified interface. These pseudo window controls can take many forms. One such form would be the creation of an edit text box.

As persons skilled in the art will appreciate, one bothersome aspect of input "focus" within MS Windows® that can be eliminated is that there is no need to specify that a text edit control has the "focus." Whenever text edit controls appear on the screen, the text caret is placed in one of them (e.g., the top left one) and is immediately available for data entry. There is no need to click the mouse on this edit control to tell the control that data entry will occur. Since both the mouse and the keyboard remain available for user input at any time, merely using one of them or the other (or even both at the same time) provides sufficient information for the application to correctly process these data entries.

As persons skilled in the art will recognize, the foregoing problems associated with input "focus" could also be eliminated by changes to the operating system. This would eliminate the requirement to supercede the design of the operating system through pseudo windows and input device hooks. Instead, the operating system could divide the single active window into the mouse and keyboard input focus. In other words, there would be one active window for mouse focus, and possibly another different window for keyboard focus. This would allow users to enter text in the active keyboard window regardless of where the mouse focus was located.

One additional significant change to the typical known desktop publishing interfaces is Dynamic Menus. These are user-defined menus that allow many of the operations of the application—including operations that typically require use of the mouse—to be accomplished with a few keystrokes. The user is free to define any keystrokes that are not already assigned to other operations (e.g., <Ctrl><X> for cutting text, and <F1> to invoke user help).

A Dynamic Menu includes an invoking sequence that brings a menu of options to the screen, indicating the keystrokes associated with these options. There is also a selection sequence. The selection sequence performs the requested action and then removes the menu from the screen. The invoking sequence can be as simple as the single keystroke (e.g., <F2>) and the selection sequence can be as simple as a single keystroke (e.g., <0> through <9>). Combination keystroke sequences (e.g., <Ctrl>+<Alt>) could also be used. Other keystrokes that are not otherwise already allocated would also be available. The user would have the option of turning off the display of any one or more of these menus. The effect of this option would be to merely eliminate the screen display. This would occur when all of the key mappings have been memorized.

A particular specific use of these Dynamic Menus would be to permit switching between FontInstances with a keystroke combination. The present Font Dialog Box often takes ten seconds for this process. This time can be cut to about ½ second. The Dynamic Menus could be created in several different ways.

According to a first method for creating Dynamic Menus, as FontInstances are selected they may be automatically stored into one of these Dynamic Menus. These could be stored in sort order by FontName, FontSize, etc., or they could be stored in the order of selection. If either of these orders is selected as the default, then the other one is dynamically available. In other words, if the default is to place them in "Order of Selection", they could later be sorted in "FontInstance Order" without the need to specify these key mappings again.

According to an alternate method, the Dynamic Font Menus can be derived in advance and loaded into projects as needed. The advantage of this option is that they could be in FontInstance order, which makes it quicker to find a FontInstance on the menu and retain consistent key mappings. This would speed up the process of changing from one FontInstance to another, once they are memorized.

Using technology similar to the Dynamic Menus described above, along with the DFA recognition technology it is possible to define Smart Hot Keys. This is similar to the TSR Hot Keys used in the past with MSDOS®, except that in this case the system can determine the context in which it was invoked and provide differing actions depending upon this context. It derives this context by using the DFA technology to "look" at the screen. One example of the use of this technology would be to quickly take a user to a different place in a complex system and "remember" how to get back to exactly where the user was at the beginning. The primary means for accomplishing these features is the method mentioned in APPENDIX G.

Figure 51:
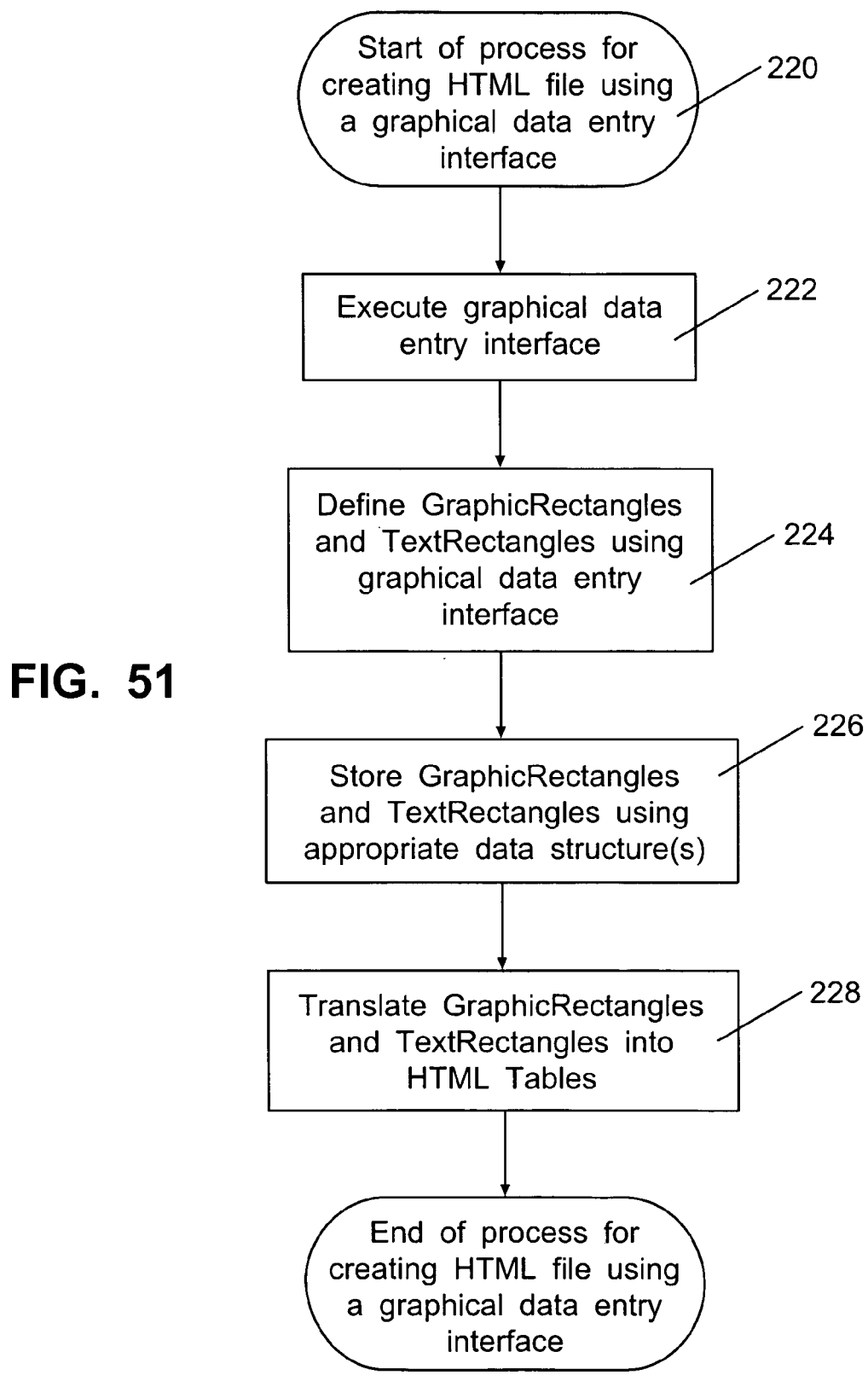
FIG. 51 shows a logic flow diagram of an exemplary process for creating an HTML file using a graphical data entry interface.

Referring now to FIG. 51, an exemplary process 220 for using a graphical user interface such as described above to create a page layout specification file will be described. Process 220 include step 222 of executing a graphical data entry interface program (such as described above) to define a page layout including text and graphic images. As shown at step 224, the page layout is constructed using TextRectangles such as described above GraphicRectangles (i.e., the graphic counterpart to TextRectangles). Next, a step 226 is used to store the components of this page layout in the TextRectangle data structure defined in FIG. 37. (A much simpler form of this structure can be used to store the GraphicRectangles). The next step 228 translates these TextRectangles and GraphicRectangles into HTML tables. An equivalent process could be applied to produce XSLT formatting objects.

Appendix A

By way of example and not limitation, FIGS. 53A–53F show several exemplary functions which may be used to determine the dimensions of a character's bitmap. All source code is written in Borland C++ Builder 4.0.

Appendix B

By way of example and not limitation, FIG. 54 provides a function that may be used to translate a monochrome horizontal bitmap into a monochrome vertical bitmap represented as a string of 32-bit integers. This function assumes that the bitmap is monochrome. All source code is written in Borland C++ Builder 4.0.

In FIG. 54, the loop translates a horizontal monochrome bitmap into a vertical one. BITS[ ] is an Array [0–31] with a one bit in each respective bit position, thus 00000000000000000000000000000001b is the zeroth array element. WhichByte traverses the Bytes that hold the ScanLine, while WhichBitInByte traverses the bits within these Bytes, one bit at a time, in ScanLine order.

If the bit is one, then this bit is or-ed into the 32-bit int, progressing from low order bit to high order bit, as the rows progress, until the full height of the character is spanned, from top to bottom, and progressing from the zeroth array element as the columns progress until the full width of the character is spanned.

The result of all this is that the column is translated into a Byte and BitInByte in the horizontal ScanLine, and the row is translated into the BitInInt in the integer array. The column is also translated into the selection of the integer, one column integer per pixel position.

Appendix C

This section relates to initializing the PixelsBetween[ ][ ] array. The method proceeds through two nested loops that range from the minimum value to the maximum value of the characters defined in this FontInstance. The number of pixels between every character that is defined in the font by is determined by the following method: subtracting the sum of the widths of the individual characters from the width of both characters displayed together:

PixelsBetween=Width(Char1andChar2) (Width (Char1)+Width(Char2)) (4)

The width of these characters and character pairs is found using the DimensionsOfChar( ) function defined in APPENDIX "A". The width of a Character or Character pair is specified by the following:

(CharRect->EndCol−CharRect->StartCOL)+1 (5)

If the width of both characters together is less than the sum of their individual widths, then one or more pixel columns overlap and PixelsBetween is a negative number which exactly corresponds to the number of columns of this overlap.

Appendix D

With reference to FIG. 55, this section provides is alternative method for determining the number of PixelsBetween characters, and thus which characters overlap. This method is much faster than the one previously specified and it works on TrueType and raster fonts. This method depends upon the fact the TrueType and raster fonts place their glyphs at consistent positions relative to the preceding glyph and the following glyph. MS Windows® GetCharABCWidths( ) explains this is more detail.

FIG. 55 shows the ABC structure which contains the width of a character in a TrueType font. This structure includes the following variable which have the following meanings:

| Variable | Meaning |
| --- | --- |
| AbcA | Specifies the "A" spacing of the character. The "A" spacing is the distance to add to the current position before drawing the character glyph. |
| abcB | Specifies the "B" spacing of the character. The "B" spacing is the width of the drawn portion of the character glyph. |
| abcC | Specifies the "C" spacing of the character. The "C" spacing is the distance to add to the current position to provide white space to the right of the character glyph. |

With the method described in this section, the total width of a character is the summation of the "A," "B," and "C" spaces. Either the "A" or the "C" space can be negative to indicate underhangs or overhangs. The "C" value of the first character plus the "A" value of the second character provides the same value that would otherwise be derived and stored in the PixelsBetween[Char1][Char2] element of the array. It is a short cut because it can be derived in a single loop, rather than two nested loops. Also, it is much quicker at deriving the set of overlapping characters.

By using the ABC widths of characters, three different arrays of these values can be sorted according to each of the "A" or "B" or "C" values. These arrays are named according to the ABC values by which they were sorted. Thus, the method utilizes three arrays of ABC structures named A[ ], B[ ], and C[ ], respectively. To understand this idea, it should be known that the following relationship holds:

$$PixelsBetween[Char1][Char2]==C[Char1].abcC+A[Char2].abcA \quad (6)$$

Each of these lists holds a maximum of 256 elements, which thus sort quickly. Instead of examining all of the possible combinations of three characters (as required by the other method), however, it is only necessary to process those combinations that actually overlap. This is possible because the three above-described arrays are sorted such that the smallest negative numbers (indicating the greatest degree of overlap) are first in the numerically sorted lists. To determine the cases of DoubleOverlap, the functions shown in FIGS. 55 can be used. First, the algorithm proceeds through the elements in the array with two nested loops. While the sum of (C[Char1].abcC+A[Char2].abcA) is less than zero, this is a situation of DoubleOverlapping character pairs. Since these arrays are sorted by their numerical ABC values, the smallest negative numbers occur first.

The MS Windows® function GetCharABCWidths( ) does not return ABC width values for raster fonts. It also does not consistently return the values for TrueType fonts that are required by this process. Because of these reasons, another function that directly derives these values from the actual onscreen bitmaps must be written. Persons skilled in the art would understand how to construct such a function based on the teachings herein. This function would work in a fundamentally similar fashion to the DimensionsOfChar( ) function defined in APPENDIX A.

Appendix E

This section deals with reducing memory requirements. One very efficient way to find the space required in the case of full color icons (because they tend to derive unique sequences rather quickly) would be to store each contiguous row (as it becomes unique from other values in the DFA) as the previously specified, sequence of pixels, without the need for Next fields, Offset Fields, and ActionCode fields.

In this case, the Next first Next field can be used to store the required relative column Offset because the sequence of pixels are stored physically adjacent to the current DFA record. In those relatively rare cases where the DFA sequence has not yet distinguished itself as unique from the other DFA sequences stored within this same DFA, a single dummy DFA record can be created and one of its fields (for example the Offset field) can be used to store this value.

This same process can be used to reduce the memory requirements of all the other forms of DFA based on this architecture.

NOTE: The sequence in which a Full Color Icon's pixels are processed on the screen is arbitrary. Although most of the procedures described herein have started with the top left and proceeded down to the lower right (i.e., natural book read order), there are many other sequences of processing that would work as well. For example, it is possible to process all of one column and then move to the next column. It is also possible to process from the bottom right to top left. None of these changes would affect performance of the procedures. Within the context of above-mentioned arbitrary pixel processing order, it is possible to process the pixels in an order other than sequentially. As an illustrative example, and in no way forming a limitation, graphic image pixels could be processed $1^{st}$, $3^{rd}$, $7^{st}$, $9^{th}$, and then $2^{nd}$, $4^{th}$, $6^{th}$, $8^{th}$.

Many other combinations are possible within the basic requirements of the deterministic finite automation.

Appendix F

This section relates to translating files from an unknown format to a known specification. The specific method defined herein can be used as a general purpose universal data interchange format for all word processing, and especially desktop publishing file transfers. This method requires a file containing the bitmap image of the onscreen representation. It can be made much faster if a file containing a list of the FontInstances used, along with the foreground color corresponding to each, is also provided. This method will enable the translation between different desktop publishing file formats very quickly. Even if the original source representation is unknown, the bitmap representation can be converted into a known file format.

To provide a very efficient universal data interchange format for desktop publishing, all that is required is an application to convert to its format from the data that this invention provides to it. This data includes the exact location and characteristics of every textual element. By knowing exactly where the text is, the graphics and background can be deduced. Every rectangle on the screen that is left over after all the text has been recognized must be either an image or background. Everything besides solid color can be treated as an image. As a further enhancement, repeating patterns (such as those used as background images in HTML) could be recognized and reported.

Figure 56:
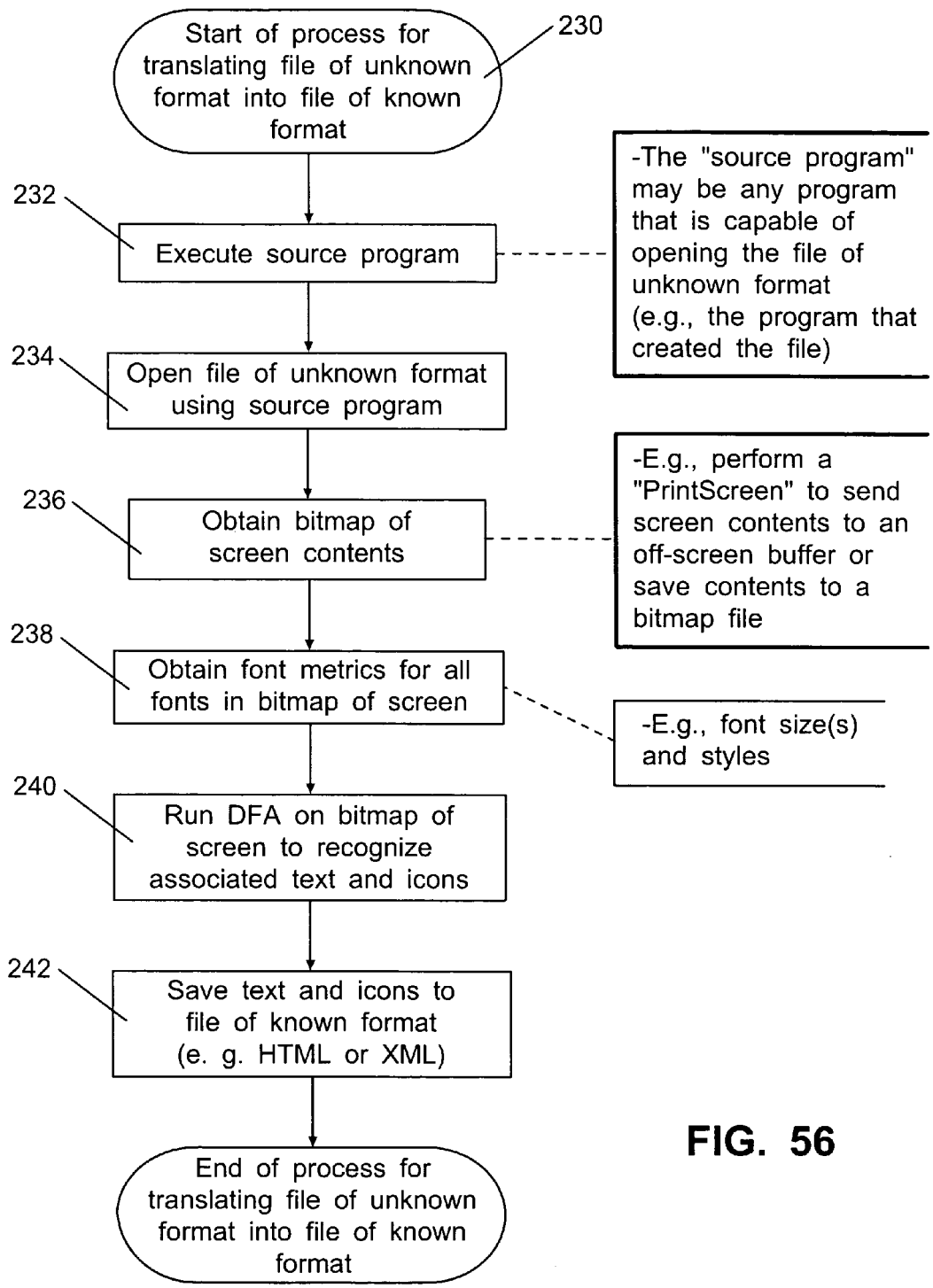
FIG. 56 shows a logic flow diagram of an exemplary process for translating a file of an unknown format into a file of a known format.

An exemplary process 230 for translating a file of unknown format into a known specification format is illustrated in FIG. 56. Process 230 begins with a step 232 of executing a source program that is capable of reading the file of unknown format. In a step 234, the source program is used to open the file of unknown format, which produces a bitmap on the screen. A step 236 is used to capture the bitmap of the screen contents (e.g., by pressing the PrintScreen button on a computer running MS Windows®). In a next step 238, the font metrics for all text in the screen capture is entered. This information may be gathered manually querying the user or, preferably, by intercepting API function while the source program is generating the screen layout as described above. According to a step 240, the DFA (which may be generated on the fly or have been pre-generated) is run on the bitmap of the screen contents to recognize all the text and/or icons. Finally, a step 242 is performed to save the gathered information in a page layout specification file of a known format (e.g., HTML or XML) so that it can be later executed to recreate the original screen/page layout.

As persons skilled in the art will recognize, some means would need to be provided to account for the difference between the screen resolution and the printed resolution. Most desktop publishing software accounts for the effect of this difference on text by placing the text on the screen at the same locations that it would be on the printed page. This is done by mapping the printed resolution's placement to the screen placement of individual characters. This often requires that the between character and between word spacing be modified from its typical screen resolution placement.

Besides the difference in the placement of text between the printed page and the screen, it is also necessary to deal with how these differing resolutions affect graphics images. One additional piece of information that must be derived is the mapping between the image files (that most often must also be included) and their corresponding screen resolution appearance. It would be easier if these files were already cropped to match their screen resolution boundaries. If it can be assumed that these images are reduced in size proportionally, then it would only be a matter of scaling the image files until their reduced size exactly matches their onscreen size. At this point, an exact match should be obtained between the file and the onscreen appearance. By accomplishing this process, the specific scaling factor is also derived.

Figure 61:
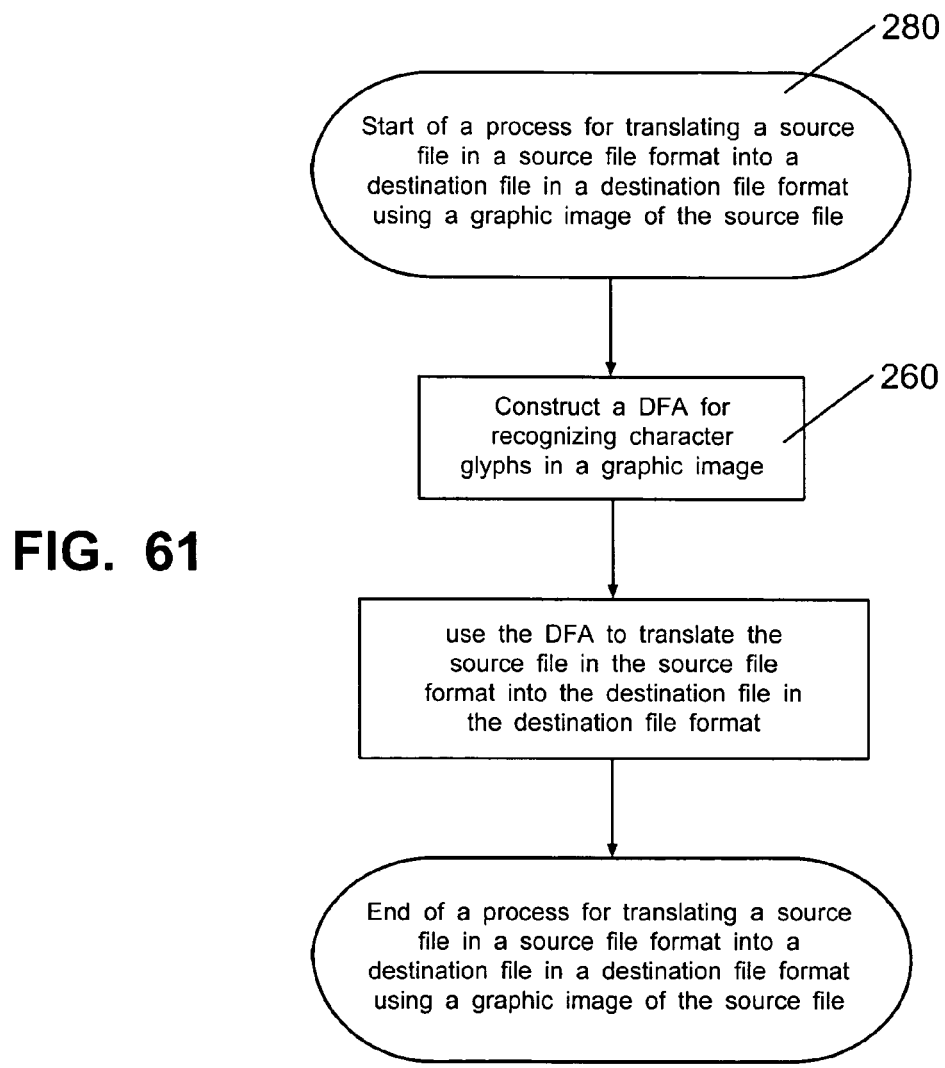
FIG. 61 shows a logic flow diagram of an exemplary process for translating a source file in a source file format into a destination file in a destination file format using a graphic image of the source file.

FIG. 61. summarizes the steps elaborated in APPENDIX F above, and includes FIG. 59 as its step 260. FIG. 61 also forms a summary of the steps detailed in FIG. 56 above.

Appendix G

This section relates to automating graphical user interface applications. The specific method defined herein can be used by automated programs to provide them the capability to recognize (or "see") what is on the screen (e.g., text and/or icons) and, based on what they recognize, perform differing automated actions (e.g., moving and clicking the mouse or entering keystrokes). In this case, the bitmaps used for recognition could be a full color screen capture that makes corresponding use of the Full Color DFA recognizer. This DFA recognizer might not have a need to "see" every character in the FontInstance. In this case, the DFA recognizer could be constructed to merely match certain keywords, while ignoring all of the remaining character combinations in the FontInstance.

By using the MS Windows® API functions mouse_event( ), keybd_event( ), and SetWindowsHookEx( ), it is possible to simulate the effect of the hardware input devices. Similar approaches can be used on alternative operating systems. Using these methods and the procedures and methods provided by herein, persons skilled in the art would be able to derive a program that provides a language for automating GUI applications. The simplest way of deriving programs for this language would be to allow the automation system to keep track of a set of user actions (e.g., through keyboard and mouse hooks) and the corresponding text or icons that were displayed on the computer screen. This system could then provide the option of adding this sequence to its available programmed actions. Alternatively, a more complete computer language could be developed that is based on taking certain actions from a set of actions based upon recognizing specific graphical elements from the screen. One specific example of this would be instructing the control program to find the font menu, and then select "Arial" from this font menu. This could be provided as a control language source instruction Select("Arial") from FontMenu.

Figure 57:
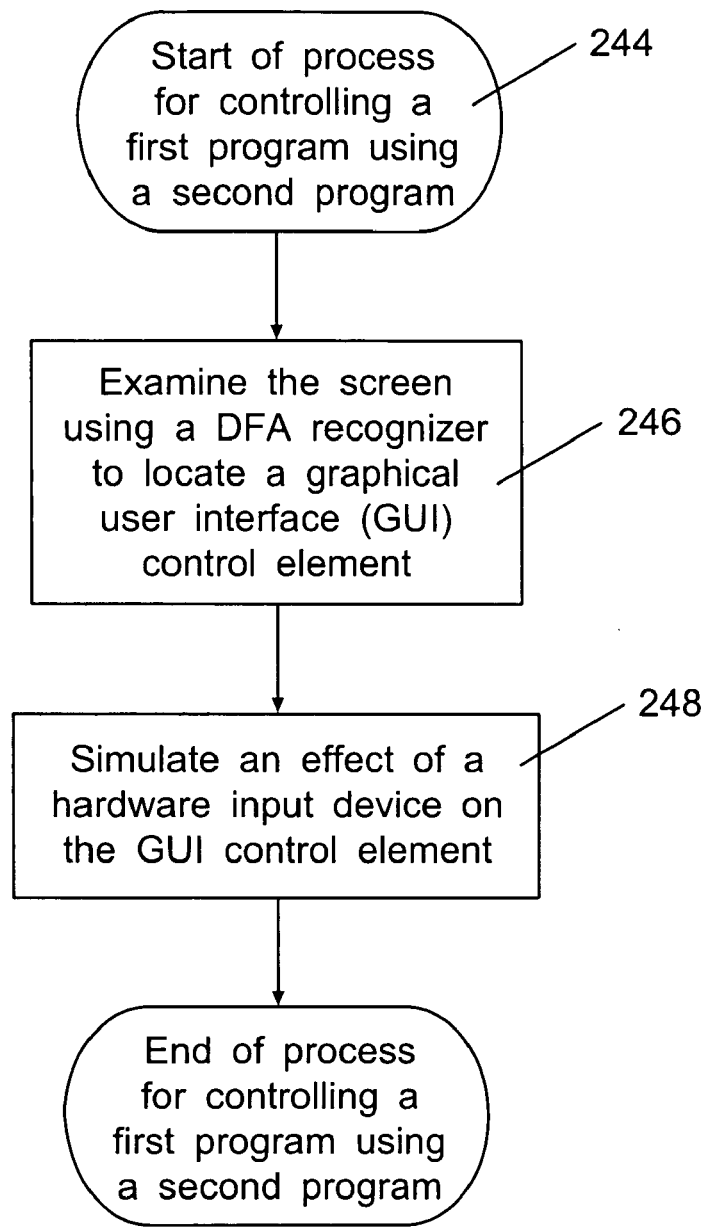
FIG. 57. shows a logic flow diagram of an exemplary process for controlling a first program using a second program.

The basis for the automation process is that the controlling program can recognize various graphical user interface (GUI) control elements, and then simulate the actions of an input device on these control elements. This process is show in FIG. 57. A process 244 begins at step 246 which examines the screen using a DFA recognizer to locate (GUI) control elements. When the specific (GUI) control element that is sought is matched by the DFA recognizer, the process proceeds to a step 248. In step 248, the process simulates the effect of a hardware input device (such as positioning and clicking the mouse) upon a (GUI) control element (such as a button).

For the purpose of illustration only and in no way limiting, these control elements include: buttons, menu elements, menus, dialog boxes, control tabs, and application icons. Also for the purpose of illustration only, and in no way forming limitation, hardware input devices that are simulated include: keyboard, mouse, touch screen, light pen, and stylus pad.

These actions could be invoked in many ways, one of which is a Dynamic Menu (as described above). One of the features that a Dynamic Menu provides is the ability to tie actions to HotKeys (i.e., keystroke combinations). This Dynamic Menu has a menu invoking sequence (such as <ctrl><alt>) and an execution sequence (such as <F1>following the <ctrl><alt>). When the menu invoking sequence is entered, the menu pops up to the screen. When the execution sequence is entered, the menu is cleared from the screen and the requested action takes place. The primary difference between the DynamicMenu and the historically used terminate and stay resident ("TSR") pop-ups is that the user can dynamically reconfigure the DynamicMenu. Also, with the addition of the DFA technology, it can intelligently respond differently to the specific context in which it was invoked. For example, if a user derives a control language program that performs certain actions and the operating system responds with an error message, this control program can already "know" how to handle the error message. It could have "learned" this action from monitoring the user's responses to prior error messages.

This automation system could be programmed so that it "understood" the basic elements of a screen layout. These would include such things as menus, buttons, dialogue boxes, toolbars and the like. This "comprehension" of the GUI operating system could also be tied to DFA recognizer that would be able to "see" the typical GUI elements. For example, it could "know" what the "close application" icon looks like, and "know" how to close the application. The corresponding programming language would represent this as a "close application". From this set of standard operations that are tied to standard graphical user interface (GUI) control elements, a specialized computer language could be developed that would allow powerful scripts to be created. Alternatively, the control program could merely capture the user actions on input devices, and the corresponding screen image data, and then be able to repeat these actions.

Figure 62:
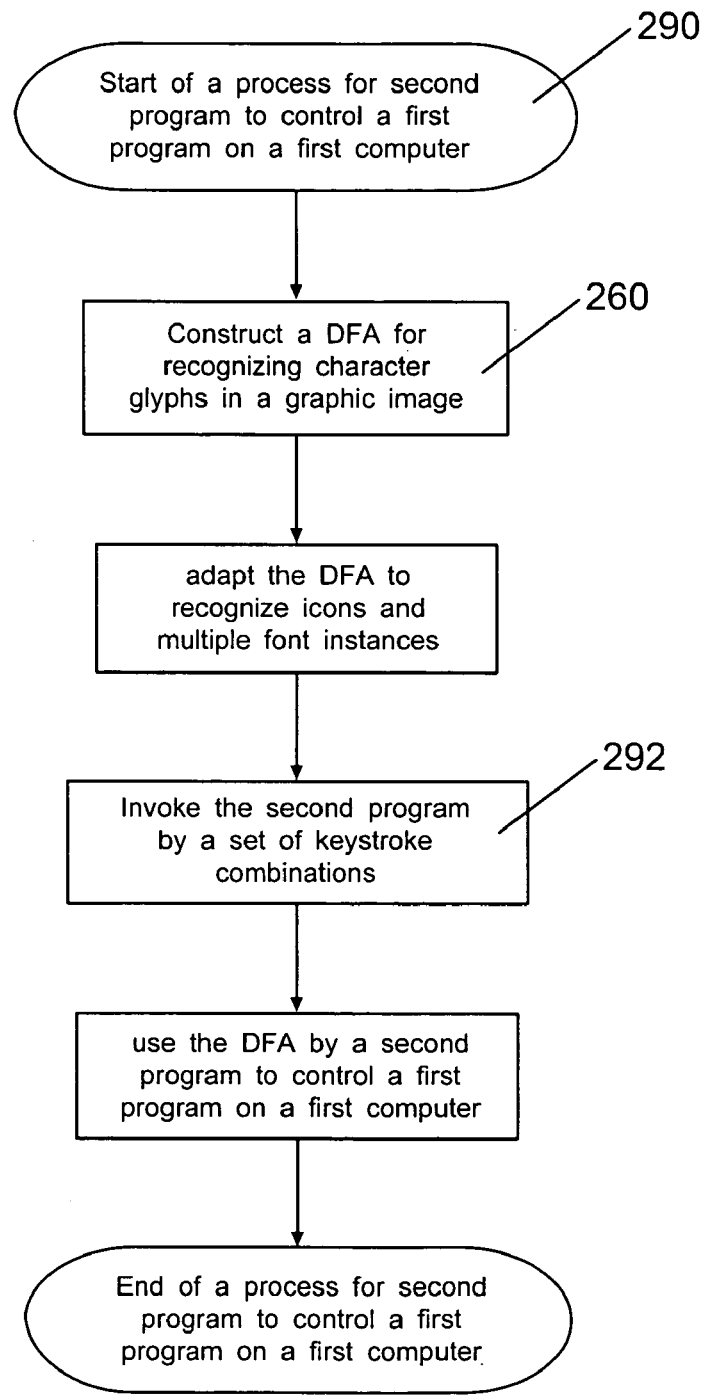
FIG. 62 shows a logic flow diagram of an exemplary process for a second program to control a first program on a first computer.
Figure 64:
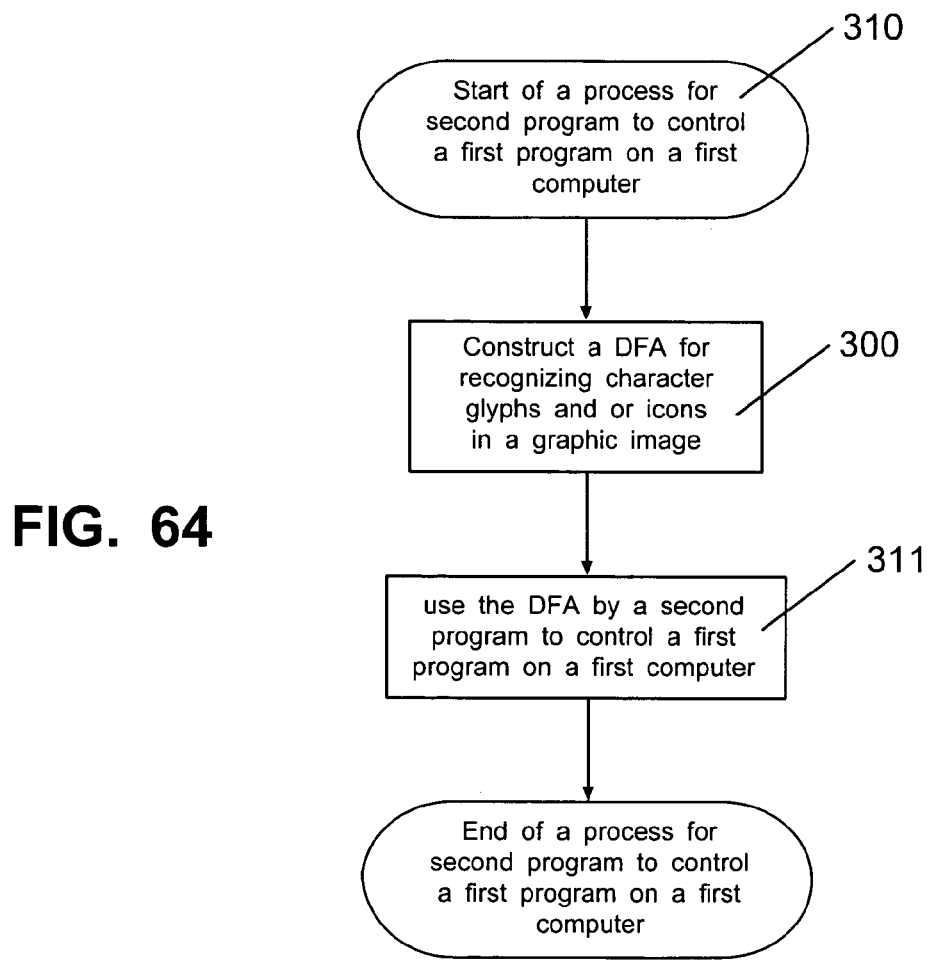
FIG. 64 shows a logic flow diagram of an exemplary process for a second program to control a first program on a first computer.
Figure 65:
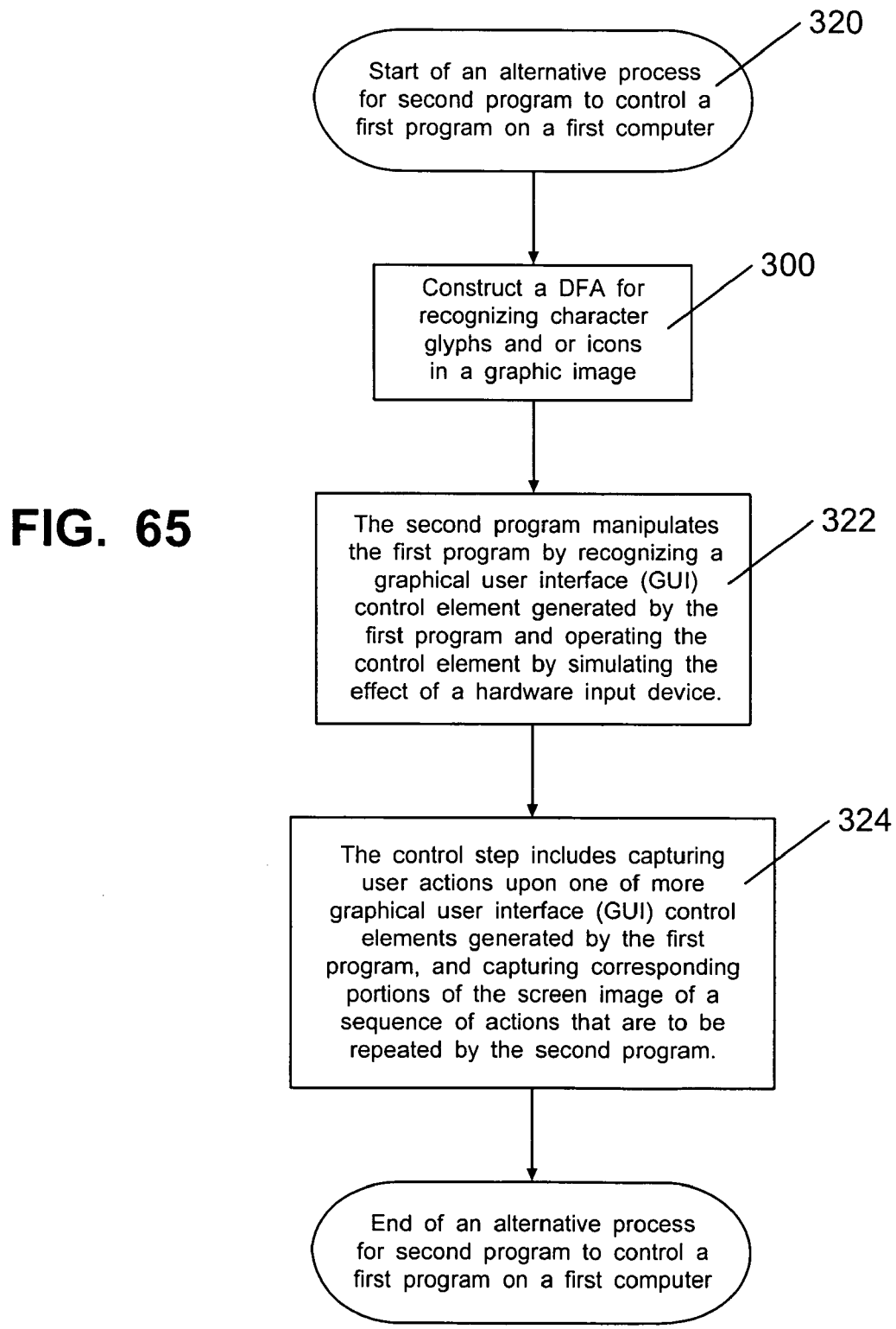
FIG. 65 shows a logic flow diagram of an exemplary process for a second program to control a first program on a first computer.
Figure 66:
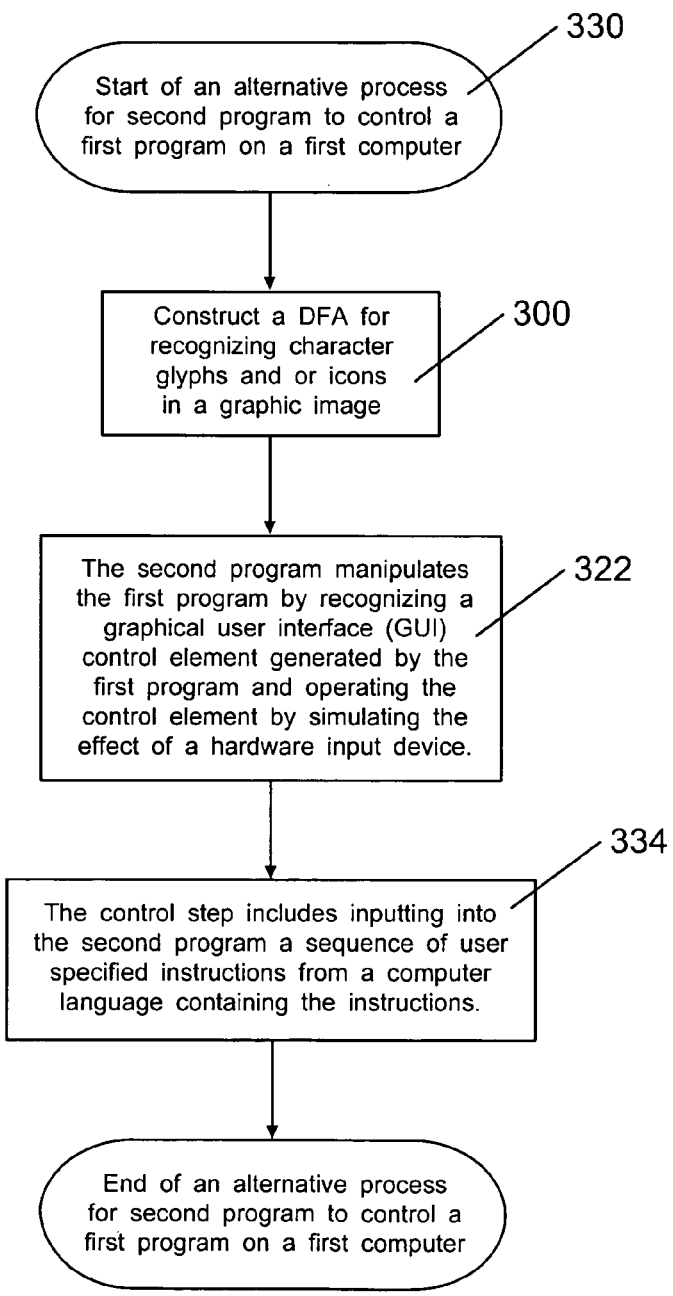
FIG. 66 shows a logic flow diagram of an exemplary process for a second program to control a first program on a first computer.

FIG. 62. summarizes the steps elaborated in APPENDIX G above, and includes FIG. 59 as its step 260. FIG. 64 includes FIG. 63 as its step 300 and summarizes the process of FIG. 57 as its step 311. FIGS. 65 and 66 include FIG. 63 as their step 300. FIGS 65, and 66 then summarize the basic process elaborated in APPENDIX G, and outlined in FIG. 57 as their step 322. FIG. 65 summarizes one of the embodiments of the control step as its step 324. FIG. 66 summarizes the other main embodiment of the control step as its step 334.

It is important to note that the above-described preferred embodiments of the DFA recognizer and its many uses are illustrative only. Although the invention has been described in conjunction with specific embodiments thereof, those skilled in the art will appreciate that numerous modifications are possible without materially departing from the novel teachings and advantages of the subject matter described herein. For example, the appendices list a number of alternative procedures and methods not only for constructing a DFA recognizer but also for its use. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

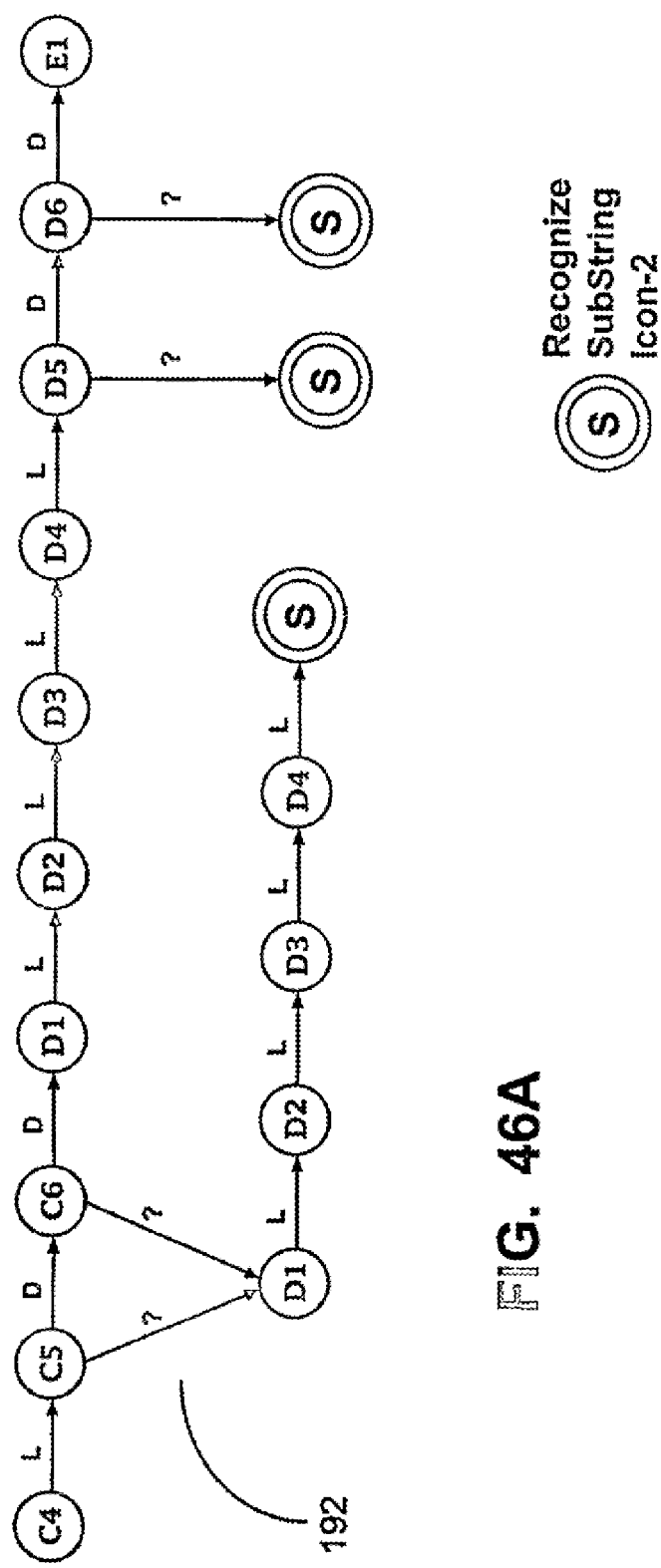

What is claimed is:

1. A method for constructing a deterministic finite automaton (DFA) for recognizing machine generated character glyphs in a graphic image, comprising:
collecting character glyphs of a font instance, including all combinations of overlapping glyphs;
merging the identical prefixes of these character glyphs together;
generating the DFA from the merged prefixes; and
storing the DFA in a sparse matrix representation.

2. The method of claim 1, wherein the DFA has been adapted to recognize character glyphs of differing colors and icons in a single pass over the graphic image data.

3. The method of claim 1, wherein the sparse matrix representation is implemented as at least one of: binary search, hashing, and linear search.

4. The method of claim 1, wherein the DFA uses at least one of: set intersection and glyph alignment in its recognition process.

5. The method of claim 1, wherein the DFA is used to translate a source file in source file format to a destination file in a destination file format using a graphic image of the source file.

6. The method of claim 1, wherein the DFA is used by a second program to control a first program on a first computer.

7. The method of claim 1, wherein the DFA has been adapted to recognize both character glyphs and icons using a single set of DFA states comprised of the merged identical prefixes of the character glyphs and the icons.

8. The method of claim 1, wherein the DFA has been adapted to ignore the background pixels of the graphic image during the DFA recognition process.

9. A method for translating a source file in a source file format to a destination file in a destination file format using a graphic image of the source file, comprising:
constructing a deterministic finite automaton (DFA) for recognizing machine generated character glyphs in a graphic image, comprising:
collecting character glyphs of a font instance, including all combinations of overlapping glyphs;
merging the identical prefixes of these character glyphs together;
generating the DFA from the merged prefixes; and
storing the DFA in a sparse matrix representation;
using the deterministic finite automaton (DFA) to translate the source file in the source file format into the destination file in the destination file format.

10. The method of claim 9, wherein the source file contains both text and graphic images.

11. The method of claim 9, wherein the translation step includes identifying rectangular regions of text.

12. A method for translating a source file in a source file format to a destination file in a destination file format using a graphic image of the source file, comprising:
constructing a deterministic finite automaton (DFA) for recognizing machine generated character glyphs in a graphic image, comprising:
collecting character glyphs of a font instance, including all combinations of overlapping glyphs;
merging the identical prefixes of these character glyphs together;
generating the DFA from the merged prefixes; and
storing the DFA in a sparse matrix representation;
using the deterministic finite automaton (DFA) to translate the source file in the source file format into the destination file in the destination file format wherein the destination file format is a page layout language.

13. The method of claim 12, wherein the page layout language is HTML or XML.

14. A method for second program to control a first program on a first computer comprising:
constructing a deterministic finite automaton (DFA) for recognizing machine generated character glyphs in a graphic image, comprising:
collecting character glyphs of a font instance, including all combinations of overlapping glyphs;
merging the identical prefixes of these character glyphs together;
generating the DFA from the merged prefixes; and
storing the DFA in a sparse matrix representation;
adapting the DFA to recognize icons and multiple font instances;
using the DFA by a second program to control a first program on a first computer.

15. A method for second program to control a first program on a first computer comprising:
constructing a deterministic finite automaton (DFA) for recognizing machine generated character glyphs in a graphic image, comprising:
collecting character glyphs of a font instance, including all combinations of overlapping glyphs;
merging the identical prefixes of these character glyphs together;
generating the DFA from the merged prefixes; and
storing the DFA in a sparse matrix representation;
adapting the DFA to recognize icons and multiple font instances;
using the DFA by a second program to control a first program on a first computer, wherein the second program is invoked by a set of keystroke combinations.

16. A method for second program to control a first program on a first computer comprising:
constructing a deterministic finite automaton (DFA) for recognizing machine generated character glyphs and or icons in a graphic image, comprising:
collecting character glyphs and or icons;
merging the identical prefixes of these character glyphs and or icons together;
generating the DFA from the merged prefixes; and
storing the DFA in a sparse matrix representation;
using the DFA by a second program to control a first program on a first computer.

17. The method of claim 16, wherein the second program manipulates the first program by recognizing a graphical user interface (GUI) control element generated by the first program and operating the control element by simulating the effect of a hardware input device.

18. The method of claim 17, wherein the graphical user interface (GUI) control element is one of a button, a menu, a menu element, a dialog box, a control tab, and an application icon.

19. The method of claim 17, wherein the hardware input device is one of a keyboard, a mouse, a touch screen, a stylus pad, and a light pen.

20. The method of claim 16, wherein the control step includes capturing user actions upon one of more graphical user interface (GUI) control elements generated by the first program, and capturing corresponding portion is of the screen image of a sequence of actions that are to be repeated by the second program.

21. The method of claim 16, wherein the first computer is different from the second computer.

22. The method of claim 16, wherein the first computer is the same as the second computer.

23. The method of claim 16, wherein the control step includes inputting into the second program a sequence of user specified instructions from a computer language containing the instructions.

24. The method of claim 16, wherein the second program is invoked by a set of keystroke combinations.

25. The method of claim 24, wherein the second program uses the DFA to determine the context in which the second program was invoked, and takes different actions depending upon this context.

26. The method of claim 16, wherein the DFA contains a set of full color pixels of the glyph or icon to be recognized.

27. The method of claim 26, wherein the full color pixels include both foreground pixels and background pixels.

* * * * *

UNITED STATES PATENT AND TRADEMARK OFFICE
CERTIFICATE OF CORRECTION

| | | |
|---|---|---|
| PATENT NO. | : 7,046,848 B1 | Page 1 of 3 |
| APPLICATION NO. | : 10/225053 | |
| DATED | : May 16, 2006 | |
| INVENTOR(S) | : Peter L. Olcott | |

It is certified that error appears in the above-identified patent and that said Letters Patent is hereby corrected as shown below:

Please replace FIG. 46A and FIG. 46B with the attached replacement drawing sheets. Please replace the table that forms the last paragraph of column 32 with the following corrected table.

```
substring icon                       4 * 4 pixels
   LLLLLLLLLLLLLLLL
above icon after preprocessing       6 * 4 pixels
   LLLL??LLLL??LLLL??LLLL
superstring icon                     6 * 6 pixels
   LLLLWWLLLLWWLLLLDDLLLLDDWWDDDDWWDDDD
   L = Light color pixel
   D = Dark color pixel
   W = White (background) pixel
   ? = Wildcard pixel (matches any color)
       also known as a dontcare state
```

Please replace the term "invoiced" on line 35 of claim 15 in column 52 with --invoked--.

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,046,848 B1 |
| APPLICATION NO. | : 10/225053 |
| DATED | : May 16, 2006 |
| INVENTOR(S) | : Peter L. Olcott |

It is certified that error appears in the above-identified patent and that said Letters Patent is hereby corrected as shown below:

Please replace FIG. 46A and FIG. 46B with the attached replacement drawing sheets. Please replace the table that forms the last paragraph of column 32 with the following corrected table.

```
substring icon                        4 * 4 pixels
   LLLLLLLLLLLLLLLL
above icon after preprocessing        6 * 4 pixels
   LLLL??LLLL??LLLL??LLLL
superstring icon                      6 * 6 pixels
   LLLLWWLLLLWWLLLLDDLLLLDDWWDDDDWWDDDD
   L = Light color pixel
   D = Dark color pixel
   W = White (background) pixel
   ? = Wildcard pixel (matches any color)
       also known as a dontcare state
```

Please replace the term "invoiced" on line 35 of claim 15 in column 52 with --invoked--.

This certificate supersedes Certificate of Correction issued October 31, 2006.

Signed and Sealed this

Twelfth Day of December, 2006

JON W. DUDAS
*Director of the United States Patent and Trademark Office*